US009933550B2

(12) United States Patent
Hosokawa et al.

(10) Patent No.: US 9,933,550 B2
(45) Date of Patent: Apr. 3, 2018

(54) COATED METAL MATERIAL AND METHOD OF PRODUCTION OF SAME

(75) Inventors: Tomoaki Hosokawa, Tokyo (JP); Kohei Ueda, Tokyo (JP); Ikuya Inoue, Tokyo (JP); Yuki Obara, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 298 days.

(21) Appl. No.: 12/998,801

(22) PCT Filed: Dec. 2, 2009

(86) PCT No.: PCT/JP2009/070575

§ 371 (c)(1), (2), (4) Date: Jun. 2, 2011

(87) PCT Pub. No.: WO2010/064725

PCT Pub. Date: Jun. 10, 2010

(65) Prior Publication Data

US 2011/0236632 A1 Sep. 29, 2011

(30) Foreign Application Priority Data

Dec. 3, 2008 (JP) ................................ 2008-308968

(51) Int. Cl.

*G02B 5/08* (2006.01)
*B05D 5/06* (2006.01)

(Continued)

(52) U.S. Cl.

CPC ............. *G02B 5/085* (2013.01); *B05D 5/063* (2013.01); *B05D 7/56* (2013.01); *C09D 167/00* (2013.01);

(Continued)

(58) Field of Classification Search

None

See application file for complete search history.

(56) References Cited

U.S. PATENT DOCUMENTS 4,331,196 A 5/1982 Ohashi et al.
4,533,576 A * 8/1985 Tanahashi et al. ........... 428/220

(Continued)

FOREIGN PATENT DOCUMENTS

CN 1126139 7/1996
CN 101232994 7/2008

(Continued)

OTHER PUBLICATIONS

Machine translation of JP 2001-158073 Kinoshita et al obtained from JPO.*

(Continued)

*Primary Examiner* — Chinessa T Golden

(74) *Attorney, Agent, or Firm* — Birch, Stewart, Kolasch & Birch, LLP

(57) ABSTRACT

Disclosed is a coated metallic material having a high total light reflectance and excellent moldability. Also disclosed is a method for producing the coated metallic material. Further disclosed is a molded coated metallic article. The coated metallic material is characterized by comprising a coating layer having at least three layers composed of a primer layer, an intercoating layer and a top layer, wherein the intercoating layer contains rutile-type titanium oxide in an amount of 35 to 70% in terms of a solid material concentration by volume and also contains a polyester resin (A) having a number average molecular weight of 19000 to 28000 as a binder resin component, and wherein the polyester resin (A) is contained in the binder at a concentration of 20 mass % or more. In the coated metallic material, an interface between the intercoating layer and the top layer has a center-line average roughness (Ra) of 0.8 μm or more, so that the adhesion between the intercoating layer and the top layer can be further improved and the diffusion reflectance can also be further improved.

39 Claims, 2 Drawing Sheets

(51) Int. Cl.
*B05D 7/00* (2006.01)
*C09D 167/00* (2006.01)
*C08K 3/22* (2006.01)

(52) U.S. Cl.
CPC ......... *C08K 3/22* (2013.01); *Y10T 428/24355* (2015.01); *Y10T 428/249986* (2015.04); *Y10T 428/256* (2015.01); *Y10T 428/259* (2015.01); *Y10T 428/264* (2015.01); *Y10T 428/265* (2015.01); *Y10T 428/269* (2015.01); *Y10T 428/31663* (2015.04); *Y10T 428/31678* (2015.04); *Y10T 428/31681* (2015.04)

(56) References Cited

U.S. PATENT DOCUMENTS

| | | | | |
|---|---|---|---|---|
| 5,698,308 | A | 12/1997 | Sumiya et al. | |
| 5,883,170 | A * | 3/1999 | Tanaka et al. | 524/413 |
| 6,150,012 | A * | 11/2000 | Matsui et al. | 428/216 |
| 6,420,010 | B1 | 7/2002 | Hasegawa et al. | |
| 7,393,578 | B2 * | 7/2008 | Ueda et al. | 428/141 |
| 2007/0030574 | A1 * | 2/2007 | Watanabe | 359/667 |
| 2007/0202320 | A1 * | 8/2007 | Watanabe et al. | 428/327 |
| 2007/0254150 | A1 | 11/2007 | Seino et al. | |
| 2008/0003446 | A1 * | 1/2008 | Furukawa et al. | 428/612 |
| 2008/0136998 | A1 | 6/2008 | Sakata et al. | |
| 2008/0138601 | A1 * | 6/2008 | Watanabe et al. | 428/304.4 |

FOREIGN PATENT DOCUMENTS

| | | | | |
|---|---|---|---|---|
| JP | 53-9238 | | 1/1978 | |
| JP | 9-241576 | | 9/1997 | |
| JP | 10-730 | | 1/1998 | |
| JP | 2001-89868 | | 4/2001 | |
| JP | 2001158073 | A * | 6/2001 | B32B 27/36 |
| JP | 2001-316845 | | 11/2001 | |
| JP | 2002-38280 | | 2/2002 | |
| JP | 2002-60959 | | 2/2002 | |
| JP | 2002080979 | A * | 3/2002 | |
| JP | 2002-172735 | | 6/2002 | |
| JP | 2002241594 | A * | 8/2002 | |
| JP | 2002-266081 | | 9/2002 | |
| JP | 2003-253464 | | 9/2003 | |
| JP | 2004209787 | A * | 7/2004 | |
| JP | 2005-81659 | | 3/2005 | |
| JP | 2005074963 | A * | 3/2005 | |
| JP | 2006-145917 | | 6/2006 | |
| JP | 2006-175817 | | 7/2006 | |
| JP | 2006-192660 | | 7/2006 | |
| JP | 2006175817 | A * | 7/2006 | |
| JP | 2006-312243 | | 11/2006 | |
| JP | 2007-261192 | | 10/2007 | |
| JP | 2007-275701 | A | 10/2007 | |
| JP | 2008-145942 | | 6/2008 | |
| JP | 2008-265209 | | 11/2008 | |
| TW | 574277 | | 2/2004 | |
| WO | 2007/013232 | | 2/2007 | |
| WO | WO 2008056214 | A2 * | 5/2008 | |

OTHER PUBLICATIONS

Ueda et al., Coated Metal Sheet Good in Reflectivity and Molding Processability, Jul. 6, 2006, machine translation of JP2006-175817.*
Miyoshi et al., Precoated Steel Plate Excellent in Environment Consistency, Jul. 29, 2004, machine translation of JP2004-209787.*
Usami et al., Precoat Aluminum Alloy Plate, Mar. 24, 2005, machine translation of JP2005-074963.*
Okumura et al., Polyester Composition for Metal Plate Laminated Film, Aug. 28, 2002, machine translation of JP2002-241594.*
Sasaki et al., Precoated Steel Sheet, Mar. 22, 2002, machine translation of JP2002-080979.*
International Search Report dated Mar. 16, 2010 issued in corresponding PCT Application No. PCT/JP2009/070575.
Indian Office Action and Search Report dated May 19, 2017, for Indian Application No. 3339/DELNP/2011.
Partial Supplementary European Search Report, dated Dec. 14, 2017, issued in European Patent Application 09830489.2.

* cited by examiner

COATED METAL MATERIAL AND METHOD OF PRODUCTION OF SAME

This application is a national stage application of International Application No. PCT/JP2009/070575, filed 02 Dec. 2009, which claims priority to Japanese Application No. 2008-308968, filed 03 Dec. 2008, which is incorporated by reference in its entirety.

TECHNICAL FIELD

The present invention relates to a coated metal material having a high total light reflectance and formability and a method of production of the same.

BACKGROUND ART

Lighting apparatuses, AV equipment, electronic equipment, mobile devices, liquid crystal televisions, plasma displays, etc. emit visible light so as to brighten the surroundings, transmit light signals, display optical images, and perform other functions. In these equipment, a reflector is provided around or behind the light source and light is reflected at this reflector so as to improve the luminance of the light, change the direction of the light, etc. For this reason, to avoid a drop in the amount of light when the reflector reflects light, the reflector surface is required to have a high visible light reflectance.

In the past, as means for improving the reflectance of the reflector surface, the practice has been to polish the metal to a mirror surface, coat a white coating with a high reflectance, etc.

PLT 1 discloses the art of a light reflecting film superior as a reflector of a liquid crystal display device obtained by successively laminating a metal thin film layer and a resin layer containing inorganic microparticles on one surface of a base material film wherein that metal thin film layer is comprised of aluminum and wherein the resin layer containing inorganic microparticles has inorganic microparticles with a refractive index of and a resin forming the layer with a refractive index nb of nf-nb≥0.4.

PLT 2 discloses the art of a high diffuse reflection coated metal sheet for a back panel of a liquid crystal display comprised of an aluminum sheet for a back panel of a liquid crystal display on which is formed a primer layer of a thickness of 50 to 100 μm containing a titanium oxide pigment in 150 to 300 parts by mass with respect to a resin as 100 parts by mass and, on the primer layer, a top layer of a thickness of 10 to 30 μm containing a titanium oxide pigment in 100 to 250 parts by mass with respect to a resin as 100 parts by mass and having a luster of 15 or less.

PLT 3 discloses the art of a coating material having a high diffuse reflectance having at least one layer of a high pigment concentration layer containing 150 parts by volume to less than 1500 parts by volume of a white pigment with respect to a binder as 100 parts by volume or a low density layer containing a binder and white pigment and further having a porosity of a coating layer of 5 vol % to less than 35 vol %.

PLT 4 discloses the art of a coating material having a high diffuse reflectance having a visible light reflection layer comprised of a binder, rutile-type titanium oxide, and particles of a lower refractive index than rutile-type titanium oxide and having a concentration of rutile-type titanium oxide of 35 vol % to 65 vol %.

CITATION LIST

Patent Literature

PTL 1: JP 10-730 A
PTL 2: JP 2002-172735 A
PTL 3: JP 2006-192660 A
PTL 4: JP 2008-145942 A

SUMMARY OF INVENTION

Technical Problem

However, in recent years, lighting apparatus reflectors and the reflectors used for liquid crystal displays and other electrical products are being used in electrical products of increasingly complicated structures and designs. Along with this, the reflectors are also increasingly being required to be used formed in various shapes. Simultaneous with this, stronger, more uniform reflection of light is being demanded. In this regard, as in the art described in PLT 1, when using a film on a base material, it is difficult to form a film laminated in advance on a thin metal coating film layer or a resin layer containing inorganic microparticles into the targeted shape. It is necessary to form the film into the targeted shape in advance, then laminate it onto the thin metal coating film layer or resin layer containing inorganic microparticles. However, when the shape of the reflector is complicated, it is difficult to form a coating film at the worked parts to a uniform thickness.

In the art described in PLT 2, it is possible to coat the primer layer and top layer on an aluminum sheet in advance, then shape it, but with coating by a general precoat coating line, it is extremely difficult to coat that thickness of a primer layer (50 to 100 μm) by a single pass. Two or more passes of overlaid coating are required, so there are the defects of a low productivity etc.

In the arts described in PLT 3 and PLT 4, even if the coating layer is thin, a high diffuse reflectance is obtained. Even with a single pass of coating on a general precoat coating line, a precoated metal sheet having a high diffuse reflectance can be fabricated, but since there is too little binder in the coating layer, there are the defects of poor workability and adhesion. As opposed to this, the art of forming a low pigment concentration layer above and below the high pigment concentration layer, low density layer, and visible light reflection layer so as to improve the workability and adhesion is also disclosed, but this was insufficient for dealing with the formation of the various shapes demanded by customers.

Considering the fact that due to structural and design reasons of electrical products, it is necessary to work reflectors into different shapes. Further, considering the productivity of reflectors and the formability of reflectors, it was difficult to use the reflectors described in PLT 1 to 4 etc.

The present invention, in view of the above situation, has as its object the provision of a coated metal material having a high total light reflectance and superior in formability, a method of production of the same, and a coated metal article.

Solution to Problem

The inventors engaged in in-depth studies to solve the above problem and as a result discovered that by providing at least three coating layers of a primer layer, a middle coat layer, and a top layer, making said middle coat layer include rutile-type titanium oxide, and using a high molecular weight polyester resin as the binder resin for said coating layers, it is possible to fabricate a reflector having a high total light reflectance and formability. They completed the present invention based on this finding. Further, they discovered that by increasing the roughness of the interface between the middle coat layer and the top layer, both a high total light reflectance and a superior formability can be achieved. This finding is also reflected in the present invention. The present invention has the following as its gist.

(1) A coated metal material having at least three coating layers of a primer layer, middle coat layer, and top layer at least at part of a surface of the metal material, wherein said middle coat layer contains rutile-type titanium oxide in a solid volume concentration of 35 to 70%, said middle coat layer uses as a binder resin ingredient a polyester resin A with a number average molecular weight of 19000 to 28000, and a concentration of the polyester resin A in said binder resin ingredient is 20 mass % or more.

(2) A coated metal material as set forth in the above (1), wherein the binder resin ingredient of said middle coat layer contains said polyester resin A and, further, a polyester resin B with a number average molecular weight of 2000 to 6000 and a hydroxyl value of 20 or more and the polyester resin A and the polyester resin B has a mass ratio of 0.25≤polyester resin B/polyester resin A≤4.

(3) A coated metal material as set forth in the above (1) or (2), wherein said rutile-type titanium oxide has a solid volume concentration of 55 to 65%.

(4) A coated metal material as set forth in any one of the above (1) to (3), wherein said rutile-type titanium oxide has an average particle size of 200 to 400 nm.

(5) A coated metal material as set forth in the above (4), wherein said rutile-type titanium oxide has an average particle size of 250 to 350 nm.

(6) A coated metal material as set forth in any one of the above (1) to (5), wherein said polyester resin A has a number average molecular weight of 20000 to 23000.

(7) A coated metal material as set forth in any one of the above (1) to (6), wherein said concentration of the polyester resin A in the binder resin ingredient of the middle coat layer is 40 to 60 mass %.

(8) A coated metal material as set forth in any one of the above (2) to (7), wherein said number average molecular weight of the polyester resin B in the binder resin ingredient of the middle coat layer is 3000 to 4500.

(9) A coated metal material as set forth in any one of the above (2) to (8), wherein said hydroxyl value of the polyester resin B in the binder resin ingredient of the middle coat layer is 40 to 200.

(10) A coated metal material as set forth in any one of the above (2) to (9), wherein said mass ratio of the polyester resin A and the polyester resin B is 0.65≤polyester resin B/polyester resin A≤1.5.

(11) A coated metal material as set forth in any one of the above (1) to (10), wherein said middle coat layer contains, in addition to the rutile-type titanium oxide, particles of a larger particle size and lower refractive index than the rutile-type titanium oxide.

(12) A coated metal material as set forth in the above (11), wherein said particle size of the particles of a lower refractive index is 1 to 10 μm.

(13) A coated metal material as set forth in the above (12), wherein said particle size of the particles of a lower refractive index is 4 to 7 μm.

(14) A coated metal material as set forth in any one of the above (11) to (13), wherein a refractive index difference of said particles of a lower refractive index and said rutile-type titanium oxide is 0.5 or more.

(15) A coated metal material as set forth in the above (14), wherein said refractive index difference is 1 or more.

(16) A coated metal material as set forth in any one of the above (1) to (15), wherein said middle coat layer contains pores of a volume ratio in 0.02 to 1.1 times the solid content.

(17) A coated metal material as set forth in the above (16), wherein said middle coat layer contains pores in a volume ratio of 0.5 to 0.95 time the solid content.

(18) A coated metal material as set forth in any one of the above (1) to (17), wherein said primer layer uses as a binder resin ingredient the polyester resin A with a number average molecular weight of 19000 to 28000 and a concentration of the polyester resin A in said binder resin ingredient is 80 mass % or more.

(19) A coated metal material as set forth in the above (18), wherein the number average molecular weight of the polyester resin A in the binder resin ingredient of said primer layer is 20000 to 23000.

(20) A coated metal material as set forth in the above (18) or (19), wherein the concentration of the polyester resin A in said binder resin ingredient of said primer layer is 90 to 100 mass %.

(21) A coated metal material as set forth in any one of the above (1) to (20), wherein said primer layer contains the rutile-type titanium oxide in a solid volume concentration of 20 to 35%.

(22) A coated metal material as set forth in the above (21), wherein said solid volume concentration of the rutile-type titanium oxide of the primer layer is 22 to 28%.

(23) A coated metal material as set forth in any one of the above (1) to (22), wherein said top layer uses as a binder resin ingredient the polyester resin A with a number average molecular weight of 19000 to 28000 and the concentration of the polyester resin A in said binder resin ingredient is 80 mass % or more.

(24) A coated metal material as set forth in the above (23), wherein the number average molecular weight of the polyester resin A in the binder resin ingredient of said top layer is 20000 to 23000.

(25) A coated metal material as set forth in the above (23) or (24), wherein the concentration of the polyester resin A in said binder resin ingredient of said top layer is 90 to 100 mass %.

(26) A coated metal material as set forth in any one of the above (1) to (25), wherein said top layer contains the rutile-type titanium oxide in a solid volume concentration of 20 to 35%.

(27) A coated metal material as set forth in the above (26), wherein the solid volume concentration of the rutile-type titanium oxide of said top layer is 22 to 28%.

(28) A coated metal material as set forth in any one of the above (1) to (27), wherein said top layer contains a matting agent in a solid volume concentration of 3 to 15%.

(29) A coated metal material as set forth in the above (28), wherein the solid volume concentration of said matting agent is 5 to 12%.

(30) A coated metal material as set forth in the above (28) or (29), wherein said matting agent is silica of a particle size of 3 to 9 μm.

(31) A coated metal material as set forth in the above (30), wherein the particle size of said silica is 4 to 7 μm.

(32) A coated metal material as set forth in any one of the above (1) to (31), wherein a centerline average roughness Ra of an interface of said middle coat layer and said top layer is 0.8 μm or more.

(33) A coated metal material as set forth in any one of the above (1) to (32), wherein a boundary part of said middle coat layer and said top layer has a mixed layer of ingredients in said middle coat layer and ingredients in said top layer mixed together and said mixed layer has a thickness of 3 to 12 μm.

(34) A coated metal material as set forth in the above (33), wherein the thickness of said mixed layer is 6 to 12 μm.

(35) A coated metal material as set forth in any one of the above (1) to (34), wherein a filtered-center line waviness $W_{CA}$ of outermost surface of said coating layer is 2 μm or less.

(36) A coated metal material as set forth in the above (35), wherein said $W_{CA}$ is 0.5 μm or less.

(37) A coated metal material as set forth in any one of the above (1) to (36), wherein an outermost coating film layer of said coating layers contains a silicone resin or fluorocarbon resin.

(38) A coated metal material as set forth in any, one of the above (1) to (37), wherein an outermost coating film layer of said coating layers has a —Si—O—Si— bond in a resin skeleton forming the coating film.

(39) A coated metal material as set forth in any one of the above (1) to (38), wherein said middle coat layer has a thickness of 10 to 110 μm.

(40) A coated metal material as set forth in the above (39), wherein said middle coat layer has a thickness of 60 to 100 μm.

(41) A coated metal material as set forth in the above (40), wherein said middle coat layer has a thickness of 10 to 15 μm.

(42) A coated metal material as set forth in any one of the above (1) to (41), where said top layer has a thickness of 5 to 30 μm.

(43) A coated metal material as set forth in the above (42), wherein said top layer has a thickness of 12 to 22 μm.

(44) A coated metal material as set forth in any one of the above (1) to (43), wherein said primer layer has a thickness of 5 to 30 μm.

(45) A coated metal material as set forth in the above ('44), wherein said primer layer has a thickness of 12 to 22 μm.

(46) A coated metal material as set forth in any one of the above (1) to (45), wherein said coated metal material is a precoated metal sheet.

(47) A method of production of a coated metal material as set forth in any one of the above (1) to (46), wherein at least two layers of said primer layer, said middle coat layer, and said top layer are coated by a multilayer simultaneous coating or wet-on-wet process.

(48) A lighting apparatus using a coated metal material as set forth in any one of the above (1) to (46) for a lighting reflector.

(49) An electronic apparatus using a coated metal material as set forth in any one of the above (1) to (46) for a reflector of a light emitting part or a reflector of an image display part.

ADVANTAGEOUS EFFECTS OF INVENTION

According to the present invention, a coated metal material having a high total light reflectance and superior in formability, a method of production of the same, and a coated metal article can be provided.

BRIEF DESCRIPTION OF DRAWINGS

Below, while referring to the attached drawings, preferred embodiments of the present invention will be explained in detail.

DESCRIPTION OF EMBODIMENTS

Figure 1:
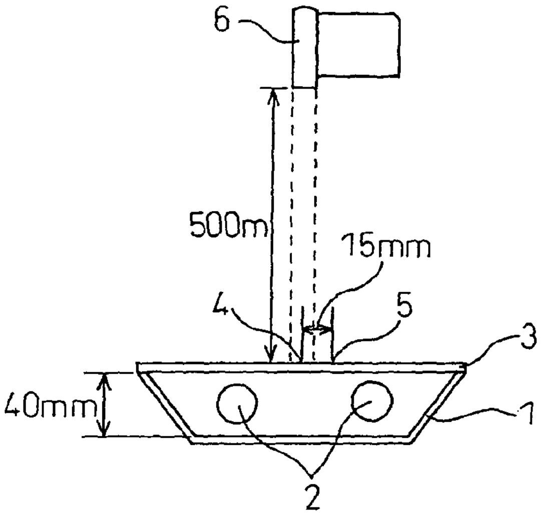
FIG. 1 is a cross-sectional schematic view showing an example of a luminance measurement system used in the examples.

The present invention forms three or more coating layers on a base material and uses these layers to complement the total light reflectance and formability. In particular, it includes rutile-type titanium oxide in the middle coat layer in a high concentration and uses a high molecular weight polyester resin as a binder resin of the coating layers to thereby achieve both a high total light reflectance and formability.

(Basic Constitution of Invention)

The coated metal material of the present invention is a coated metal material comprised of a base material of a metal material on at least part of the surface of which at least three coating layers of a primer layer, a middle coat layer, and a top layer are provided, characterized in that the middle coat layer contains rutile-type titanium oxide in a solid volume concentration of 35 to 70% and in that the middle coat layer contains a polyester resin A with a number average molecular weight of 19000 to 28000.

The "solid volume concentration" in the present invention is the concentration with respect to the volume of the resin ingredient and pigment in the coating film and excludes pores.

(Definition of Layers)

The "primer layer" in the present invention indicates the coating layer at the side closest to the metal material. However, even with a layer at the side closest from the metal material, a coating layer of a thickness of less than 1 μm provided for the purpose of improving the adhesion of the metal material and coating film or improving the corrosion resistance is not considered the "primer layer". The coating layer on top of that is made the "primer layer".

The "top layer" generally indicates the layer exposed at the surface farthest from the base material. However, in the present invention, if the top layer is directly laminated on the surface side of the middle coat layer, it does not necessarily have to be positioned at the outermost layer. A separate coating layer may also be laminated on the surface side of the top layer.

The "middle coat layer", in the case of a three-layer structure, corresponds to the part contiguous with and sandwiched between the primer layer and top layer, but in a four-layer or higher multi-layer structure, all of the layers arranged between the top layer and the primer layer having solid volume concentrations of the rutile-type titanium oxide of 35% to 70% are deemed the "middle coat layer". Further, even if the concentration of rutile-type titanium oxide continuously changes and the boundaries of the layers are indefinite, the entire range satisfying the condition of having a solid volume concentration of the rutile-type titanium oxide of 35% to 70% is defined as the "middle coat layer".

(Constitution of Layers)

Below, the constitutions of the layers will be explained in the order of the primer layer, middle coat layer, and top layer.

(Middle Coat Layer)

First, the constitution of the middle coat layer will be explained.

The essential constituent elements of the middle coat layer are the binder resin comprised of the high molecular weight polyester resin and the added pigment comprised of rutile-type titanium oxide.

Resin

The binder resin requires use of the polyester resin A with a number average molecular weight of 19000 to 28000, as explained above.

The present invention has as its object obtaining a high total light reflectance, so it is necessary to make the concentration of the reflection pigment added to the middle coat layer a solid volume concentration of 35 to 70%, that is, a high pigment concentration. For this reason, with the usually used binder resins, the binder ability connecting pigment particles to each other is insufficient, so there was the problem of a drop in workability. The inventors engaged in in-depth studies of the constitution of a coating layer for securing workability with less binder resin and as a result discovered that a polyester resin, which is superior in adhesion of the pigment and base material, is optimum and further that by making the number average molecular weight 19000 to 28000, a performance superior in balance of ductility and strength is expressed, so by using a polyester resin A with a number average molecular weight of 19000 to 28000, a good workability can be obtained. Usually, a coating using a high molecular weight polyester resin A with a molecular weight of 19000 or more easily becomes higher in viscosity, so to secure a viscosity suited for coating, it is necessary to keep the solid concentration in the coating low. With applications of thick coating as in the present invention, popping easily occurred and application was believed difficult. However, in the present invention, a large amount of rutile-type titanium oxide is added as a reflection pigment, so the concentration of the binder resin becomes relatively low. Therefore, even without lowering the solid concentration in the coating too much, a viscosity suitable for coating can be secured. For this reason, it was discovered that even if using the high molecular weight polyester resin A, popping will not occur, thick coating becomes possible, and both coatability and workability can be achieved.

With a number average molecular weight of the polyester resin A of less than 19000, securing the formability becomes difficult, so this is made the lower limit value. If the number average molecular weight exceeds 28000, the coating film surface becomes too soft and the scratching resistance deteriorates, so this is made the upper limit value. The number average molecular weight of the polyester resin A is preferably 19000 to 26000, most preferably 20000 to 23000.

Note that, the effect is exhibited with a concentration of the polyester resin A with a number average molecular weight of 19000 to 28000 in the binder of 20 mass % or more. The upper limit is 100 mass %. The concentration of the polyester resin A in the binder is preferably 30 to 80 mass %, most preferably 40 to 60 mass %.

Further, the inventors discovered that by having the binder resin of the middle coat layer contain, in addition to the polyester resin A, further a polyester resin B with a number average molecular weight of 2000 to 6000 and a hydroxyl value of 20 or more and by having the polyester resin A and the polyester resin B in a mass ratio of 0.25≤polyester resin B/polyester resin A≤4, further superior formability can be obtained.

The polyester resin A with a number average molecular weight of 19000 to 28000, that is, a high molecular weight, is superior in workability, but the middle coat layer of the present invention has a high pigment concentration, so it is believed that the binder is dispersed between the pigment particles in the structure. In such a structure, even with a high molecular weight polyester resin, the workability tends to become lower compared with the low pigment concentration coating layer, and a further improvement in workability is demanded, so the inventors engaged in in-depth studies and as a result discovered that by combining the high molecular weight polyester resin A and the low molecular weight polyester resin B, a workability can be obtained superior to that of the high molecular weight polyester resin A alone. This is believed because with the high molecular weight polyester resin A alone, the resin cannot sufficiently enter the spaces between particles of the pigment present in the high concentration, the function as a binder becomes insufficient, and the workability may drop, but by combining the high molecular weight polyester resin A and the low molecular weight polyester resin B, the low molecular weight polyester resin B enters between particles of pigment where the high molecular weight polyester resin A cannot enter, functions as a binder between pigment particles or between pigment and high molecular weight polyester resin A, and improves the strength and adhesion of the coating layer as a whole, so superior workability is obtained.

Further, the higher the low molecular weight polyester resin B in hydroxyl value, the greater the number of crosslinking points and the higher the adhesion obtained. This low molecular weight polyester resin B preferably has a number average molecular weight of 2000 to 6000 and a hydroxyl value of 20 or more. If the number average molecular weight is smaller than 2000, the coating film strength is liable to become insufficient and the workability to fall, while if exceeding 6000, the polyester resin has difficulty entering between pigment and pigment, so the effect of improvement of adhesion is liable to fall. The number average molecular weight of the polyester resin B is preferably 2500 to 5000, most preferably 3000 to 4500. Further, if the hydroxyl value is lower than 20, the crosslinking points between pigment particles become fewer and again the effect of improvement of adhesion is liable to fall. From the viewpoint of the coating performance, there is no particular need to set an upper limit value for the hydroxyl value of the polyester resin B, but from the viewpoint of the availability of the resin and the stability of the coating, 200 or less is preferable. The hydroxyl value of the polyester resin B is preferably 30 to 200, most preferably 40 to 200.

If the ratio of mixture of the polyester resin A and polyester resin B is, by mass ratio, 0.25≤polyester resin B/polyester resin A≤4, superior adhesion and workability are obtained.

If said polyester resin B/polyester resin A is smaller than 0.25, the function of the polyester resin B is insufficiently expressed and the adhesion is liable to fall, while if the polyester resin B/polyester resin A is larger than 4, the function of the polyester resin A is insufficiently expressed and the workability is liable to fall. Preferably, the ratio of mixture of the polyester resin A and polyester resin B is 0.4≤polyester resin B/polyester resin A≤2.5, most preferably 0.65≤polyester resin B/polyester resin A≤1.5.

Rutile-Type Titanium Oxide

As the pigment added to the middle coat layer, rutile-type titanium oxide is used. This is because rutile-type titanium oxide has a refractive index higher than that of other pigments and the difference of refractive index from the resin used as a binder and the air can be made larger, so the reflectance at the interface of the pigment and resin and between the pigment and air can be raised. Anatase-type titanium oxide also has a relatively high refractive index, but the photocatalyst ability is high, so when receiving light from a fluorescent lamp or the like, the binder resin ends up being decomposed, so this is not preferable.

The coated metal material having a high total light reflectance of the present invention mainly has as its object the reflection of visible light, so a high total light reflectance in the wavelength band to which the human eye is considered high in sensitivity is important. The human eye, while there are personal differences, can detect 380 to 780 nm wavelength light. This sensitivity peaks near 555 nm. For this reason, it is necessary to strongly reflect light of a wavelength centered around 555 nm, so the particle size of the pigment used has to be selected considering this point.

If the average particle size of the rutile-type titanium oxide used as a pigment is small, the surface area per volume increases and the reflection interfaces become wider, so the total light reflectance also becomes higher, but if the particle size of the pigment becomes too small, light of a long wavelength is passed, so the total light reflectance ends up falling. It is known that when there is a so-called Mie scattering region with large scattering of light in the range of particle size of the same level as the wavelength, and the particle size is about ½ of the wavelength, the light scattering becomes maximum. For this reason, it is preferable to make the average particle size of the rutile-type titanium oxide half of the visible light wavelength, that is, 200 to 400 nm, more preferably 250 to 350 nm.

The "average particle size" of the rutile-type titanium oxide in the present invention is the arithmetical average of the size of remaining particles of rutile-type titanium oxide when observing a portion of the coating film desired to be confirmed under an electron microscope at 10,000× and eliminating the 20% smallest sized particles of the rutile-type titanium oxide shown in the field and the 5% largest sized ones.

The rutile-type titanium oxide particles used in the present invention can be used without particular limitation so long as satisfying the above conditions. Further, the rutile-type titanium oxide particles used in the present invention may be particles of rutile-type titanium oxide alone or may be particles of rutile-type titanium oxide coated with silica, alumina, zirconia, zinc oxide, antimony oxide, organic material, etc. The organic material used for coating rutile-type titanium oxide is not particularly limited, but a polyol-type material, such as pentaerythritol or trimethylolpropane, an alkanolanine-type material, such as triethanolamine or an organic acid salt of triethanolamine, or a silicon-type material, such as a silicone resin or an alkylchlorosilane, may also be used for treatment.

The rutile-type titanium oxide used may be a commercially available one. Specifically, the "Tipaque®" series made by Ishihara Sangyo Kaisha Ltd., the "TA" series made by Fuji Titanium, the "TITANIX®" series made by Tayca, etc. may be used.

The rutile-type titanium oxide in the middle coat layer is made a solid volume concentration of 35% or more. This is because it was discovered that if the solid volume concentration of the rutile-type titanium oxide with an average particle size of 200 to 400 nm exceeds 35%, the volume of the pores formed between the particles will become larger than the volume of the binder resin even if the particles become the closest packed state, so the pores can be included in the coating layer accordingly and a high total light reflectance can be obtained. In other words, air has a refractive index lower than resin, so the interface of the pigment and pores has a larger difference of refractive index than the interface between the pigment and resin and gives a higher reflectance. Further, the interface between the resin and pores can also reflect light, so a high total light reflectance is obtained. When seeking a higher reflection performance, if making the rutile-type titanium oxide with an average particle size of 200 to 400 nm a solid volume concentration of 50% or more, the interface between the rutile-type titanium oxide and pores in the coating film, the interface between the rutile-type titanium oxide and resin and the interface between the resin and pores will efficiently contribute to the total light reflectance and give a high total reflectance, so this is preferred. However, if the solid volume concentration of the rutile-type titanium oxide in the coating film exceeds 70%, the percentages of the rutile-type titanium oxide and pores in the coating film will become too great, securing a continuous coating film by the binder resin will become difficult, and the middle coat layer itself will become brittle, so the solid volume concentration of the rutile-type titanium oxide of the middle coat layer is made 70% or less. The solid volume concentration of the rutile-type titanium oxide more preferable for securing the stable coating film strength is 65% or less. As explained above, in the middle coat layer of the present invention, it is preferable to use rutile-type titanium oxide with an average particle size 200 to 400 nm in a 50 to 65% solid volume concentration. The most preferable solid volume concentration of rutile-type titanium oxide with an average particle size of 200 to 400 nm is 55 to 65%.

Low Refractive Index Particles

If jointly adding low refractive index particles of a larger particle size than rutile-type titanium oxide, the total light reflectance can be efficiently raised, so this is preferable. This is because by adding particles of a further larger particle size than rutile-type titanium oxide, the pores between particles become larger and a greater number of pores can be included. Along with the effect of improvement of the total light reflectance, since the particles of the larger particle size are low refractive index particles, light can be reflected also at the contact interfaces of the contacting sites of the low refractive index particles and titanium oxide and therefore an improvement of the total light reflectance can be contributed to.

The particle size of the low refractive index particles with a larger particle size than rutile-type titanium oxide is preferably 1 μm to 10 μm so as to efficiently include pores in the middle coat layer and further efficiently obtain reflection at the contact interface between the low refractive index particles and titanium oxide and since even if made excessively larger than the particle size of rutile-type titanium oxide, these effects are difficult to obtain. More preferably, the size is 3 μm to 8 μm, most preferably 4 μm to 7 μm.

The low refractive index particles with a larger particle size than the rutile-type titanium oxide included together with the rutile-type titanium oxide so as to further improve the total light reflectance are not particularly limited so long as the particles are of a lower refractive index than rutile-type titanium oxide. Ones with a difference of refractive index with rutile-type titanium oxide of 0.5 or more are preferred and ones with a difference of 1 or more are particularly preferred. Further, ones with no strong absorption of visible light and exhibiting a white color in the powder state are preferred. Specifically, silica, calcium carbonate, barium sulfate, zinc oxide, and other inorganic particles may be used. Further, in addition to them, it is possible to use a resin powder etc. The type of the resin powder is not particularly limited, but use of acrylic, polyester, PTFE powder, etc. is possible.

As explained above, the role of the low refractive index particles with a larger particle size than the rutile-type titanium oxide is to efficiently include pores in the middle coat layer and, further, reflect light at the contact interface between the low refractive index particles and the titanium oxide to give a high reflection, so even in a small amount, an effect commensurate with that amount included can be exhibited. Therefore, there is no need to set a lower limit concentration, but if the (volume of low refractive index particles÷volume of rutile-type titanium oxide) is less than 0.05, the effect of improvement of the total light reflectance due to the addition of the low refractive index particles is small, so a (volume of low refractive index particles÷volume of rutile-type titanium oxide) of 0.05 or more is preferable.

Regarding the upper limit concentration of the low refractive index particles, up to a (volume of low refractive index particles÷volume of rutile-type titanium oxide) of 0.2, along with a rise in the amount of addition, the light reflectance rises and an effect of addition is recognized, but if added over this, it is observed that the performance other than the light reflectance (workability, corrosion resistance, etc.) tends to fall, so a (volume of low refractive index particles÷volume of rutile-type titanium oxide) of 0.2 is made the upper limit concentration of the low refractive index particles.

The (volume of low refractive index particles÷volume of rutile-type titanium oxide) is preferably 0.06 to 0.17, most preferably 0.07 to 0.15.

Further, the low refractive index particles have, in addition to the role of improving the total light reflectance, the role of controlling the roughness of the interface of the middle coat layer and top layer. Details will be explained later.

The preferable range of content of the pores in the middle coat layer is 0.02 to 1.1 times the solid volume since if the content of the pores is less than 0.02 time the solid volume, there will be little effect of improvement of the total light reflectance due to the inclusion of air and since if exceeding 1.1 times the solid volume, the middle coat layer may become brittle and the workability and adhesion may degrade. The ratio of content of pores with respect to the solid volume is more preferably 0.3 to 1.0 times, most preferably 0.5 to 0.95 times.

The size of the pores in the middle coat layer is not particularly limited, but if there are extremely large sized pores, they will result in coating defects. This is not preferable since these will lower the workability, corrosion resistance, and other coating performance. Further, the surface area per volume will become smaller, so this is not preferable from the viewpoint of the light reflectance either. Further, if the size of the pores is small, the surface area per pore volume will become larger and the reflection interface will become broader, so the total light reflectance will also become higher, but if becoming extremely small, long wavelength light will pass, so the total light reflectance will end up falling. From the viewpoint of reflection of light, half of the visible light wavelength, that is, 200 to 400 nm, is preferable. More preferably, pores of 250 to 350 nm are preferable. However, controlling the size of the pores, in particular matching sizes, is difficult, so as long as there is no above-mentioned problem of coating defects etc. or extreme effects on the reflectance, the size of the pores is not particularly made an issue.

The content of the pores in the middle coat layer can be controlled not only by the concentration of the above pigment contained therein, but also for example by controlling the method of dispersion of coating materials. In other words, the better the state of dispersion of the pigment in the coating (the more uniform), the more the pigment adsorbs the resin and the more efficiently pores between the particles are buried, so the smaller the content of pores.

Therefore, to obtain a higher light reflectance, it is preferable to keep the dispersion at the minimum extent not causing problems in coatability or coating stability.

Thickness

The thickness of the middle coat layer is preferably 10 μm or more to obtain a high total light reflectance. When seeking a higher total light reflectance, 40 μm or more is more preferable. On the other hand, if the thickness of the middle coat layer exceeds 80 μm, the coating film is liable to drop in workability. Further, if exceeding 100 μm, there is a possibility of the adhesion also dropping. Therefore, the thickness of the middle coat layer is preferably 110 μm or less, more preferably 100 μm or less. When seeking a higher workability, 15 μm or less is preferable. Due to these, the thickness of the middle coat layer is preferably in the range of 10 to 110 μm. 10 to 100 μm is more preferable. As the thickness of the middle coat layer, from the viewpoint of the reflectance, 40 to 100 μm is more preferable, 60 to 100 μm is further preferable, and 60 to 80 μm is most preferable. On the other hand, from the viewpoint of the workability, 10 to 15 μm is most preferable.

The thicknesses of the middle coat layer and later mentioned primer layer and top layer of the present invention can be measured as follows. In other words, a sample can be cut out at the plane vertical to the coated surfaces of the primer layer, middle coat layer, and top layer and the cross-section observed under an optical microscope or electron microscope so as to find the thicknesses of the layers. Note that, the case where a mixed layer is formed at the later mentioned boundary part of the coating film layer will be explained later.

(Primer Layer)

Next, the constitution of the primer layer will be explained.

The resin used as the binder of the primer layer is not particularly limited, but from the viewpoint of the adhesion with the middle coat layer, the formation of the later explained mixed layer, common use of coating materials, etc., a polyester resin A with a number average molecular weight of 19000 to 28000 the same as the middle coat layer is preferable. If the number average molecular weight of the polyester resin is less than 19000, the workability and adhesion are liable to fall. If the number average molecular weight exceeds 28000, the coating film is liable to become too soft and the scratching resistance to deteriorate. The number average molecular weight of the polyester resin A in the primer layer is preferably 19000 to 26000, most preferably 20000 to 23000.

Note that, when the concentration of the polyester resin A with a number average molecular weight of 19000 to 28000 in the binder is 80 mass % or more, an effect of improvement of the workability and adhesion is exhibited. The concentration of the polyester resin A in the binder of the primer layer is preferably 85 to 100 mass %, most preferably 90 to 100 mass %.

Pigment: Rutile-Type Titanium Oxide

If adding to the primer layer a pigment comprised of rutile-type titanium oxide at a solid volume concentration of 20% to 35%, the reflectance is improved more, so this is preferable. The reason why rutile-type titanium oxide is preferable as the pigment added to the primer layer is that rutile-type titanium oxide has a refractive index higher than other pigments, and the differences in refractive index from the resin used as the binder and the air can be made larger and therefore the reflectances at the interfaces between the pigment and resin and between the pigment and air can be raised. The solid volume concentration of the rutile-type titanium oxide in the primer layer is more preferably 20 to 30%, most preferably 22 to 28%. The average particle size of the rutile-type titanium oxide used in the primer layer is similar to the average particle size of the oxide used in the middle coat layer.

Thickness

Regarding the thickness of the primer layer, the greater the thickness, the higher the workability and adhesion obtained. Further, when adding rutile-type titanium oxide as a reflective pigment, for the reflection performance as well, the greater the thickness, the more advantageous, so it is not necessary to set an upper limit value due to these performances, but if the thickness exceeds 30 μm, popping easily occurs at the time of coating (because unlike a middle coat, the pigment is low in concentration), so the coatability deteriorates. Further, this is not preferable from the viewpoint of coating cost. Therefore, this value is made the upper limit. Further, if the thickness is less than 5 μm, the effect of improvement of the workability, adhesion, and reflection performance by the primer layer becomes smaller, so the thickness of the primer layer is preferably 5 to 30 μm. From the viewpoint of securing stable workability, adhesion, reflection performance, and coatability, the more preferable thickness of the primer layer is 10 to 25 μm, most preferably 12 to 22 μm.

(Top Layer)

Next, the configuration of the top layer will be explained.

The resin used as the binder of the top layer is not particularly limited, but from the viewpoint of the adhesion with the middle coat layer, the formation of a later explained mixed layer, common use of coating materials, etc., a polyester resin A with a number average molecular weight of 19000 to 28000 the same as the middle coat layer is preferable. If the number average molecular weight of the polyester resin is less than 19000, the workability and adhesion are liable to drop. If the number average molecular weight exceeds 28000, the coating film surface is liable to become too soft and the scratching resistance and blocking ability are liable to deteriorate. The number average molecular weight of the polyester resin A in the top layer is preferably 19000 to 26000, most preferably 20000 to 23000.

Note that, if the concentration of the polyester resin A with a number average molecular weight of 19000 to 28000 in the binder of the top layer is the same 80 mass % or more as the primer layer, the effect of improvement of the workability and adhesion is exhibited. The concentration of the polyester resin A in the binder of the top layer is preferably 85 to 100 mass %, most preferably 90 to 100 mass %.

Further, use of a resin the same as the middle coat layer is preferable from the viewpoint of adhesion.

The addition of a pigment in the top layer is not indispensable. Depending on addition or no addition of pigment, type and concentration of pigment added, it is possible to obtain reflection characteristics and other characteristics as required.

First, the case of adding rutile-type titanium oxide to the top layer will be explained. By adding rutile-type titanium oxide to the top layer, the total light reflectance can be improved. A high concentration of the rutile-type titanium oxide is advantageous with respect to the reflection performance, but the greatest role of the top layer is the protection of the entire coated layers. Thus, too brittle coating film is not preferable. The upper limit of the concentration of the rutile-type titanium oxide in the top layer is, from the viewpoint of securing the flexibility of the coating film, preferably a solid volume concentration of 35% or less. The lower limit concentration does not have to be particularly limited. Therefore, including the case where no rutile-type titanium oxide at all is included, the concentration of the rutile-type titanium oxide in the top layer is a solid volume concentration of 0 to 35%. Further, when seeking a higher total light reflectance, making the concentration of the rutile-type titanium oxide a solid volume concentration of 20 to 35% enables achievement of both the ability to protect the entire coated layers and a higher reflection performance by the top layer at a high level. When adding rutile-type titanium oxide to the top layer, the solid volume concentration of the rutile-type titanium oxide at the top layer is more preferably 20 to 30%, most preferably 22 to 28%. The average particle size of the rutile-type titanium oxide used at the top layer is similar to the average particle size of one used at the middle coat layer.

Regarding the thickness of the top layer when adding rutile-type titanium oxide to the top layer, the greater the thickness, the higher the workability, adhesion, and total light reflectance obtained. However, if the thickness exceeds 30 μm, popping easily occurs at the time of coating so the coatability deteriorates. This is also not preferable from the viewpoint of coating costs. Further, if the thickness is less than 5 μm, the effect of improvement of the workability, adhesion, and total light reflectance by the top layer becomes smaller, so making the thickness of the top layer 5 to 30 μm is preferable. From the viewpoint of securing stable workability, adhesion, total light reflectance, and coatability, the more preferable thickness of the top layer is 10 to 25 μm, most preferably 12 to 22 μm.

In addition to rutile-type titanium oxide, a matting agent may be added to the top layer. By adding a matting agent to the top layer in a solid volume concentration of 3 to 15%, it is possible to obtain reflection characteristics with almost no regular reflection component while with the same total light reflectance as when not using a matting agent. When using a high reflection coated metal sheet having such a reflection characteristic as the reflector of a lighting apparatus, constant reflection light is obtained without regard to the distance from or angle with the light source, so even if the number of light sources is small or the distances between them are great, uniform reflected light can be obtained. However, due to the addition of the matting agent, fine relief shapes are formed on the surface of the top layer, and dirt easily builds up at these fine relief and is difficult to remove by wiping etc., so the dirt resistance is liable to fall. A solid volume concentration of the matting agent of the top layer of 5 to 12% is preferable. In the present invention, the matting agent used is not particularly limited, but silica with a particle size of 3 to 9 μm is suited. A particle size of the silica of 4 to 7 μm is preferable.

The range of thickness of the top layer when adding a matting agent to the top layer in a solid volume concentration of 3 to 15% is the same as the top layer to which the rutile-type titanium oxide is added, and 5 to 30 μm is preferable. If the thickness exceeds 30 μm, popping easily occurs at the time of coating so the coatability deteriorates. This is also not preferable from the viewpoint of coating costs. Further, if the thickness is less than 5 μm, the effect of improvement of the workability and adhesion by the top layer and reflection characteristics with almost no regular reflection component cannot be obtained any more. From the viewpoint of securing stable workability, adhesion, reflection characteristics, and coatability, the more preferable thickness of the top layer to which the matting agent is added is 10 to 25 μm, most preferably 12 to 22 μm.

As explained later, by coating by a multilayer simultaneous coating or wet-on-wet process, a mixed layer of a slight mixture of the coatings is formed at the interface of the coating film layers, but this mixed layer enables the adhesion between the coating film layers to be improved, so this is more preferred.

Next, the method of measurement of the volume concentration in the coating film of the present invention will be explained.

The solid volume concentration of the rutile-type titanium oxide in the coating films can be measured as follows.

First, the coating layer to be measured is shaved off from the sample for each layer such as the top layer, middle coat layer, and primer layer and the area A1 and mass M1 of the shaved off coating film are measured. Next, the shaved off coating film is heated at 500° C. for 1 hour to cause the resin ingredient to be decomposed. The part remaining without being decomposed may be considered the rutile-type titanium oxide: The mass M2 thereof is measured. The density of a general rutile-type titanium oxide pigment is about 3800 to 4200 $kg \cdot m^{-3}$, so the density of the rutile-type titanium oxide pigment is regarded as 4000 $kg \cdot m^{-3}$. The density of a general polyester resin is about 1150 to 1250 $kg \cdot m^{-3}$, so the density of the polyester resin is regarded as 1200 $kg \cdot m^{-3}$. The volume V1 of the polyester resin is found as $V1=(M1-M2)\div 1200\ kg \cdot m^{-3}$, while the volume V2 of rutile-type titanium oxide is found as $V2=M2\div 4000\ kg \cdot m^{-3}$. From the volume V1 of the polyester resin and the volume V2 of rutile-type titanium oxide found in this way, the volume concentration C1 of the rutile-type titanium oxide can be found as $C1=V2\div(V1+V2)\times 100$ (vol %).

The pore volume in the coating film can be found in the following way.

A sample is cut out at the plane vertical to the coated surfaces and the cross-section is observed under an optical microscope or electron microscope so as to find the thickness T1. The thickness T2 in the case of no pores is found by $T2=(V1+V2)/A1$.

The pore volume V3 can be found by $V3=(V1+V2)\times(T1-T2)/(T1+T2)$.

When a mixed layer where the coatings are mixed slightly at the interface of the coating film layers is formed, the interface is defined as follows for evaluation and measurement of the properties of the coating films. Due to the difference in the concentration of the Ti pigment between the adjoining top layer and middle coat layer or the middle coat layer and primer layer, using GDS (glow discharge spectrometer) or other analysis technique enabling measurement of the element concentration, measurement of the distribution of Ti in the depth direction is carried out and the concentration of Ti at the different layers is determined. The position of the average Ti concentration of the upper layer Ti concentration and lower layer Ti concentration of the Ti concentration gradient section observed near the interface of the adjoining coating film layers is defined as the interface.

In the case of a system where the middle coat layer includes low refractive index particles, the volume ratio of the low refractive index particles to the rutile-type titanium oxide can be found by a similar operation as when finding the volume concentration of the rutile-type titanium oxide if the low refractive index particles are an inorganic pigment. For differentiating the low refractive index particles from the rutile-type titanium oxide, it is possible to use an acid or other chemical not dissolving the rutile-type titanium oxide in the heated residue and dissolving only the low refractive index particles so as to dissolve only the low refractive index particles and find the mass of the low refractive index particles from the difference between the residue after dissolution and residue after heating. From this and the density of low refractive index particles, it is possible to find the volume of low refractive index particles.

When the low refractive index particles are completely different in electron beam transmission from the rutile-type titanium oxide, as is the case with resin beads, there is a method of observing the cross-section of the coating layer by a scanning electron microscope or thinly shaving off the coating layer by a microtome etc. and observing this by a transmission electron microscope. Specifically, it is possible to count the numbers of rutile-type titanium oxide and low refractive index particles observed in the field. However, if the number is small, the error becomes large, so at the very least it is necessary to count the number in the range of 100 or more particles of rutile-type titanium oxide.

Further, when the low refractive index particles have an electron beam transmittance not that different from rutile-type titanium oxide and under a scanning electron microscope or transmission electron microscope, the difference of the low refractive index particles and rutile-type titanium oxide is hard to determine, it is possible to confirm the composition of elements at the cross-section and find the ratios of the rutile-type titanium oxide and other low refractive index particles from the composition. The element composition may be confirmed by EPMA (electron probe microanalyzer), GDS (glow discharge spectrometer), etc.

(Regarding Roughness of Interface of Middle Coat Layer and Top Layer)

In the coated metal material of the present invention, a centerline average roughness Ra of the interface of the middle coat layer and the top layer of 0.8 μm or more is preferable. In this way, by increasing the Ra of the interface between the middle coat layer and the top layer, it is possible to improve the adhesion between the middle coat layer and the top layer. Further, the interface between the middle coat layer and the top layer becomes rough and the surface area becomes larger, so the diffuse reflectance can be improved. The upper limit of the centerline average roughness Ra at the interface of the middle coat layer and top layer is 4 μm. If the Ra exceeds 4 μm, the relief at the outermost surface becomes larger and there is a possibility of the dirt resistance deteriorating. The Ra is preferably 1.1 μm or more, more preferably, 1.6 μm or more.

(Method of Control of Ra of Interface)

The Ra of the interface between the middle coat layer and the top layer can be controlled by the coating method of the middle coat layer and top layer, the concentration of the pigment (rutile-type titanium oxide) in the middle coat layer, the types of pigment of the middle coat layer (rutile-type titanium oxide, silica or other low refractive index particles etc.), the low shear viscosities or surface tensions etc. of the middle coat layer and top layer forming coatings, etc.

Specifically, as the method for increasing the Ra of the interface of the middle coat layer and the top layer, there are, among others, the methods of:

(1) using a so-called wet-on-wet method or multilayer simultaneous coating method of laminating the middle coat layer forming coating and the top layer forming coating in the undried state, (2) increasing the pigment in the middle coat layer (rutile-type titanium oxide etc.) over the concentration of pigment in the top layer, (3) adding particles (silica etc.) of a large particle size to the middle coat layer, (4) lowering the low shear viscosity of the middle coat layer forming coating, and (5) reducing the difference of the surface tension of the middle coat layer forming coating and the top layer forming coating.

Regarding the above (1), by laminating the middle coat layer forming coating and the top layer forming coating in the undried state, the rutile-type titanium oxide particles diffuse from the middle coat layer to the top layer, so the Ra of the interface becomes larger. In this case, by making the concentration of the rutile-type titanium oxide in the middle coat layer high, as in (2), and in particular making the oxide have a concentration such that the volume of the pores formed among the particles greater than the volume of the binder resin even in the state where the particles are closest-packed and the pores can be included in the coating layer accordingly, the rutile-type titanium oxide more easily diffuses to the top layer, so the Ra of the interface becomes further larger.

Regarding the above (3), by adding particles of a large particle size in the middle coat layer and causing the large particle size to be present near the interface of the middle coat layer and top layer, relief shapes due to the large particle size particles are formed at the interface, so the Ra of the interface becomes larger. In this case, as in (1), by laminating the middle coat layer forming coating and the top layer forming coating in the undried state, the large particle size particles diffuse from the middle coat layer to the top layer, so the large particle size particles easily concentrate near the interface of the middle coat layer and top layer.

Regarding the above (4), by lowering the low shear viscosity of the middle coat layer forming coating, the rutile-type titanium oxide in the middle coat layer easily diffuses to the top layer, so the Ra of the interface becomes larger. In other words, according to the findings of the inventors, a coating, in which microparticles (in this case, rutile-type titanium oxide) are added in a concentration such that the volume of the pores formed among the particles becomes larger than the volume of the binder resin, after drying and curing, even if the particles are in the closest-packed state, and the pores can be included in the coating layer accordingly, becomes a non-Newtonian fluid generally called a high concentration dispersion coating, which is a coating having a so-called shear thinning property where the viscosity is high at a low speed and the viscosity is low at a high speed when measuring the viscosity by a rotary viscosimeter. The coating workability when coating such a coating on the base material is greatly affected by the viscosity at a high speed, while the film flow of the coating during a step of drying and baking for curing the coated film is greatly affected by the viscosity at a low speed. Therefore, for control of the Ra of the interface of the middle coat layer and top layer, adjustment of the low shear coating viscosity becomes important.

Regarding the low shear coating viscosity, this can be adjusted by changing the amount of solvent in the coating and the coating storage conditions (storage temperature and storage time). As the storage conditions of the coating, the higher the storage temperature and further the longer the storage time, the greater the dispersion of the pigment in the coating and the lower the thixotropy, so the low shear coating viscosity is improved. Furthermore, it is also possible to add a dispersant, structural tackifier, or other additive to the coating so as to adjust the low shear coating viscosity.

Regarding the above (5), if reducing the difference in surface tension between the middle coat layer forming coating and top layer forming coating, laminating the coatings in the undried state, and simultaneously drying and baking to cure them, the Ra of the interface becomes larger. However, the difference in surface tension between the middle coat layer forming coating and the top layer forming coating cannot be defined in general since the suitable value differs depending on the types of the resins of the different layers, the types of the solvents, etc. It is necessary to investigate this in advance and determine the optimum value for each coating. The surface tension of the coating can be adjusted by using a leveling agent or antifoaming agent or other additive generally called a surfactant, but it may also be adjusted by changing the type of the solvent.

When making the centerline average roughness Ra of the interface between the middle coat layer and top layer 0.8 μm or more, as an effective method for this, for example, the method of adding rutile-type titanium oxide with a particle size of 200 nm to 400 nm to the middle coat layer forming coating to give more than the concentration, with respect to the volume of the coating film after drying, such that the volume of the pores formed among the particles becomes larger than the volume of the binder resin even when the particles are in the closest-packed state and the pores can be included in the coating layer accordingly, laminating this middle coat layer forming coating and top layer forming coating in the undried state, and simultaneously drying and curing the same in the laminated state may be mentioned. By adding the closest packing or more of rutile-type titanium oxide into the middle coat layer forming coating and laminating this in the undried state with the top layer forming coating, a gradient of concentration of rutile-type titanium oxide particles forms in the coating film layer and the rutile-type titanium oxide particles in the middle coat layer diffuses to the top layer side. Further, heat is added in the drying and curing steps, and this heat remarkably acts as a driving force making the rutile-type titanium oxide diffuse. On the other hand, heating at the drying and curing steps causes a cross-linking reaction of the resin forming the coating film, so there is the action of suppressing the action of interlayer diffusion of the rutile-type titanium oxide particles. For this reason, the interface of the middle coat layer and the top layer becomes rough and the Ra becomes larger.

Further, by providing the middle coat layer as the underlying coating film layer for the top layer, the Ra of the interface of the middle coat layer and the top layer can be 0.8 μm or more, but as in the above (4), the control of the Ra of the interface of the middle coat layer and the top layer is greatly affected by the low shear coating viscosity. By lowering the low shear coating viscosity, it is possible to further increase the Ra of the interface of the middle coat layer and the top layer.

(Mixed Layer)

In the coated metal material of the present invention, by coating the middle coat layer forming coating and the top layer forming coating by the wet-on-wet method or multilayer simultaneous coating method, sometimes a mixed layer is formed where the coatings slightly mix at the interface of the coating film layers and the ingredients in the middle coat layer and the ingredients in the top layer mix. In this case, due to the mixed layer present at the boundary part of the middle coat layer and the top layer, it is possible to improve the adhesion between the middle coat layer and the top layer. Further, in the case of the precoated metal material, sometimes the total light reflectance of the coated metal material falls due to the working after coating, but the presence of the mixed layer improves the adhesion, so the drop in the total light reflectance after working can be suppressed.

(Definition of Mixed Layer)

The "mixed layer" in the present invention means the layer formed by the ingredients of the middle coat layer and top layer diffusing together where the ingredients of the different layers are mixed at the boundary part of the middle coat layer and the top layer and the concentrations of the ingredients of the layers of the middle coat layer and the top layer continuously change. More specifically, if focusing on the rutile-type Titanium oxide, when the Ti concentration in the middle coat layer is "x" and the Ti concentration in the top layer is "y", the part where the Ti concentration is in the range of [x+0.05x(x−y)] to [y−0.05x(x−y)] is defined as the "mixed layer".

(Definition of Interface)

When the mixed layer as set forth above is formed, the interface between the middle coat layer and the top layer is defined in the following way and the properties of the coating film layers are evaluated and measured. For example, the concentration of the pigment, such as rutile-type titanium oxide, differs between the adjoining middle coat layer and top layer, so GDS (glow discharge spectrometer) or another analytic technique enabling measurement of the concentration of elements is used to measure the distribution of Ti in the depth direction of the coating film layer and determine the concentration of Ti of the different layers. In the gradient of Ti concentration observed near the interface of the adjoining coating film layers, the position of the average Ti concentration between the Ti concentration of the middle coat layer and the Ti concentration in the top layer is defined as the interface of the middle coat layer and top layer.

Note that, a mixed layer is sometimes formed between the primer layer and the middle coat layer. In this case as well, the definition of the mixed layer and the definition of the interface are similar to the mixed layer between the middle coat layer and top layer.

When the middle coat layer includes low refractive index particles, the volume ratio of the low refractive index particles to the rutile-type titanium oxide can be found by a similar procedure to when finding the volume concentration of the rutile-type titanium oxide if the low refractive index particles are for example an inorganic pigment. For differentiating the low refractive index particles from the rutile-type titanium oxide, it is possible, for example, to use an acid or other chemical not dissolving the rutile-type titanium oxide in the heated residue and dissolving only the low refractive index particles so as to dissolve only the low refractive index particles and find the mass of the low refractive index particles from the difference between the residue after dissolution and residue after heating. From this mass and the density of low refractive index particles, it is possible to find the volume of low refractive index particles.

On the other hand, when the low refractive index particles are completely different in electron beam transmission from the rutile-type titanium oxide such as resin beads, there is a method of observing the cross-section of the coated film layer by a scanning electron microscope or thinly shaving off the coated film layer by a microtome etc. and observing this by a transmission electron microscope. Specifically, it is possible to count the numbers of rutile-type titanium oxide and low refractive index particles observed in the field. However, if the number is small, the error becomes large, so at the very least it is necessary to count the number in the range of 100 or more particles of rutile-type titanium oxide.

Further, when the low refractive index particles have an electron beam transmittance not that different from rutile-type titanium oxide and under a scanning electron microscope or transmission electron microscope, the difference of the low refractive index particles and rutile-type titanium oxide is hard to determine, it is possible to confirm the composition of elements at the cross-section of the coated film layer and find the ratios of the rutile-type titanium oxide and other low refractive index particles from the composition confirmed. The element composition may be confirmed by EPMA (electron beam microanalyzer), GDS (glow discharge spectrometer), etc.

(Thickness of Mixed Layer)

In the present invention, when the above-mentioned mixed layer is present, this mixed layer preferably has a thickness of 3 μm to 12 μm. When the thickness of the mixed layer is less than 3 μm, the effect of improvement of the adhesion between the middle coat layer and the top layer by the mixed layer is liable to be unable to be stably obtained. On the other hand, if the thickness of the mixed layer exceeds 12 μm, it becomes difficult to sufficiently secure the thicknesses of the coating films of the middle coat layer and top layer sharing the necessary functions. For this reason, when the top layer is the outermost layer, defects in appearance easily occur due to the insufficient thickness of the outermost layer and otherwise maintenance of the performances of the middle coat layer and top layer themselves becomes difficult. Further, the performances of the layers end up becoming substantially the same as a coating film layer formed by a coating where the middle coat layer forming coating and the top layer forming coating are mixed together, so the required inherent performances of the middle coat layer and the top layer cannot be obtained. The thickness of the mixed layer is more preferably 4 to 12 μm, most preferably 6 to 12 μm. Note that, control of the thickness of the mixed layer to a thickness exceeding 12 μm is substantially difficult.

(Method of Measurement of Thickness of Mixed Layer)

The thickness of the mixed layer can be found by analyzing the state of distribution of an ingredient included only in either of the middle coat layer or top layer in the thickness direction. As the method of analysis, a known analysis method may be used. For example, an X-ray probe microanalyzer, electron probe microanalyzer (EPMA), X-ray photoelectron spectrometry (XPS), Auger electron spectrometry (AES), glow discharge spectrometry (GDS), etc. may be utilized to analyze the concentration of an element in the depth direction of the coating film or the ingredients in the cross-section of the coating film may be analyzed to find the thickness of the mixed layer from the distribution of concentration of ingredients covered. The type or method of analysis of ingredients applied may be suitably selected in accordance with the thickness, amounts of ingredients, etc. In addition to EPMA, XPS, AES, and GDS, any method enabling analysis of ingredients in the depth direction may be suitably selected. Note that as the ingredient able to be used for analysis of the mixed layer, one other than Ti may also be used.

(Method of Control of Thickness of Mixed Layer)

The thickness of the mixed layer can be mainly controlled by the coating method and the baking time. As the coating method, by employing the wet-on-wet method or the multilayer simultaneous coating method, a mixed layer can be easily formed. Further, by increasing the baking time, the time for forming the mixed layer can be made sufficiently long, so the thickness of the mixed layer can be increased. Specifically, by using the baking time of 60 seconds to 180 seconds or so, the thickness of the mixed layer can be made 3 μm to 12 μm.

Further, to form a stable mixed layer, it is preferable to control the difference ($\Delta\sigma=\sigma2-\sigma1$) of the surface tension ($\sigma1$) of the middle coat layer forming coating forming the mixed layer and the surface tension ($\sigma2$) of the top layer forming coating forming the mixed layer to 0.5 to 8 mN/m, preferably 1 to 6 mN/m, most preferably 1.5 to 4 mN/m and to control the difference ($\Delta\varphi=\varphi2-\varphi1$) of the viscosity ($\varphi1$) of the middle coat layer forming coating forming the mixed layer and the viscosity ($\varphi2$) of the top layer forming coating forming the mixed layer to −100 to 4000 mPa·s, preferably 0 to 3000 mPa·s, most preferably 100 to 2000 mPa·s. In this way, by adjusting the relationship between the surface tensions and viscosities of the middle coat layer and top layer coatings forming the mixed layer to suitable values in the above conditions in accordance with the types of the coatings or the coating conditions, it becomes possible to form a stable mixed layer, control the thickness thereof, and further control the outermost surface shape.

In other words, by $\Delta\sigma$ being 8 mN/m or less or $\Delta\varphi$ being 4000 mPa·s or less, formation of a mixed layer of a sufficient thickness becomes possible, so the interlayer adhesion is improved more. On the other hand, by $\Delta\sigma$ being 0.5 mN/m or more or $\Delta\varphi$ being −100 mPa·s or more, the thicknesses of the middle coat layer and the top layer become sufficient, the outermost surface shape becomes suitable, and stabler performance can be secured. Note that, in the present invention, the surface tension of the coating can be measured by the platinum ring lifting method at 20° C. Further, the coating viscosity can be measured using a Brookfield viscometer at 20° C. and 6 rpm.

To adjust the surface tension of the coating, utilization of a surfactant (including an antifoaming agent and leveling agent) is preferable. As the surfactant, a known one may be used. As commercially available ones, BYK-333 or BYK-307 of BYK or the Emulgen of Kao, etc. are known, but there are many others as well. These may be suitably added in accordance with the coating ingredients. Further, the surface tension of the coating may also be adjusted by dilution, mixing another solvent, or another method other than use of a surfactant. Note that, if the surface tension is too large, there is a possibility of the coatability deteriorating, so the preferable surface tensions of the middle coat layer coating and the top layer coating are 40 mN/m or less. The surface tension of the top layer coating is more preferably 38 mN/m or less, most preferably 36 mN/m or less.

For adjusting the viscosity of the coating, utilization of a thickener (including a rheology modifier or a viscosity modifier) is preferable. As the thickener, a known one may be used. As commercially available ones, BYK-411 and BYK-425 of BYK, etc. are known, but there are many others as well. These may be suitably added in accordance with the coating ingredients. Further, the viscosity of the coating may also be adjusted by dilution, mixing another solvent, increasing the ratio of the solid content, or another method other than using a thickener.

The thickness of the mixed layer may also be controlled by adjusting the difference in the concentration of the pigment in the middle coat layer coating and the concentration of the pigment in the top layer coating. In other words, if increasing the difference of the pigment concentration, the rate of diffusion of the pigment from the middle coat layer to the top layer becomes faster, so before the middle coat layer coating and the top layer coating dry and cure, a mixed layer of a sufficient thickness can be formed.

(Regarding Waviness of Outermost Surface)

In the coated metal material of the present invention, the filtered center line waviness $W_{CA}$ of the outermost surface of the coating layer is preferably 2 μm or less. In this way, by making the $W_{CA}$ of the outermost surface of the coating layer smaller, it is possible to improve the image clarity of the coated metal material. Further, a smooth surface free of fine relief can be obtained. Therefore, the coated metal material surface is resistant to buildup of dirt, so the dirt resistance can be improved. If the $W_{CA}$ of the outermost surface of the coating layer exceeds 2 μm, the image clarity and dirt resistance are liable to fall. The more preferable range of the $W_{CA}$ of the outermost surface of the coating layer is 1 μm or less, most preferably 0.5 μm or less. On the other hand, the preferable lower limit value of the $W_{CA}$ of the outermost surface of the coating layer does not have to be particularly defined, but controlling a $W_{CA}$ of the outermost surface of the coating layer to less than 0.2 μm is substantially difficult.

The "outermost surface of the coating layer" as used herein means the surface of the outermost coating film layer of the coated layers. The "outermost coating film layer" means the top layer in the present invention or, when a further coating film layer is laminated at the surface side of the top layer, the further coating film layer, as explained above.

(Method of Control of $W_{CA}$ of Outermost Surface)

The $W_{CA}$ of the outermost surface of the coating layer changes due to the effect of the Ra of the interface of the middle coat layer and the top layer. Therefore, the $W_{CA}$ of the outermost surface of the coated layers can be mainly controlled by the coating method and the low shear coating viscosity. Specifically, by using, as the coating method, the wet-on-wet method or the multilayer simultaneous coating method, rutile-type titanium oxide diffuses from the middle coat layer to the top layer, so the Ra of the interface between the middle coat layer and the top layer becomes larger and the $W_{CA}$ of the outermost surface of the coated layers becomes larger. Further, by lowering the low shear viscosity of the middle coat layer forming coating, the rutile-type titanium oxide in the middle coat layer easily diffuses to the top layer, so the Ra of the interface becomes larger and the $W_{CA}$ of the outermost surface of the coated layers also becomes larger.

As explained above, it is preferable to increase the Ra of the interface of the middle coat layer and the top layer and to reduce the $W_{CA}$ of the outermost surface of the coated layers, so it is preferable to consider the balance of the two and determine a suitable value of the low shear viscosity of the middle coat layer forming coating.

(Imparting Water Repellency and Oil Repellency to Outermost Coating Film)

In the coated metal material of the present invention, the outermost coating film layer of the coated layers formed on the metal material may contain a silicone resin or fluorocarbon resin. The "outermost coating film layer" as used herein means the top layer when that top layer is formed at the outermost layer and means a further coating film layer when the further coating film layer is formed on the surface side of the top layer. When applying the present invention to a precoated metal sheet, the possibility of a drop in the total light reflectance due to deposition of dirt etc. at the time of working is conceivable. As opposed to this, by using a silicone resin or fluorocarbon resin as part or all of the binder of the outermost coating film layer of the coated metal material of the present invention, it is possible to impart oil repellency and water repellency to the coating film surface. In this way, by making the surface of the outermost coating film layer oil repellent and water repellent, the surface of the coating film becomes resistant to dirt and a drop in the total light reflectance can be suppressed, so this is preferred.

As the method of introducing a silicone resin or fluorocarbon resin to the outermost coating film layer, there is the method of adding the silicone resin or fluorocarbon resin to the outermost coating film layer and the method of using a resin containing a silicone resin or fluorocarbon resin as the main resin.

As the silicone resin added to the outermost coating film layer, among the commercially available ones, for example, "BYK®-306", "BYK®-378", etc. made by BYK are known, while as the fluorocarbon resin added to the outermost coating film layer, among the commercially available ones, for example, "BYK®-340" etc. made by BYK are known, but there are many other types as well. These may be suitably added in accordance with the coating ingredients.

As the main resin containing the silicone resin or fluorocarbon resin, a commercially available silicone-acryl copolymer resin (for example, the "Symac®" series or "Reseda®" series made by Toagosei, "SQ®100" etc. made by Tokushiki) or commercially available silicone-fluorocarbon copolymer resin (for example, "ZX-001" etc. made by Fuji Kasei Kogyo) may be used.

The above silicone-acryl copolymer resin or silicone-fluorocarbon copolymer resin may, as needed, be cross-linked by a generally known cross-linking agent, for example, isocyanate or melamine resin. In this case, as the isocyanate, a generally available one, for example, the "Sumidur®" series or "Desmodur®" series made by Sumika Bayer, the "Takenate®" series made by Mitsui Takeda Chemical, etc. may be used. As the melamine resin, a generally commercially available one, for example, the "Cymel®" series and "Mycoat®" series made by Mitsui Cytec, the "Beckamine®" series and the "Super Beckamine®" series made by Dainippon Ink & Chemicals, etc. may be used.

As described above, a coated metal material including a silicone resin or fluorocarbon resin in the outermost coating film layer is suitable for not only applications for reflectors of lighting apparatuses, but also applications such as ceilings, wall materials, etc. of rooms. When applying a coated metal material including a silicone resin or fluorocarbon resin in the outermost coating film layer to applications such as ceilings, wall materials, etc. of rooms, it is possible to brighten the insides of the rooms with less light since the ceilings and wall materials themselves in the rooms perform the role of reflectors.

(Imparting Hydrophilicity to Outermost Coating Film)

In the coated metal material of the present invention, the outermost coating film layer of the coated layers formed on the metal material may have —Si—O—Si— bonds in the resin skeleton forming the coating film. The "outermost coating film layer" means the top layer when the top layer is formed at the outermost layer and means a further coating film layer when the further coating film layer is laminated on the surface side of the top layer. Further, the Si in the —Si—O—Si— bonds are derived from an alkoxysilane or a hydrolyzed condensate of alkoxysilane.

When applying the present invention to a precoated metal sheet, there may be the possibility of a drop in total light reflectance due to adhesion of dirt at the time of working etc. As opposed to this, by forming —Si—O—Si— in the outermost coating film of the coated metal material of the present invention, that is, by including therein Si derived from an alkoxysilane or a hydrolyzed condensate of alkoxysilane, it is possible to impart hydrophilicity to the coating film surface without detracting from the surface luster or the workability. In this way, by making the surface of the outermost coating film layer hydrophilic, wiping off foreign matter stuck on the coating film surface by water etc. becomes easier and the drop in total light reflectance can be suppressed, so this is preferred.

To form —Si—O—Si— bonds in the resin skeleton forming the coating film, it is sufficient to add an alkoxysilane or a hydrolyzed condensate of alkoxysilane in the coating material for forming the outermost coating film layer. As the alkoxysilane used therefor, a generally known one, for example, tetramethoxysilane, tetraethoxysilane, tetrapropoxysilane, tetrabutoxysilane, methyltrimethoxysilane, methyltriethoxysilane, ethyltrimethoxysilane, ethyltriethoxysilane, dimethoxydiethoxysilane, dimethoxydipropoxysilane, etc. may be mentioned. Further, as the hydrolyzed condensate of alkoxysilane, for example, hydrolyzed condensates of the above-exemplified alkoxysilanes may be mentioned.

As described above, a coated metal material in the outermost coating film of which —Si—O—Si— bonds are formed is suitable for not only applications for reflectors of lighting apparatuses, but also applications such as ceilings, wall materials, etc. of rooms. When applying a coated metal material in the outermost coating film of which —Si—O—Si— is formed to applications such as ceilings, wall materials, etc. of rooms, it is possible to brighten the insides of the rooms with less light since the ceilings and wall materials themselves in the rooms perform the role of reflectors.

(Thickness of Outermost Coating Film Layer)

When the coated metal material of the present invention further has an outermost coating film layer (for example, the above-mentioned coating film layer containing a silicone resin or fluorocarbon resin or coating film layer having —Si—O—Si— bonds in the resin skeleton forming the coating film) at the surface side of the top layer, the thickness of this outermost coating film layer is not particularly limited so long as the thickness is of an extent able to give the above-mentioned water repellency, oil repellency, hydrophilicity, or other characteristics, but preferably the thickness of the outermost coating film layer is 1 μm to 25 μm. If the thickness of the outermost coating film layer is less than 1 μm, there is a possibility of the water repellency, oil repellency, and hydrophilicity becoming insufficient, while if exceeding 25 μm, there is a possibility of the workability deteriorating. Further, this is not preferable from the viewpoint of costs. The thickness of the outermost layer in this case is more preferably 1 to 15 μm, most preferably 2 to 7 μm.

(Base Material (Metal Material))

For the metal material used as a base material in the present invention, a generally known metal material may be used. The metal material may also be an alloy material. For example, steel sheet, stainless steel sheet, aluminum sheet, aluminum alloy sheet, titanium sheet, copper sheet, etc. may be mentioned. These materials may be plated on their surfaces. As the types of plating, galvanization, aluminum plating, copper plating, nickel plating, etc. may be mentioned. Alloy plating is also possible. In the case of steel sheet, hot dip galvanized steel sheet, electrolytic galvanized steel sheet, zinc-nickel alloy plated steel sheet, hot dip galvannealed steel sheet, aluminum plated steel sheet, aluminum-zinc alloy plated steel sheet, and other generally known steel sheet and plated steel sheet may be used.

If the surface of the metal material used in the present invention is treated by generally known chemical conversion treatment, the adhesion between the metal material and the coated film layer is improved, so this is more preferable. For the treatment, zinc phosphate treatment, coated chromate treatment, electrolytic chromate treatment, reaction chromate treatment, chromate-free treatment, etc. may be used. As the chromate-free treatment, treatment by an aqueous solution containing a silane coupling agent, zirconium compound, titanium compound, tannin or tannic acid, resin, and silica, etc. is known. The known art described in JP 53-9238 A, JP 9-241576 A, JP 2001-89868 A, JP 2001-316845 A, JP 2002-60959 A, JP 2002-38280 A, JP 2002-266081 A, JP 2003-253464 A, etc. may also be used. For such treatment, a commercially available treatment agent, for example, the chromate treatment agent "ZM-1300AN" made by Nihon Parkerizing, the chromate-free treatment gent "CT-E300N" made by Nihon Parkerizing, the trivalent chrome-based treatment agent "Surfcoat® NRC1000" made by Nippon Paint, etc. may be used.

(Regarding Post-Coated Metal Material)

In the above explanation, the present invention was mainly explained based on the example of application to a precoated metal material, but the present invention is not limited to a precoated metal material and may also be applied to a post-coated metal material. In the case of a post-coated metal material, unlike the precoated metal material, workability, adhesion, etc. are not necessarily required, but when used as a reflector, a high total light reflectance is required.

In the case of a post-coated metal material, by adding low refractive index particles having a larger particle size than rutile-type titanium oxide in the middle coat layer, if the solid concentration of the low refractive index particles is high, the Ra of the interface between the middle coat layer and the top layer can be made 0.8 μm or more. Alternatively by forming a middle coat layer on a worked metal material, then physically scratching the surface of the formed middle coat layer etc. to roughen the surface to an Ra of 0.8 μm or more, and then applying a top layer coating, it is possible to make the Ra of the interface between the middle coat layer and the top layer 0.8 μm or more.

(Method of Production of Coated Metal Material)

The method of production of the coated metal material of the present invention is characterized by coating at least two layers of the primer layer, middle coat layer, and top layer of the coated metal material of the present invention by a multilayer simultaneous coating or wet-on-wet method. Below, the method of production of the coated metal material of the present invention will be explained divided between the case where the coated metal material is a precoated metal material and the case where it is a post-coated metal material.

(Case of Precoated Metal Material)

When the coated metal material of the present invention is a precoated metal material, a general continuous coating line (called "CCL") or cut sheet coating line may be used to suitably select and execute the necessary treatment. A typical process of a coating line involves "washing"→"drying"→"chemical conversion"→"drying"→"coating"→"drying/baking"→"cooling"→"drying", but the process of production of the coated metal material of the present invention is not limited to this.

The coated metal material of the present invention may be produced in a usual manner by repeating the coating and drying/baking for each coating layer, but production by coating at least two of the primer layer, middle coat layer, and top layer using a multilayer simultaneous coating or wet-on-wet method on part or all of the metal material surface is preferable from the viewpoint of the performances of the layers and the viewpoint of the productivity. Similarly, when the coated metal material of the present invention further has an outermost coating film (for example, the above-mentioned coating film containing a silicone resin or fluorocarbon resin) on the surface side of the top layer, the middle coat layer forming coating, the top layer forming coating, and the outermost coating film layer forming coating are preferably simultaneously coated on the metal material surface using a multilayer simultaneous coating or wet-on-wet method.

Note that, when the metal material of the present invention is a galvanized steel sheet, by producing it in a continuous electroplating steel sheet facility or continuous hot dip galvanized steel sheet facility having a wet-on-wet coating facility or a simultaneous multilayer coating facility after the plating process, it is possible to coat it before the formation of the oxide film on the plated metal surface and to prevent poor appearance due to cissing by the oxide film.

The "multilayer simultaneous coating" is a method of using a slot die coater or slide hopper type curtain coater etc. to simultaneously apply a plurality of laminated coating solutions to coat a base material and simultaneously dry and bake the laminated coating solutions.

The "wet-on-wet coating" is a method of applying a coating solution once on a base material, then, in the wet state before this coating solution dries, further applying another coating solution over it and simultaneously drying and baking the laminated multilayer coating solutions. For example, the method may be mentioned of using a roll coater, curtain coater, etc. to coat an underlying coating film, using a curtain coater or other coating method to coat a top coating film before baking the underlying coating film, then simultaneously baking the multilayer coating film of the underlying coating film and top coating film.

The method of simultaneously baking coating films applied by the multilayer simultaneous coating or wet-on-wet method of the present invention can use a generally known oven for baking a coating, for example, hot drying oven, induction heating oven, infrared heating oven, or an oven combining these.

In this way, by laminating and simultaneously applying coating solutions in an undried state, the coating solutions of the different layers mix slightly at the interface and adhesion can be improved. Further, the drying processes which used to be performed with each coating are performed all together, so this is advantageous in terms of the productivity and production costs as well. Further, this is advantageous in that less drying facilities are enough.

(Case of Post-Coated Metal Material)

When the coated metal material of the present invention is a post-coated metal material, this is produced by chemically treating the above-mentioned metal material, then working it into the shape of the part where the produced post-coated metal material is used such as a lighting reflector, a reflector of a light emitting part, or the reflector of an image display, then coating it by post-coating. As the method of working the metal material, a known method may be used. Further, as the post-coating method, spray coating, dipping, coating by a curtain coater, brushing, electrostatic coating, or another known method may be used. Even in the case of a post-coated metal material, spray coating etc. may be used for wet-on-wet coating.

In electrical and electronic equipment using the coated metal material according to the present invention, a high total reflectance and formability of the coated metal material are both achieved, so in the case of the same light sources, a greater brightness is obtained than in the case of a prior coated metal material. Further, even if reducing the number of the light sources or reducing the input power, it is possible to secure an equivalent brightness as before. Further, the metal sheet of the present invention can be easily formed into various shapes or can be formed into complicated shapes by nature, so the effect can also be expected of expanding the range of applicable electrical and electronic equipment and improving the productivity of the parts applied to.

The electrical and electronic equipment able to make use of this characteristic is not particularly limited. The coated metal sheet of the present invention can for example be used for a lighting reflector, a reflector of a light emitting part, a reflector of an image display, etc. As specific examples of electrical or electronic equipment, lighting apparatuses, electronic decoration, AV devices, mobile devices, various types of displays, etc. may be mentioned. The coated metal sheet of the present invention is preferably used for a light reflector, a reflector of a decorative panel, backlight reflector of a liquid crystal display, etc.

EXAMPLES

Next, examples will be used to explain the present invention in further detail, but the present invention is not limited to the following examples.

Below, experiments will be explained in detail.

First, the coating used for the experiments will be explained in detail.

As the base resin, one comprised of an amorphous polyester resin made by Toyobo such as "Vylon® 220" (number average molecular weight of 3000 and hydroxyl value of 50), "Vylon® GK680" (number average molecular weight of 6000 and hydroxyl value of 21), "Vylon® 226" (number average molecular weight of 8000 and hydroxyl value of 20), "Vylon® GK810" (number average molecular weight of 6000 and hydroxyl value of 19), "Vylon® GK140" (number average molecular weight of 13000 and hydroxyl value of 10), "Vylon® GK330" (number average molecular weight of 17000 and hydroxyl value of 9), "Vylon® 560" (number average molecular weight of 19000 and hydroxyl value of 8), "Vylon® 670" (number average molecular weight of 20000 and hydroxyl value of 6), "Vylon® 630" (number average molecular weight of 23000 and hydroxyl value of 5), "Vylon® 550" (number average molecular weight of 28000 and hydroxyl value of 4), or "Vylon® 516" (number average molecular weight of 30000 and hydroxyl value of 4), or an amorphous polyester resin made by Sumika Bayer Urethane such as "Desmophen® T1775" (number average molecular weight of 1500 and hydroxyl value of 66), "Desmophen® 651" (number average molecular weight of 2000 and hydroxyl value of 182), "Desmophen® 690" (number average molecular weight of 3500 and hydroxyl value of 46), or "Desmophen® TXP2326" (number average molecular weight of 4500 and hydroxyl value of 20) dissolved in an organic solvent (Solvesso 150 and cyclohexanone mixed in a mass ratio of 1:1) was used. As a cross-linking agent, the commercially available hexamethoxymethylated melamine "Cymel® 303" made by Mitsui Cytec was added in 15 parts by mass to a solid content of 100 parts by mass of polyester resin and, further, the commercially available acidic catalyst "Catalyst® 6003B" made by Mitsui Cytec was added in 0.5 part by mass to obtain a polyester-based clear coating. As the rutile-type titanium oxide, "Tipaque® CR95" (refractive index: 2.5) of an average particle size of 280 nm made by Ishihara Sangyo Kaisha Ltd. was used.

For comparison, the barium sulfate "BARIACE®B-30" (refractive index: 1.6) made by Sakai Chemical Industry having an average particle size of 300 nm and the zinc oxide "Fine Zinc Oxide" (refractive index: 2.0) made by Sakai Chemical Industry having an average particle size of 290 nm were also used.

As the low refractive index particles contained in the middle coat layer, silica "SQ-PL2" (average particle size of 0.8 μm and refractive index of 1.5), "MIN-U-L 5" (average particle size of 1 μm and refractive index of 1.5), "SQ-Y5" (average particle size of 5 μm and refractive index of 1.5), "MIN-U-SIL 30" (average particle size of 8 μm and refractive index of 1.5), and "SQ-Y10" (average particle size of 10 μm and refractive index of 1.5) made by Hayashi Kasei, silica "Sunsphere®H-31" (average particle size of 3 μm and refractive index of 1.5) and "Sunsphere®H-121" (average particle size of 12 μm and refractive index of 1.5) made by Asahi Glass, calcium carbonate "Escalon #100" (average particle size of 5 μm and refractive index of 1.6) made by Hayashi Kasei, and PTFE "Fluon® PTFE Lubricant" (average particle size of 7 μm and refractive index of 1.4) made by Asahi Glass were used.

As the matting agent contained in the top layer, the matting silica "Sylysia® 530" (average particle size of 2 μm), "Sylysia® 420" (average particle size of 3 μm), "Sylysia® 740" (average particle size of 5 μm), "Sylysia® 770" (average particle size of 7 μm), "Sylysia® 380" (average particle size of 9 μm), and "Sylysia® 780" (average particle size of 11 μm) made by Fuji Sylysia Chemical were used.

As the method of dispersion of pigment and particles in a coating, the following dispersion methods (i), (ii), and (iii) were used.

Dispersion method (i): Polyester-based clear coating, pigment, particles, and glass beads (diameter 2 mm) are placed in a container and dispersed by a "Paint Shaker PC" made by Seiwa Giken for 2 hours.

Dispersion method (ii): Polyester-based clear coating, pigment, particles, and glass beads (diameter 0.2 mm) are placed in a container and dispersed by a "Labstar" made by an Ashizawa Finetech for 2 hours.

Dispersion method (iii): Polyester-based clear coating, pigment, particles, and glass beads (diameter 2 mm) are placed in a container and dispersed by a "Paint Shaker PC" made by Seiwa Giken for 10 hours.

Details of the prepared primer coating, middle coat coating, and top coating are described in Tables 1 to 3.

TABLE 1

| | Binder | | | Pigment | | | | |
|---|---|---|---|---|---|---|---|---|
| Type of coating | Type | Number average molecular weight Mn | Hydroxyl value [KOHmg/g] | Type | | Average particle size (μm) | Solid volume concentration (%) | Dispersion method |
| Primer 1 | Vylon GK330 | 17000 | 9 | Titanium oxide | Tipaque CR95 | 0.28 | 25 | (i) |
| Primer 2 | Vylon 560 | 19000 | 8 | Titanium oxide | Tipaque CR95 | 0.28 | 25 | (i) |
| Primer 3 | Vylon 670 | 20000 | 6 | Titanium oxide | Tipaque CR95 | 0.28 | 25 | (i) |

TABLE 1-continued

| | Binder | | | Pigment | | | | |
|---|---|---|---|---|---|---|---|---|
| Type of coating | Type | Number average molecular weight Mn | Hydroxyl value [KOHmg/g] | Type | | Average particle size (μm) | Solid volume concentration (%) | Dispersion method |
| Primer 4 | Vylon 630 | 23000 | 5 | Titanium oxide | Tipaque CR95 | 0.28 | 25 | (i) |
| Primer 5 | Vylon 550 | 28000 | 4 | Titanium oxide | Tipaque CR95 | 0.28 | 25 | (i) |
| Primer 6 | Vylon 516 | 30000 | 4 | Titanium oxide | Tipaque CR95 | 0.28 | 25 | (i) |
| Primer 7 | Vylon 630 | 23000 | 5 | Titanium oxide | Tipaque CR95 | 0.28 | 15 | (i) |
| Primer 8 | Vylon 630 | 23000 | 5 | Titanium oxide | Tipaque CR95 | 0.28 | 20 | (i) |
| Primer 9 | Vylon 630 | 23000 | 5 | Titanium oxide | Tipaque CR95 | 0.28 | 30 | (i) |
| Primer 10 | Vylon 630 | 23000 | 5 | Titanium oxide | Tipaque CR95 | 0.28 | 35 | (i) |
| Primer 11 | Vylon 630 | 23000 | 5 | Titanium oxide | Tipaque CR95 | 0.28 | 40 | (i) |

TABLE 2A

| | Binder | | | | | | | |
|---|---|---|---|---|---|---|---|---|
| | A | | | B | | | | |
| Type of coating | Type | Number average molecular weight Mn | Hydroxyl value [KOHmg/g] | Type | Number average molecular weight Mn | Hydroxyl value [KOHmg/g] | A:B | Resin A in binder vol % |
| Middle coat 1 | Vylon GK330 | 17000 | 9 | — | — | — | 1:0 | 100 |
| Middle coat 2 | Vylon 560 | 19000 | 8 | — | — | — | 1:0 | 100 |
| Middle coat 3 | Vylon 670 | 20000 | 6 | — | — | — | 1:0 | 100 |
| Middle coat 4 | Vylon 630 | 23000 | 5 | — | — | — | 1:0 | 100 |
| Middle coat 5 | Vylon 550 | 28000 | 4 | — | — | — | 1:0 | 100 |
| Middle coat 6 | Vylon 516 | 30000 | 4 | — | — | — | 1:0 | 100 |
| Middle coat 7 | Vylon 630 | 23000 | 5 | Desmophen T1775 | 1500 | 66 | 1:1 | 50 |
| Middle coat 8 | Vylon 630 | 23000 | 5 | Desmophen 651 | 2000 | 182 | 1:1 | 50 |
| Middle coat 9 | Vylon 630 | 23000 | 5 | Vylon 220 | 3000 | 50 | 1:1 | 50 |
| Middle coat 10 | Vylon 630 | 23000 | 5 | Desmophen 690 | 3500 | 46 | 1:1 | 50 |
| Middle coat 11 | Vylon 630 | 23000 | 5 | Desmophen TXP2326 | 4500 | 20 | 1:1 | 50 |
| Middle coat 12 | Vylon 630 | 23000 | 5 | Vylon GK680 | 6000 | 21 | 1:1 | 50 |
| Middle coat 13 | Vylon 630 | 23000 | 5 | Vylon 226 | 8000 | 20 | 1:1 | 50 |
| Middle coat 14 | Vylon 630 | 23000 | 5 | Vylon GK810 | 6000 | 19 | 1:1 | 50 |
| Middle coat 15 | Vylon 630 | 23000 | 5 | Desmophen 690 | 3500 | 46 | 4:1 | 80 |
| Middle coat 16 | Vylon 630 | 23000 | 5 | Desmophen 690 | 3500 | 46 | 7:3 | 70 |
| Middle coat 17 | Vylon 630 | 23000 | 5 | Desmophen 690 | 3500 | 46 | 3:2 | 60 |
| Middle coat 18 | Vylon 630 | 23000 | 5 | Desmophen 690 | 3500 | 46 | 2:3 | 40 |
| Middle coat 19 | Vylon 630 | 23000 | 5 | Desmophen 690 | 3500 | 46 | 3:7 | 30 |
| Middle coat 20 | Vylon 630 | 23000 | 5 | Desmophen 690 | 3500 | 46 | 1:4 | 20 |
| Middle coat 21 | Vylon 630 | 23000 | 5 | Desmophen 690 | 3500 | 46 | 1:6 | 14 |
| Middle coat 22 | Vylon 630 | 23000 | 5 | — | — | — | 1:0 | 100 |
| Middle coat 23 | Vylon 630 | 23000 | 5 | — | — | — | 1:0 | 100 |
| Middle coat 24 | Vylon 630 | 23000 | 5 | — | — | — | 1:0 | 100 |
| Middle coat 25 | Vylon 630 | 23000 | 5 | — | — | — | 1:0 | 100 |
| Middle coat 26 | Vylon 630 | 23000 | 5 | — | — | — | 1:0 | 100 |
| Middle coat 27 | vylon 630 | 23000 | 5 | — | — | — | 1:0 | 100 |
| Middle coat 28 | Vylon 630 | 23000 | 5 | — | — | — | 1:0 | 100 |
| Middle coat 29 | Vylon 630 | 23000 | 5 | — | — | — | 1:0 | 100 |
| Middle coat 30 | Vylon 630 | 23000 | 5 | — | — | — | 1:0 | 100 |
| Middle coat 31 | Vylon 630 | 23000 | 5 | — | — | — | 1:0 | 100 |
| Middle coat 32 | Vylon 630 | 23000 | 5 | — | — | — | 1:0 | 100 |
| Middle coat 33 | Vylon 630 | 23000 | 5 | — | — | — | 1:0 | 100 |
| Middle coat 34 | Vylon 630 | 23000 | 5 | — | — | — | 1:0 | 100 |
| Middle coat 35 | Vylon 630 | 23000 | 5 | — | — | — | 1:0 | 100 |
| Middle coat 36 | Vylon 630 | 23000 | 5 | — | — | — | 1:0 | 100 |

| | Pigment | | | | | | | | | |
|---|---|---|---|---|---|---|---|---|---|---|
| | Pigment | | | | Low refractive index particles | | | | Total | |
| Type of coating | Type | | Average particle size (μm) | Solid volume concentration (%) | Type | | Average particle size (μm) | Solid volume concentration (%) | solid volume concentration (%) | Dispersion method |
| Middle coat 1 | $TiO_2$ | Tipaque CR95 | 0.28 | 65 | — | — | — | — | 65 | (i) |
| Middle coat 2 | $TiO_2$ | Tipaque CR95 | 0.28 | 65 | — | — | — | — | 65 | (i) |
| Middle coat 3 | $TiO_2$ | Tipaque CR95 | 0.28 | 65 | — | — | — | — | 65 | (i) |
| Middle coat 4 | $TiO_2$ | Tipaque CR95 | 0.28 | 65 | — | — | — | — | 65 | (i) |
| Middle coat 5 | $TiO_2$ | Tipaque CR95 | 0.28 | 65 | — | — | — | — | 65 | (i) |

TABLE 2A-continued

| | | | | | | | | | | |
|---|---|---|---|---|---|---|---|---|---|---|
| Middle coat 6 | $TiO_2$ | Tipaque CR95 | 0.28 | 65 | — | — | — | — | 65 | (i) |
| Middle coat 7 | $TiO_2$ | Tipaque CR95 | 0.28 | 65 | — | — | — | — | 65 | (i) |
| Middle coat 8 | $TiO_2$ | Tipaque CR95 | 0.28 | 65 | — | — | — | — | 65 | (i) |
| Middle coat 9 | $TiO_2$ | Tipaque CR95 | 0.28 | 65 | — | — | — | — | 65 | (i) |
| Middle coat 10 | $TiO_2$ | Tipaque CR95 | 0.28 | 65 | — | — | — | — | 65 | (i) |
| Middle coat 11 | $TiO_2$ | Tipaque CR95 | 0.28 | 65 | — | — | — | — | 65 | (i) |
| Middle coat 12 | $TiO_2$ | Tipaque CR95 | 0.28 | 65 | — | — | — | — | 65 | (i) |
| Middle coat 13 | $TiO_2$ | Tipaque CR95 | 0.28 | 65 | — | — | — | — | 65 | (i) |
| Middle coat 14 | $TiO_2$ | Tipaque CR95 | 0.28 | 65 | — | — | — | — | 65 | (i) |
| Middle coat 15 | $TiO_2$ | Tipaque CR95 | 0.28 | 65 | — | — | — | — | 65 | (i) |
| Middle coat 16 | $TiO_2$ | Tipaque CR95 | 0.28 | 65 | — | — | — | — | 65 | (i) |
| Middle coat 17 | $TiO_2$ | Tipaque CR95 | 0.28 | 65 | — | — | — | — | 65 | (i) |
| Middle coat 18 | $TiO_2$ | Tipaque CR95 | 0.28 | 65 | — | — | — | — | 65 | (i) |
| Middle coat 19 | $TiO_2$ | Tipaque CR95 | 0.28 | 65 | — | — | — | — | 65 | (i) |
| Middle coat 20 | $TiO_2$ | Tipaque CR95 | 0.28 | 65 | — | — | — | — | 65 | (i) |
| Middle coat 21 | $TiO_2$ | Tipaque CR95 | 0.28 | 65 | — | — | — | — | 65 | (i) |
| Middle coat 22 | $TiO_2$ | Tipaque CR95 | 0.28 | 30 | — | — | — | — | 30 | (i) |
| Middle coat 23 | $TiO_2$ | Tipaque CR95 | 0.28 | 35 | — | — | — | — | 35 | (i) |
| Middle coat 24 | $TiO_2$ | Tipaque CR95 | 0.28 | 40 | — | — | — | — | 40 | (i) |
| Middle coat 25 | $TiO_2$ | Tipaque CR95 | 0.28 | 50 | — | — | — | — | 50 | (i) |
| Middle coat 26 | $TiO_2$ | Tipaque CR95 | 0.28 | 60 | — | — | — | — | 60 | (i) |
| Middle coat 27 | $TiO_2$ | Tipaque CR95 | 0.28 | 70 | — | — | — | — | 70 | (i) |
| Middle coat 28 | $TiO_2$ | Tipaque CR95 | 0.28 | 75 | — | — | — | — | 75 | (i) |
| Middle coat 29 | $BaSO_4$ | BARIACE B-30 | 0.30 | 65 | — | — | — | — | 65 | (i) |
| Middle coat 30 | ZnO | Fine part. zinc | 0.29 | 65 | — | — | — | — | 65 | (i) |
| Middle coat 31 | $TiO_2$ | Tipaque CR95 | 0.28 | 40 | Silica | SQ-Y5 | 5 | 1 | 41 | (i) |
| Middle coat 32 | $TiO_2$ | Tipaque CR95 | 0.28 | 40 | Silica | SQ-Y5 | 5 | 2 | 42 | (i) |
| Middle coat 33 | $TiO_2$ | Tipaque CR95 | 0.28 | 40 | Silica | SQ-Y5 | 5 | 3 | 43 | (i) |
| Middle coat 34 | $TiO_2$ | Tipaque CR95 | 0.28 | 40 | Silica | SQ-Y5 | 5 | 5 | 45 | (i) |
| Middle coat 35 | $TiO_2$ | Tipaque CR95 | 0.28 | 40 | Silica | SQ-PL2 | 0.8 | 5 | 45 | (i) |
| Middle coat 36 | $TiO_2$ | Tipaque CR95 | 0.28 | 40 | Silica | MIN-U-SIL 5 | 1 | 5 | 45 | (i) |

TABLE 2B

| | Binder | | | | | | | |
|---|---|---|---|---|---|---|---|---|
| | A | | | B | | | | |
| Type of coating | Type | Number average molecular weight Mn | Hydroxyl value [KOHmg/g] | Type | Number average molecular weight Mn | Hydroxyl value [KOHmg/g] | A:B | Resin A in binder vol % |
| Middle coat 37 | Vylon 630 | 23000 | 5 | — | — | — | 1:0 | 100 |
| Middle coat 38 | Vylon 630 | 23000 | 5 | — | — | — | 1:0 | 100 |
| Middle coat 39 | Vylon 630 | 23000 | 5 | — | — | — | 1:0 | 100 |
| Middle coat 40 | Vylon 630 | 23000 | 5 | — | — | — | 1:0 | 100 |
| Middle coat 41 | Vylon 630 | 23000 | 5 | — | — | — | 1:0 | 100 |
| Middle coat 42 | Vylon 630 | 23000 | 5 | — | — | — | 1:0 | 100 |
| Middle coat 43 | Vylon 630 | 23000 | 5 | — | — | — | 1:0 | 100 |
| Middle coat 44 | Vylon 630 | 23000 | 5 | — | — | — | 1:0 | 100 |
| Middle coat 45 | Vylon 630 | 23000 | 5 | — | — | — | 1:0 | 100 |
| Middle coat 46 | Vylon 630 | 23000 | 5 | Desmophen 690 | 3500 | 46 | 1:1 | 50 |
| Middle coat 47 | vylon 630 | 23000 | 5 | Desmophen 690 | 3500 | 46 | 1:1 | 50 |
| Middle coat 48 | Vylon 630 | 23000 | 5 | Desmophen 690 | 3500 | 46 | 1:1 | 50 |
| Middle coat 49 | Vylon 630 | 23000 | 5 | Desmophen 690 | 3500 | 46 | 1:1 | 50 |
| Middle coat 50 | Vylon 630 | 23000 | 5 | Desmophen 690 | 3500 | 46 | 1:1 | 50 |
| Middle coat 51 | Vylon 630 | 23000 | 5 | Desmophen 690 | 3500 | 46 | 1:1 | 50 |
| Middle coat 52 | Vylon 630 | 23000 | 5 | Desmophen 690 | 3500 | 46 | 1:1 | 50 |
| Middle coat 53 | Vylon 630 | 23000 | 5 | Desmophen 690 | 3500 | 46 | 1:1 | 50 |
| Middle coat 54 | Vylon 630 | 23000 | 5 | Desmophen 690 | 3500 | 46 | 1:1 | 50 |
| Middle coat 55 | Vylon 630 | 23000 | 5 | Desmophen 690 | 3500 | 46 | 1:1 | 50 |
| Middle coat 56 | Vylon 630 | 23000 | 5 | Desmophen 690 | 3500 | 46 | 1:1 | 50 |
| Middle coat 57 | Vylon 630 | 23000 | 5 | Desmophen 690 | 3500 | 46 | 1:1 | 50 |
| Middle coat 58 | Vylon 630 | 23000 | 5 | Desmophen 690 | 3500 | 46 | 1:1 | 50 |
| Middle coat 59 | Vylon 630 | 23000 | 5 | Desmophen 690 | 3500 | 46 | 1:1 | 50 |
| Middle coat 60 | Vylon 630 | 23000 | 5 | Desmophen 690 | 3500 | 46 | 1:1 | 50 |
| Middle coat 61 | Vylon 630 | 23000 | 5 | Desmophen 690 | 3500 | 46 | 1:1 | 50 |
| Middle coat 62 | Vylon 630 | 23000 | 5 | — | — | — | 1:0 | 100 |
| Middle coat 63 | Vylon 630 | 23000 | 5 | Desmophen 690 | 3500 | 46 | 1:1 | 50 |

TABLE 2B-continued

| Type of coating | Pigment: Pigment | Type | Average particle size (μm) | Solid volume concentration (%) | Low refractive index particles | Type | Average particle size (μm) | Solid volume concentration (%) | Total solid volume concentration (%) | Dispersion method |
|---|---|---|---|---|---|---|---|---|---|---|
| Middle coat 37 | $TiO_2$ | Tipaque CR95 | 0.28 | 40 | Silica | Sunsphere H-31 | 3 | 5 | 45 | (i) |
| Middle coat 38 | $TiO_2$ | Tipaque CR95 | 0.28 | 40 | Silica | MIN-U-SIL 30 | 8 | 5 | 45 | (i) |
| Middle coat 39 | $TiO_2$ | Tipaque CR95 | 0.28 | 40 | Silica | SQ-Y10 | 10 | 5 | 45 | (i) |
| Middle coat 40 | $TiO_2$ | Tipaque CR95 | 0.28 | 40 | Silica | Sunsphere H-121 | 12 | 5 | 45 | (i) |
| Middle coat 41 | $TiO_2$ | Tipaque CR95 | 0.28 | 40 | $CaCO_3$ | Escalon #100 | 5 | 5 | 45 | (i) |
| Middle coat 42 | $TiO_2$ | Tipaque CR95 | 0.28 | 40 | PTFE | Fluon lubricant | 7 | 5 | 45 | (i) |
| Middle coat 43 | $TiO_2$ | Tipaque CR95 | 0.28 | 40 | Silica | SQ-Y5 | 5 | 7 | 47 | (i) |
| Middle coat 44 | $TiO_2$ | Tipaque CR95 | 0.28 | 40 | Silica | SQ-Y5 | 5 | 8 | 48 | (i) |
| Middle coat 45 | $TiO_2$ | Tipaque CR95 | 0.28 | 40 | Silica | SQ-Y5 | 5 | 10 | 50 | (i) |
| Middle coat 46 | $TiO_2$ | Tipaque CR95 | 0.28 | 40 | — | — | — | — | 40 | (i) |
| Middle coat 47 | $TiO_2$ | Tipaque CR95 | 0.28 | 40 | Silica | SQ-Y5 | 5 | 1 | 41 | (i) |
| Middle coat 48 | $TiO_2$ | Tipaque CR95 | 0.28 | 40 | Silica | SQ-Y5 | 5 | 2 | 42 | (i) |
| Middle coat 49 | $TiO_2$ | Tipaque CR95 | 0.28 | 40 | Silica | SQ-Y5 | 5 | 3 | 43 | (i) |
| Middle coat 50 | $TiO_2$ | Tipaque CR95 | 0.28 | 40 | Silica | SQ-Y5 | 5 | 5 | 45 | (i) |
| Middle coat 51 | $TiO_2$ | Tipaque CR95 | 0.28 | 40 | Silica | SQ-PL2 | 0.8 | 5 | 45 | (i) |
| Middle coat 52 | $TiO_2$ | Tipaque CR95 | 0.28 | 40 | Silica | MIN-U-SIL 5 | 1 | 5 | 45 | (i) |
| Middle coat 53 | $TiO_2$ | Tipaque CR95 | 0.28 | 40 | Silica | Sunsphere H-31 | 3 | 5 | 45 | (i) |
| Middle coat 54 | $TiO_2$ | Tipaque CR95 | 0.28 | 40 | Silica | MIN-U-SIL 30 | 8 | 5 | 45 | (i) |
| Middle coat 55 | $TiO_2$ | Tipaque CR95 | 0.28 | 40 | Silica | SQ-Y10 | 10 | 5 | 45 | (i) |
| Middle coat 56 | $TiO_2$ | Tipaque CR95 | 0.28 | 40 | Silica | Sunsphere H-121 | 12 | 5 | 45 | (i) |
| Middle coat 57 | $TiO_2$ | Tipaque CR95 | 0.28 | 40 | $CaCO_3$ | Escalon #100 | 5 | 5 | 45 | (i) |
| Middle coat 58 | $TiO_2$ | Tipaque CR95 | 0.28 | 40 | PTFE | Fluon lubricant | 7 | 5 | 45 | (i) |
| Middle coat 59 | $TiO_2$ | Tipaque CR95 | 0.28 | 40 | Silica | SQ-Y5 | 5 | 7 | 47 | (i) |
| Middle coat 60 | $TiO_2$ | Tipaque CR95 | 0.28 | 40 | Silica | SQ-Y5 | 5 | 8 | 48 | (i) |
| Middle coat 61 | $TiO_2$ | Tipaque CR95 | 0.28 | 40 | Silica | SQ-Y5 | 5 | 10 | 50 | (i) |
| Middle coat 62 | $TiO_2$ | Tipaque CR95 | 0.28 | 50 | — | — | — | — | 50 | (ii) |
| Middle coat 63 | $TiO_2$ | Tipaque CR95 | 0.28 | 40 | Silica | SQ-Y5 | 5 | 10 | 50 | (iii) |

TABLE 3

| Type of coating | Binder: Type | Number average molecular weight Mn | Hydroxyl value [KOHmg/g] | Pigment | Type | Average particle size (μm) | Solid volume concentration (%) | Dispersion method |
|---|---|---|---|---|---|---|---|---|
| Top 1 | Vylon GK330 | 17000 | 9 | — | — | — | 0 | (i) |
| Top 2 | Vylon 560 | 19000 | 8 | — | — | — | 0 | (i) |
| Top 3 | Vylon 670 | 20000 | 6 | — | — | — | 0 | (i) |
| Top 4 | Vylon 630 | 23000 | 5 | — | — | — | 0 | (i) |
| Top 5 | Vylon 550 | 28000 | 4 | — | — | — | 0 | (i) |
| Top 6 | Vylon 516 | 30000 | 4 | — | — | — | 0 | (i) |
| Top 7 | Vylon 630 | 23000 | 5 | $TiO_2$ | Tipaque CR95 | 0.28 | 15 | (i) |
| Top 8 | Vylon 630 | 23000 | 5 | $TiO_2$ | Tipaque CR95 | 0.28 | 20 | (i) |
| Top 9 | Vylon 630 | 23000 | 5 | $TiO_2$ | Tipaque CR95 | 0.28 | 25 | (i) |
| Top 10 | Vylon 630 | 23000 | 5 | $TiO_2$ | Tipaque CR95 | 0.28 | 30 | (i) |
| Top 11 | Vylon 630 | 23000 | 5 | $TiO_2$ | Tipaque CR95 | 0.28 | 35 | (i) |
| Top 12 | Vylon 630 | 23000 | 5 | $TiO_2$ | Tipaque CR95 | 0.28 | 40 | (i) |
| Top 13 | Vylon 630 | 23000 | 5 | Silica | Sylysia 740 | 5 | 1 | (i) |
| Top 14 | Vylon 630 | 23000 | 5 | Silica | Sylysia 740 | 5 | 3 | (i) |
| Top 15 | Vylon 630 | 23000 | 5 | Silica | Sylysia 740 | 5 | 5 | (i) |
| Top 16 | Vylon 630 | 23000 | 5 | Silica | Sylysia 740 | 5 | 7 | (i) |
| Top 17 | Vylon 630 | 23000 | 5 | Silica | Sylysia 740 | 5 | 9 | (i) |
| Top 18 | Vylon 630 | 23000 | 5 | Silica | Sylysia 740 | 5 | 11 | (i) |
| Top 19 | Vylon 630 | 23000 | 5 | Silica | Sylysia 740 | 5 | 13 | (i) |

TABLE 3-continued

| Type of coating | Binder Type | Binder Number average molecular weight Mn | Binder Hydroxyl value [KOHmg/g] | Pigment Type | | Pigment Average particle size (μm) | Pigment Solid volume concentration (%) | Dispersion method |
|---|---|---|---|---|---|---|---|---|
| Top 20 | Vylon 630 | 23000 | 5 | Silica | Sylysia 740 | 5 | 15 | (i) |
| Top 21 | Vylon 630 | 23000 | 5 | Silica | Sylysia 740 | 5 | 17 | (i) |
| Top 22 | Vylon 630 | 23000 | 5 | Silica | Sylysia 530 | 2 | 9 | (i) |
| Top 23 | Vylon 630 | 23000 | 5 | Silica | Sylysia 420 | 3 | 9 | (i) |
| Top 24 | Vylon 630 | 23000 | 5 | Silica | Sylysia 770 | 7 | 9 | (i) |
| Top 25 | Vylon 630 | 23000 | 5 | Silica | Sylysia 380 | 9 | 9 | (i) |
| Top 26 | Vylon 630 | 23000 | 5 | Silica | Sylysia 780 | 11 | 9 | (i) |

Below, the precoated metal sheet used for the experiment of the examples will be explained in detail.

Hot dip galvanized steel sheet "Silverzinc®" (hereinafter, referred to as "GI") made by Nippon Steel Corporation was prepared as a substrate sheet, which had a thickness of 0.6 mm and a plating deposition of 60 mg/$m^2$ on one side.

Next, the prepared substrate sheet was spray-degreased by a 2 wt % aqueous solution of alkali degreasing agent "FC-4336" made by Nihon Parkerizing at 50° C., rinsed, dried, then coated with a chromate-free treatment agent "CT-E300N" made by Nihon Parkerizing by a roll coater and dried by a hot air oven. The drying conditions in the hot air oven were a peak metal temperature of the steel sheet of 60° C. The amount of deposition of the chromate-free treatment agent was a total solid content of 200 g/$m^2$.

Next, one surface of the treated metal sheet is coated by a roll coater with the prepared primer coating to give a dried thickness of 20 μm, while the other surface was coated with a back surface coating "FL100HQ" of a gray color made by Japan Fine Coatings to give a dried thickness of 5 μm. The metal sheet was dried and cured in an induction heating oven in which hot air was blown under conditions giving a peak metal temperature of the metal sheet of 230° C. Further, after drying and baking, the coated metal sheet was sprayed with water for water cooling.

Next, the primer coating film was simultaneously coated with two layers of a middle coat coating and a top coating by a slide hopper type curtain coater. The laminated coating films were simultaneously dried and cured in an induction heating oven in which hot air was blown under conditions giving a peak metal temperature of the metal sheet of 220° C. Further, after drying and baking, the coated metal sheet was sprayed with water for water cooling to prepare a three-layer precoated metal sheet (hereinafter, the present coating method will be referred to as "the coating method (i)").

Further, as needed, the primer coating film was coated with simply the single layer of a middle coat coating by a roller curtain coater. Further, before drying this, this was coated by a roller curtain coater with a top coating, then the coating films were simultaneously dried and cured. After drying and baking, the coated metal sheet was sprayed with water for water cooling to prepare a three-layer precoated metal sheet (hereinafter, the present coating method will be referred to as "the coating method (ii)").

Further, as needed, the primer coating film was coated with simply the single layer of a middle coat coating by a roll coater, which was baked on by the above-mentioned procedure, and was then coated with a single layer of top coating by a roll coater which was then baked on to prepare a three-layer precoated metal sheet (the coating method in the present routine will be referred to as "the coating method (iii)").

Below, details of the methods of evaluation of the precoated metal sheet prepared in the experiments will be given.

1) Measurement of Total Light Reflectance of Precoated Metal Sheet

A spectrometer "UV265" made by Shimadzu Corporation equipped with an integrating sphere reflection attachment was used. As the reference sheet, a sheet prepared by compacting barium sulfate powder was used. The total light reflectance at the wavelength to which the human eye is most sensitive, that is, 555 nm, was measured and evaluated by the following criteria:

VG (very good): case of 98% or more
VG to G (good): case of 96% to less than 98%
G (good): case of 94% to less than 96%
G to F (fair): case of 92% to less than 94%
F (fair): case of 90% to less than 92%
P (poor): case of less than 90%

2) Measurement of Luminance of Lighting Apparatus

Figure 2:
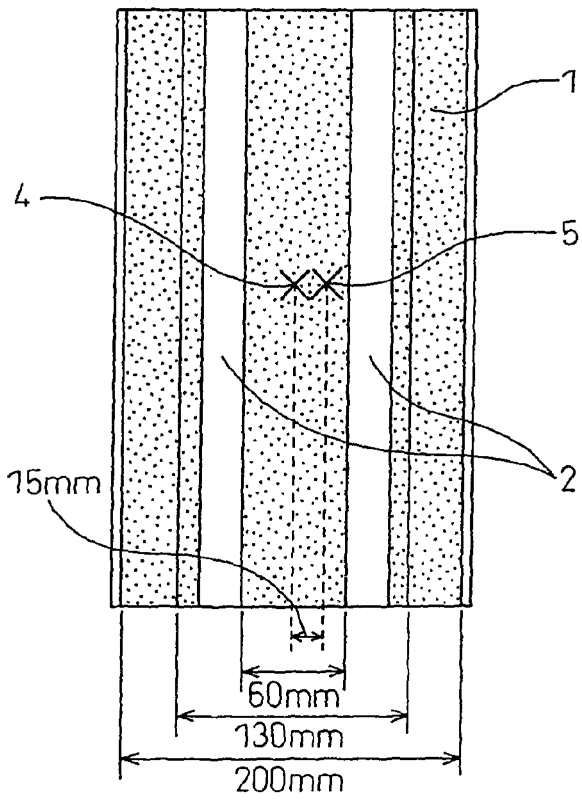
FIG. 2 is a schematic view of the luminance measurement system of FIG. 1 seen from above.

FIG. 1 and FIG. 2 schematically show the experimental apparatus. A coated base material (precoated metal sheet) is formed into a shape with the two ends in the longitudinal direction such as shown in FIG. 1 and FIG. 2 bent upward so as to obtain a reflector 1. Two commercially available fluorescent lights 2 were arranged and attached in the reflector. On top of the reflector, a cover 3 formed by frosted glass was attached. The luminances of the center part (hereinafter referred to as the "luminance measurement part") 4 of the cover 3 and the part 5 offset from the center part 4 to the outside by 1.5 cm (hereinafter referred to as the "luminance uniformity comparison measurement part") 5 were measured by a luminance meter 6 set at a position 50 cm away from the measurement point in the vertical direction. As the fluorescent lights 2, fluorescent lights of type 16 of 16 W output were used.

The luminance was evaluated by measuring the luminance measurement part 4 of the cover 3. At the time of measurement, all light other than from the fluorescent lights 2 was blocked out, the luminance of a reference reflector prepared by the later explained method was measured, then the luminance when attaching the reflector 1 prepared using the coated base material for evaluation was measured. Further, from the luminance at the time of measurement by the reference reflector and the luminance at the time of measurement by the reflector 1 of the coated base material for evaluation, the rate of change of luminance was defined as ([luminance by reflector 1 made of coated base material for evaluation]−[luminance by reference reflector])×100/[luminance by reference reflector]. The rate of change of luminance was used for evaluation by the following criteria:

VG (very good): case of 25% or more
VG to G (good): case of 20% to less than 25%
G (good): case of 15% to less than 20%
G to F (fair): case of 10% to less than 15%
F (fair): case of 5% to less than 10%
P (poor): case of less than 5%

The reference reflector was prepared by the method of coating by a white coating with a high reflectance of the conventional means for improving the reflectance of a reflector surface. The coating shown in Table 4 was coated to give a dried thickness of 10 μm and dried and cured by the same method as the preparation of the above primer coated sheet. On top of this, the coating described in Table 4 was again coated by a roll coater to give a dried thickness of 20 μm and dried and cured in an induction heating oven through which hot air was blown under conditions giving a peak metal temperature of the metal sheet of 230° C. Further, this was dried and baked, then the coated metal sheet was sprayed with water for water cooling.

The uniformity of the luminance was evaluated by measuring the luminances at the two locations of the luminance measurement part 4 of the cover and the luminance uniformity comparison measurement part 5 offset from the luminance measurement part 4 by 1.5 cm. The uniformity of luminance was defined as 100−([luminance of luminance uniformity comparison measurement part 5]−[luminance of luminance measurement part 4])/[luminance of luminance measurement part 4]×100. The uniformity of luminance was evaluated by the following criteria:

VG (very good): case of 90% or more
G (good): case of 85% to less than 90%
F (fair): case of 70% to less than 85%
P (poor): case of less than 70%

3) Coating Film Workability Test

The prepared precoated metal sheet was bent in accordance with JIS Z 2248 by 90° by a push bending method (inside R: 0 mm (hereinafter referred to as "0R") and inside R: 2 mm (hereinafter referred to as "2R")), the coating film of the worked part was visually examined, and the presence of any cracking of the coating film was examined. Note that, when bending by 90°, the precoated metal sheet was bent so that the front surface became the outside of the bend. The sheet was bent by 0R and 2R and evaluated by the following criteria.

VG (very good): case of no cracks at all even when examining worked part by a loupe for both 0R and 2R G (good): case of slight cracks recognized by visual observation for 0R and no cracks at all even when examined by loupe for 2R F (fair): case of large cracks recognized by visual observation for 0R and slight cracks recognized by visual observation for 2R P (poor): case of large cracks recognized by visual observation for both 0R and 2R Further, an adhesion test of the worked part was run by attaching a tape to the worked part and peeling it off. The results were evaluated by the following criteria:

VG (very good): case of no peeling at all even when observing worked part by loupe for both 0R and 2R G (good): case of slight peeling recognized by visual observation for 0R and no peeling at all even when observed by a loupe for 2R F (fair): case of large peeling recognized by visual observation for 0R and slight peeling recognized by visual observation for 2R P (poor): case of large peeling recognized by visual observation for both 0R and 2R 4) Dirt Resistance The surface of the coating film of a prepared precoated metal sheet was marked in blue by Magic Ink® made by Teranishi Chemical, and allowed to stand at ordinary temperature for 24 hours. Thereafter, the Magic Ink® was wiped off by ethanol. The remaining traces were evaluated:

VG (very good): case where all traces of the Magic Ink® disappeared and could no longer be seen G (good): case where slight traces of the Magic Ink® remained (level where traces of Magic Ink® can be discerned if looking carefully)

F (fair): case where traces of Magic Ink® remain (level where traces of Magic Ink® can be discerned instantaneously)

P (poor): case where almost all Magic Ink® remains (color of Magic Ink® does not change much at all before and after wiping by ethanol)

TABLE 4

| Type of coating | Binder | | | Pigment | | | |
| --- | --- | --- | --- | --- | --- | --- | --- |
| | Type | Number average molecular weight Mn | Hydroxyl value [KOHmg/g] | Type | | Solid volume concentration (%) | Dispersion method |
| For reference reflector | Vylon GK140 | 13000 | 21 | Titanium oxide | Tipaque CR95 | 20 | (i) |

5) Scratching Resistance

The scratching resistance was measured by the pencil hardness. In accordance with the method of 8.4.1 of JIS K 5400 (1993), the scratching resistance of the coating film was investigated by tearing of the coating film when changing the hardness of the pencil lead. The highest hardness where no tearing of the coating film was recognized was made the pencil hardness of the coating film.

VG (very good): H or more
G (good): F
F (fair): HB
P (poor): B or less.

In the performances of all of 1) to 5), F (fair) or more was defined as a passing level.

Tables 5 to 12 show the precoated metal sheets of the present invention and the results of their evaluation.

TABLE 5

| No. | Type of primer coating | Type of middle coat coating | Type of top coating | Thickness after drying (μm) Primer layer | Middle coat layer | Top layer | Coating method | Middle coat layer pore volume/ solid volume |
|---|---|---|---|---|---|---|---|---|
| 1 | Primer 2 | Middle coat 2 | Top 2 | 20 | 80 | 15 | (i) | 0.25 |
| 2 | Primer 3 | Middle coat 3 | Top 3 | 20 | 80 | 15 | (i) | 0.25 |
| 3 | Primer 4 | Middle coat 4 | Top 4 | 20 | 80 | 15 | (i) | 0.25 |
| 4 | Primer 5 | Middle coat 5 | Top 5 | 20 | 80 | 15 | (i) | 0.25 |
| 5 | Primer 1 | Middle coat 4 | Top 4 | 20 | 80 | 15 | (i) | 0.25 |
| 6 | Primer 2 | Middle coat 4 | Top 4 | 20 | 80 | 15 | (i) | 0.25 |
| 7 | Primer 3 | Middle coat 4 | Top 4 | 20 | 80 | 15 | (i) | 0.25 |
| 8 | Primer 5 | Middle coat 4 | Top 4 | 20 | 80 | 15 | (l) | 0.25 |
| 9 | Primer 6 | Middle coat 4 | Top 4 | 20 | 80 | 15 | (i) | 0.25 |
| 10 | Primer 4 | Middle coat 4 | Top 1 | 20 | 80 | 15 | (i) | 0.25 |
| 11 | Primer 4 | Middle coat 4 | Top 2 | 20 | 80 | 15 | (i) | 0.25 |
| 12 | Primer 4 | Middle coat 4 | Top 3 | 20 | 80 | 15 | (i) | 0.25 |
| 13 | Primer 4 | Middle coat 4 | Top 5 | 20 | 80 | 15 | (i) | 0.25 |
| 14 | Primer 4 | Middle coat 4 | Top 6 | 20 | 80 | 15 | (i) | 0.25 |
| 15 | Primer 4 | Middle coat 7 | Top 4 | 20 | 80 | 15 | (i) | 0.25 |
| 16 | Primer 4 | Middle coat 8 | Top 4 | 20 | 80 | 15 | (i) | 0.25 |
| 17 | Primer 4 | Middle coat 9 | Top 4 | 20 | 80 | 15 | (i) | 0.25 |
| 18 | Primer 4 | Middle coat 10 | Top 4 | 20 | 80 | 15 | (i) | 0.25 |
| 19 | Primer 4 | Middle coat 11 | Top 4 | 20 | 80 | 15 | (i) | 0.25 |
| 20 | Primer 4 | Middle coat 12 | Top 4 | 20 | 80 | 15 | (i) | 0.25 |
| 21 | Primer 4 | Middle coat 13 | Top 4 | 20 | 80 | 15 | (i) | 0.25 |
| 22 | Primer 4 | Middle coat 14 | Top 4 | 20 | 80 | 15 | (i) | 0.25 |
| 23 | Primer 4 | Middle coat 15 | Top 4 | 20 | 80 | 15 | (i) | 0.25 |
| 24 | Primer 4 | Middle coat 16 | Top 4 | 20 | 80 | 15 | (i) | 0.25 |
| 25 | Primer 4 | Middle coat 17 | Top 4 | 20 | 80 | 15 | (i) | 0.25 |
| 26 | Primer 4 | Middle coat 18 | Top 4 | 20 | 80 | 15 | (i) | 0.25 |
| 27 | Primer 4 | Middle coat 19 | Top 4 | 20 | 80 | 15 | (i) | 0.25 |
| 28 | Primer 4 | Middle coat 20 | Top 4 | 20 | 80 | 15 | (i) | 0.25 |
| 29 | Primer 1 | Middle coat 1 | Top 1 | 20 | 80 | 15 | (i) | 0.25 |
| 30 | Primer 6 | Middle coat 6 | Top 6 | 20 | 80 | 15 | (i) | 0.25 |
| 31 | Primer 4 | Middle coat 1 | Top 4 | 20 | 80 | 15 | (i) | 0.25 |
| 32 | Primer 4 | Middle coat 6 | Top 4 | 20 | 80 | 15 | (i) | 0.25 |
| 33 | Primer 4 | Middle coat 21 | Top 4 | 20 | 80 | 15 | (i) | 0.25 |

| No. | Reflection performance Total light reflectance | Luminance | Uniformity of luminance | Workability 90° bending (cracking) | Adhesion 90° bending (peeling) | Dirt resistance Blue magic marker | Scratching resistance | Remarks |
|---|---|---|---|---|---|---|---|---|
| 1 | G to F | G to F | G | F | F | VG | G | Inv. ex. |
| 2 | G to F | G to F | G | G | G | VG | G | |
| 3 | G to F | G to F | G | G | G | VG | G | |
| 4 | G to F | G to F | G | G | G | VG | G | |
| 5 | G to F | G to F | G | F | F | VG | G | |
| 6 | G to F | G to F | G | G | F | VG | G | |
| 7 | G to F | G to F | G | G | F | VG | G | |
| 8 | G to F | G to F | G | G | F | VG | G | |
| 9 | G to F | G to F | G | G | F | VG | F | |
| 10 | G to F | G to F | G | F | F | VG | G | |
| 11 | G to F | G to F | G | G | F | VG | G | |
| 12 | G to F | G to F | G | G | F | VG | G | |
| 13 | G to F | G to F | G | G | F | VG | G | |
| 14 | G to F | G to F | G | G | F | VG | F | |
| 15 | G to F | G to F | G | G | G | VG | G | |
| 16 | G to F | G to F | G | VG | VG | VG | G | |
| 17 | G to F | G to F | G | VG | VG | VG | G | |
| 18 | G to F | G to F | G | VG | VG | VG | G | |
| 19 | G to F | G to F | G | VG | VG | VG | G | |
| 20 | G to F | G to F | G | VG | VG | VG | G | |
| 21 | G to F | G to F | G | G | G | VG | G | |
| 22 | G to F | G to F | G | G | G | VG | G | |
| 23 | G to F | G to F | G | VG | VG | VG | G | |
| 24 | G to F | G to F | G | VG | VG | VG | G | |
| 25 | G to F | G to F | G | VG | VG | VG | G | |
| 26 | G to F | G to F | G | VG | VG | VG | G | |
| 27 | G to F | G to F | G | VG | VG | VG | G | |
| 28 | G to F | G to F | G | VG | VG | VG | G | |

TABLE 5-continued

| | | | | | | | | | |
|---|---|---|---|---|---|---|---|---|---|
| 29 | G to F | G to F | G | P | P | VG | G | Comp. |
| 30 | G to F | G to F | G | G | G | VG | P | ex. |
| 31 | G to F | G to F | G | P | P | vG | G | |
| 32 | G to F | G to F | G | G | G | VG | P | |
| 33 | G to F | G to F | G | P | P | VG | G | |

TABLE 6

| No. | Type of primer coating | Type of middle coat coating | Type of top coating | Thickness after drying (μm) Primer layer | Middle coat layer | Top layer | Coating method | Middle coat layer pore volume/solid volume | Reflection performance Total light reflectance | Luminance | Uniformity of luminance |
|---|---|---|---|---|---|---|---|---|---|---|---|
| 34 | Primer 4 | Middle coat 23 | Top 4 | 20 | 80 | 15 | (i) | 0.02 | F | F | G |
| 35 | Primer 4 | Middle coat 24 | Top 4 | 20 | 80 | 15 | (i) | 0.05 | F | F | G |
| 36 | Primer 4 | Middle coat 25 | Top 4 | 20 | 80 | 15 | (i) | 0.08 | G to F | G to F | G |
| 37 | Primer 4 | Middle coat 26 | Top 4 | 20 | 80 | 15 | (i) | 0.20 | G to F | G to F | G |
| 38 | Primer 4 | Middle coat 4 | Top 4 | 20 | 80 | 15 | (i) | 0.25 | G to F | G to F | G |
| 39 | Primer 4 | Middle coat 27 | Top 4 | 20 | 80 | 15 | (i) | 0.30 | G to F | G to F | G |
| 40 | Primer 4 | Middle coat 22 | Top 4 | 20 | 80 | 15 | (i) | 0.00 | P | P | G |
| 41 | Primer 4 | Middle coat 28 | Top 4 | 20 | 80 | 15 | (i) | 0.50 | G to F | G to F | G |
| 42 | Primer 4 | Middle coat 29 | Top 4 | 20 | 80 | 15 | (i) | 0.25 | P | P | G |
| 43 | Primer 4 | Middle coat 30 | Top 4 | 20 | 80 | 15 | (i) | 0.25 | P | P | G |

| No. | Workability 90° bending (cracking) | Adhesion 90° bending (peeling) | Dirt resistance Blue magic marker | Scratching resistance | Remarks |
|---|---|---|---|---|---|
| 34 | G | G | VG | F | Inv. ex. |
| 35 | G | G | VG | F | |
| 36 | G | G | VG | G | |
| 37 | G | G | VG | G | |
| 38 | G | G | VG | G | |
| 39 | F | F | VG | G | |
| 40 | G | G | VG | F | Comp. ex. |
| 41 | P | P | VG | G | |
| 42 | G | G | VG | G | |
| 43 | G | G | VG | G | |

TABLE 7

| No. | Type of primer coating | Type of middle coat coating | Type of top coating | Thickness after drying (μm) Primer layer | Middle coat layer | Top layer | Coating method | Middle coat layer pore volume/solid volume | Reflection performance Total light reflectance | Luminance | Uniformity of luminance |
|---|---|---|---|---|---|---|---|---|---|---|---|
| 44 | Primer 4 | Middle coat 24 | Top 4 | 20 | 80 | 15 | (i) | 0.05 | F | F | G |
| 45 | Primer 4 | Middle coat 31 | Top 4 | 20 | 80 | 15 | (i) | 0.35 | F | F | G |
| 46 | Primer 4 | Middle coat 32 | Top 4 | 20 | 80 | 15 | (i) | 0.55 | G to F | G to F | G |
| 47 | Primer 4 | Middle coat 33 | Top 4 | 20 | 80 | 15 | (i) | 0.75 | VG to G | VG to G | G |
| 48 | Primer 4 | Middle coat 34 | Top 4 | 20 | 80 | 15 | (i) | 0.90 | VG to G | VG to G | G |
| 49 | Primer 4 | Middle coat 43 | Top 4 | 20 | 80 | 15 | (i) | 1.00 | VG to G | VG to G | G |
| 50 | Primer 4 | Middle coat 44 | Top 4 | 20 | 80 | 15 | (i) | 1.05 | VG to G | VG to G | G |
| 51 | Primer 4 | Middle coat 45 | Top 4 | 20 | 80 | 15 | (i) | 1.10 | G | G | F |
| 52 | Primer 4 | Middle coat 46 | Top 4 | 20 | 80 | 15 | (i) | 0.05 | F | F | VG |
| 53 | Primer 4 | Middle coat 47 | Top 4 | 20 | 80 | 15 | (i) | 0.35 | F | F | VG |
| 54 | Primer 4 | Middle coat 48 | Top 4 | 20 | 80 | 15 | (i) | 0.55 | G to F | G to F | VG |
| 55 | Primer 4 | Middle coat 49 | Top 4 | 20 | 80 | 15 | (i) | 0.75 | VG to G | VG to G | VG |
| 56 | Primer 4 | Middle coat 50 | Top 4 | 20 | 80 | 15 | (i) | 0.90 | VG to G | VG to G | VG |
| 57 | Primer 4 | Middle coat 59 | Top 4 | 20 | 80 | 15 | (i) | 1.00 | VG to G | VG to G | VG |
| 58 | Primer 4 | Middle coat 60 | Top 4 | 20 | 80 | 15 | (i) | 1.05 | VG to G | VG to G | VG |
| 59 | Primer 4 | Middle coat 61 | Top 4 | 20 | 80 | 15 | (i) | 1.10 | G | G | G |
| 60 | Primer 4 | Middle coat 35 | Top 4 | 20 | 80 | 15 | (i) | 0.10 | F | F | G |
| 61 | Primer 4 | Middle coat 36 | Top 4 | 20 | 80 | 15 | (i) | 0.30 | G | G | G |
| 62 | Primer 4 | Middle coat 37 | Top 4 | 20 | 80 | 15 | (i) | 0.70 | VG to G | VG to G | G |
| 63 | Primer 4 | Middle coat 38 | Top 4 | 20 | 80 | 15 | (i) | 0.65 | VG to G | VG to G | G |
| 64 | Primer 4 | Middle coat 39 | Top 4 | 20 | 80 | 15 | (i) | 0.35 | G | G | G |
| 65 | Primer 4 | Middle coat 40 | Top 4 | 20 | 80 | 15 | (i) | 0.20 | F | F | G |
| 66 | Primer 4 | Middle coat 51 | Top 4 | 20 | 80 | 15 | (i) | 0.10 | F | F | VG |

TABLE 7-continued

| | | | | | | | | | | | |
|---|---|---|---|---|---|---|---|---|---|---|---|
| 67 | Primer 4 | Middle coat 52 | Top 4 | 20 | 80 | 15 | (i) | 0.30 | G | G | VG |
| 68 | Primer 4 | Middle coat 53 | Top 4 | 20 | 80 | 15 | (i) | 0.70 | VG to G | VG to G | VG |
| 69 | Primer 4 | Middle coat 54 | Top 4 | 20 | 80 | 15 | (i) | 0.65 | VG to G | VG to G | VG |
| 70 | Primer 4 | Middle coat 55 | Top 4 | 20 | 80 | 15 | (i) | 0.35 | G | G | VG |
| 71 | Primer 4 | Middle coat 56 | Top 4 | 20 | 80 | 15 | (i) | 0.20 | F | F | VG |
| 72 | Primer 4 | Middle coat 41 | Top 4 | 20 | 80 | 15 | (i) | 0.90 | VG to G | VG to G | G |
| 73 | Primer 4 | Middle coat 42 | Top 4 | 20 | 80 | 15 | (i) | 0.90 | VG to G | VG to G | G |
| 74 | Primer 4 | Middle coat 57 | Top 4 | 20 | 80 | 15 | (i) | 0.90 | VG to G | VG to G | VG |
| 75 | Primer 4 | Middle coat 58 | Top 4 | 20 | 80 | 15 | (i) | 0.90 | VG to G | VG to G | VG |

| No. | Workability 90° bending (cracking) | Adhesion 90° bending (peeling) | Dirt resistance Blue magic marker | Scratching resistance | Remarks |
|---|---|---|---|---|---|
| 44 | G | G | VG | G | Inv. ex. |
| 45 | G | G | VG | G | |
| 46 | G | G | VG | G | |
| 47 | G | G | VG | G | |
| 48 | G | G | VG | G | |
| 49 | G | G | VG | G | |
| 50 | G | G | VG | G | |
| 51 | F | F | VG | G | |
| 52 | VG | VG | VG | G | |
| 53 | VG | VG | VG | G | |
| 54 | VG | VG | VG | G | |
| 55 | VG | VG | VG | G | |
| 56 | VG | VG | VG | G | |
| 57 | VG | VG | VG | G | |
| 58 | VG | VG | VG | G | |
| 59 | G | G | VG | G | |
| 60 | G | G | VG | G | |
| 61 | G | G | VG | G | |
| 62 | G | G | VG | G | |
| 63 | G | G | VG | G | |
| 64 | G | G | VG | G | |
| 65 | G | G | VG | G | |
| 66 | VG | VG | VG | G | |
| 67 | VG | VG | VG | G | |
| 68 | VG | VG | VG | G | |
| 69 | VG | VG | VG | G | |
| 70 | VG | VG | VG | G | |
| 71 | VG | VG | VG | G | |
| 72 | G | G | VG | G | |
| 73 | G | G | VG | G | |
| 74 | VG | VG | VG | G | |
| 75 | VG | VG | VG | G | |

TABLE 8

| No. | Type of primer coating | Type of middle coat coating | Type of top coating | Thickness after drying (μm) Primer layer | Middle coat layer | Top layer | Coating method | Middle coat layer pore volume/ solid volume | Reflection performance Total light reflectance | Luminance | Uniformity of luminance |
|---|---|---|---|---|---|---|---|---|---|---|---|
| 76 | Primer 4 | Middle coat 25 | Top 4 | 20 | 80 | 15 | (i) | 0.08 | G to F | G to F | G |
| 77 | Primer 4 | Middle coat 62 | Top 4 | 20 | 80 | 15 | (i) | 0.01 | F | F | G |
| 78 | Primer 4 | Middle coat 61 | Top 4 | 20 | 80 | 15 | (i) | 1.10 | G | G | G |
| 79 | Primer 4 | Middle coat 63 | Top 4 | 20 | 80 | 15 | (i) | 1.20 | G | G | G |

| No. | Workability 90° bending (cracking) | Adhesion 90° bending (peeling) | Dirt resistance Blue magic marker | Scratching resistance | Remark |
|---|---|---|---|---|---|
| 76 | G | G | VG | G | Inv. ex. |
| 77 | G | G | VG | G | |
| 78 | G | G | VG | G | |
| 79 | F | F | VG | G | |

TABLE 9

| No. | Type of primer coating | Type of middle coat coating | Type of top coating | Thickness after drying (μm) Primer layer | Middle coat layer | Top layer | Coating method | Middle coat layer pore volume/solid volume | Reflection performance Total light reflectance | Luminance | Uniformity of luminance |
|---|---|---|---|---|---|---|---|---|---|---|---|
| 80 | Primer 7 | Middle coat 34 | Top 4 | 20 | 80 | 15 | (i) | 0.90 | G | G | G |
| 81 | Primer 8 | Middle coat 34 | Top 4 | 20 | 80 | 15 | (i) | 0.90 | VG to G | VG to G | G |
| 82 | Primer 4 | Middle coat 34 | Top 4 | 20 | 80 | 15 | (i) | 0.90 | VG to G | VG to G | G |
| 83 | Primer 9 | Middle coat 34 | Top 4 | 20 | 80 | 15 | (i) | 0.90 | VG to G | VG to G | G |
| 84 | Primer 10 | Middle coat 34 | Top 4 | 20 | 80 | 15 | (i) | 0.90 | VG to G | VG to G | G |
| 85 | Primer 11 | Middle coat 34 | Top 4 | 20 | 80 | 15 | (i) | 0.90 | VG to G | VG to G | G |
| 86 | Primer 7 | Middle coat 50 | Top 4 | 20 | 80 | 15 | (i) | 0.90 | G | G | G |
| 87 | Primer 8 | Middle coat 50 | Top 4 | 20 | 80 | 15 | (i) | 0.90 | VG to G | VG to G | G |
| 88 | Primer 4 | Middle coat 50 | Top 4 | 20 | 80 | 15 | (i) | 0.90 | VG to G | VG to G | G |
| 89 | Primer 9 | Middle coat 50 | Top 4 | 20 | 80 | 15 | (i) | 0.90 | VG to G | VG to G | G |
| 90 | Primer 10 | Middle coat 50 | Top 4 | 20 | 80 | 15 | (i) | 0.90 | VG to G | VG to G | G |
| 91 | Primer 11 | Middle coat 50 | Top 4 | 20 | 80 | 15 | (i) | 0.90 | VG to G | VG to G | G |

| No. | Workability 90° bending (cracking) | Adhesion 90° bending (peeling) | Dirt resistance Blue magic marker | Scratching resistance | Remarks |
|---|---|---|---|---|---|
| 80 | G | G | VG | G | Inv. ex. |
| 81 | G | G | VG | G | |
| 82 | G | G | VG | G | |
| 83 | G | G | VG | G | |
| 84 | G | G | VG | G | |
| 85 | F | F | VG | G | |
| 86 | VG | VG | VG | G | |
| 87 | VG | VG | VG | G | |
| 88 | VG | VG | VG | G | |
| 89 | VG | VG | VG | G | |
| 90 | VG | VG | VG | G | |
| 91 | G | G | VG | G | |

TABLE 10

| No. | Type of primer coating | Type of middle coat coating | Type of top coating | Thickness after drying (μm) Primer layer | Middle coat layer | Top layer | Coating method | Middle coat layer pore volume/solid volume | Reflection performance Total light reflectance | Luminance | Uniformity of luminance |
|---|---|---|---|---|---|---|---|---|---|---|---|
| 92 | Primer 4 | Middle coat 34 | Top 7 | 20 | 80 | 15 | (i) | 0.90 | VG to G | VG to G | G |
| 93 | Primer 4 | Middle coat 34 | Top 8 | 20 | 80 | 15 | (i) | 0.90 | VG | VG | G |
| 94 | Primer 4 | Middle coat 34 | Top 9 | 20 | 80 | 15 | (i) | 0.90 | VG | VG | G |
| 95 | Primer 4 | Middle coat 34 | Top 10 | 20 | 80 | 15 | (i) | 0.90 | VG | VG | G |
| 96 | Primer 4 | Middle coat 34 | Top 11 | 20 | 80 | 15 | (i) | 0.90 | VG | VG | G |
| 97 | Primer 4 | Middle coat 34 | Top 12 | 20 | 80 | 15 | (i) | 0.90 | VG | VG | G |
| 98 | Primer 4 | Middle coat 50 | Top 7 | 20 | 80 | 15 | (i) | 0.90 | VG to G | VG to G | G |
| 99 | Primer 4 | Middle coat 50 | Top 8 | 20 | 80 | 15 | (i) | 0.90 | VG | VG | G |
| 100 | Primer 4 | Middle coat 50 | Top 9 | 20 | 80 | 15 | (i) | 0.90 | VG | VG | G |
| 101 | Primer 4 | Middle coat 50 | Top 10 | 20 | 80 | 15 | (i) | 0.90 | VG | VG | G |
| 102 | Primer 4 | Middle coat 50 | Top 11 | 20 | 80 | 15 | (i) | 0.90 | VG | VG | G |
| 103 | Primer 4 | Middle coat 50 | Top 12 | 20 | 80 | 15 | (i) | 0.90 | VG | VG | G |
| 104 | Primer 4 | Middle coat 34 | Top 13 | 20 | 80 | 15 | (i) | 0.90 | VG to G | VG to G | G |
| 105 | Primer 4 | Middle coat 34 | Top 14 | 20 | 80 | 15 | (i) | 0.90 | VG to G | VG to G | VG |
| 106 | Primer 4 | Middle coat 34 | Top 15 | 20 | 80 | 15 | (i) | 0.90 | VG to G | VG to G | VG |
| 107 | Primer 4 | Middle coat 34 | Top 16 | 20 | 80 | 15 | (i) | 0.90 | VG to G | VG to G | VG |
| 108 | Primer 4 | Middle coat 34 | Top 17 | 20 | 80 | 15 | (i) | 0.90 | VG to G | VG to G | VG |
| 109 | Primer 4 | Middle coat 34 | Top 18 | 20 | 80 | 15 | (i) | 0.90 | VG to G | VG to G | VG |
| 110 | Primer 4 | Middle coat 34 | Top 19 | 20 | 80 | 15 | (i) | 0.90 | VG to G | VG to G | VG |
| 111 | Primer 4 | Middle coat 34 | Top 20 | 20 | 80 | 15 | (i) | 0.90 | VG to G | VG to G | VG |
| 112 | Primer 4 | Middle coat 34 | Top 21 | 20 | 80 | 15 | (i) | 0.90 | VG to G | VG to G | VG |
| 113 | Primer 4 | Middle coat 50 | Top 13 | 20 | 80 | 15 | (i) | 0.90 | VG to G | VG to G | G |
| 114 | Primer 4 | Middle coat 50 | Top 14 | 20 | 80 | 15 | (i) | 0.90 | VG to G | VG to G | VG |
| 115 | Primer 4 | Middle coat 50 | Top 15 | 20 | 80 | 15 | (i) | 0.90 | VG to G | VG to G | VG |
| 116 | Primer 4 | Middle coat 50 | Top 16 | 20 | 80 | 15 | (i) | 0.90 | VG to G | VG to G | VG |
| 117 | Primer 4 | Middle coat 50 | Top 17 | 20 | 80 | 15 | (i) | 0.90 | VG to G | VG to G | VG |
| 118 | Primer 4 | Middle coat 50 | Top 18 | 20 | 80 | 15 | (i) | 0.90 | VG to G | VG to G | VG |
| 119 | Primer 4 | Middle coat 50 | Top 19 | 20 | 80 | 15 | (i) | 0.90 | VG to G | VG to G | VG |
| 120 | Primer 4 | Middle coat 50 | Top 20 | 20 | 80 | 15 | (i) | 0.90 | VG to G | VG to G | VG |
| 121 | Primer 4 | Middle coat 50 | Top 21 | 20 | 80 | 15 | (i) | 0.90 | VG to G | VG to G | VG |
| 122 | Primer 4 | Middle coat 34 | Top 22 | 20 | 80 | 15 | (i) | 0.90 | VG to G | VG to G | G |

TABLE 10-continued

| | | | | | | | | | | | |
|---|---|---|---|---|---|---|---|---|---|---|---|
| 123 | Primer 4 | Middle coat 34 | Top 23 | 20 | 80 | 15 | (i) | 0.90 | VG to G | VG to G | VG |
| 124 | Primer 4 | Middle coat 34 | Top 24 | 20 | 80 | 15 | (i) | 0.90 | VG to G | VG to G | VG |
| 125 | Primer 4 | Middle coat 34 | Top 25 | 20 | 80 | 15 | (i) | 0.90 | VG to G | VG to G | VG |
| 126 | Primer 4 | Middle coat 34 | Top 26 | 20 | 80 | 15 | (i) | 0.90 | VG to G | VG to G | VG |
| 127 | Primer 4 | Middle coat 50 | Top 22 | 20 | 80 | 15 | (i) | 0.90 | VG to G | VG to G | G |
| 128 | Primer 4 | Middle coat 50 | Top 23 | 20 | 80 | 15 | (i) | 0.90 | VG to G | VG to G | VG |
| 129 | Primer 4 | Middle coat 50 | Top 24 | 20 | 80 | 15 | (i) | 0.90 | VG to G | VG to G | VG |
| 130 | Primer 4 | Middle coat 50 | Top 25 | 20 | 80 | 15 | (i) | 0.90 | VG to G | VG to G | VG |
| 131 | Primer 4 | Middle coat 50 | Top 26 | 20 | 80 | 15 | (i) | 0.90 | VG to G | VG to G | VG |

| No. | Workability 90° bending (cracking) | Adhesion 90° bending (peeling) | Dirt resistance Blue magic marker | Scratching resistance | Remarks |
|---|---|---|---|---|---|
| 92 | G | G | VG | G | Inv. ex. |
| 93 | G | G | VG | VG | |
| 94 | G | G | VG | VG | |
| 95 | G | G | VG | VG | |
| 96 | G | G | VG | VG | |
| 97 | F | F | VG | VG | |
| 98 | VG | VG | VG | G | |
| 99 | VG | VG | VG | VG | |
| 100 | VG | VG | VG | VG | |
| 101 | VG | VG | VG | VG | |
| 102 | VG | VG | VG | VG | |
| 103 | G | G | VG | VG | |
| 104 | G | G | VG | G | |
| 105 | G | G | G | G | |
| 106 | G | G | G | G | |
| 107 | G | G | G | G | |
| 108 | G | G | G | G | |
| 109 | G | G | G | G | |
| 110 | G | G | G | G | |
| 111 | G | G | G | G | |
| 112 | G | G | F | VG | |
| 113 | VG | VG | G | G | |
| 114 | VG | VG | G | G | |
| 115 | VG | VG | G | G | |
| 116 | VG | VG | G | G | |
| 117 | VG | VG | G | G | |
| 118 | VG | VG | G | G | |
| 119 | VG | VG | G | G | |
| 120 | VG | VG | G | G | |
| 121 | VG | VG | F | VG | |
| 122 | G | G | VG | G | |
| 123 | G | G | G | G | |
| 124 | G | G | G | G | |
| 125 | G | G | G | G | |
| 126 | G | G | F | G | |
| 127 | VG | VG | G | G | |
| 128 | VG | VG | G | G | |
| 129 | VG | VG | G | G | |
| 130 | VG | VG | G | G | |
| 131 | VG | VG | F | G | |

TABLE 11A

| No. | Type of primer coating | Type of middle coat coating | Type of top coating | Thickness after drying (μm) Primer layer | Middle coat layer | Top layer | Coating method | Middle coat layer pore volume/ solid volume | Reflection performance Total light reflectance | Luminance | Uniformity of luminance |
|---|---|---|---|---|---|---|---|---|---|---|---|
| 132 | Primer 4 | Middle coat 34 | Top 9 | 20 | 50 | 15 | (i) | 0.90 | G | G | G |
| 133 | Primer 4 | Middle coat 34 | Top 9 | 20 | 60 | 15 | (i) | 0.90 | VG to G | VG to G | G |
| 134 | Primer 4 | Middle coat 34 | Top 9 | 20 | 70 | 15 | (i) | 0.90 | VG | VG | G |
| 135 | Primer 4 | Middle coat 34 | Top 9 | 20 | 80 | 15 | (i) | 0.90 | VG | VG | G |
| 136 | Primer 4 | Middle coat 34 | Top 9 | 20 | 90 | 15 | (i) | 0.90 | VG | VG | G |
| 137 | Primer 4 | Middle coat 34 | Top 9 | 20 | 100 | 15 | (i) | 0.90 | VG | VG | G |
| 138 | Primer 4 | Middle coat 34 | Top 9 | 20 | 110 | 15 | (i) | 0.90 | VG | VG | G |
| 139 | Primer 4 | Middle coat 50 | Top 9 | 20 | 50 | 15 | (i) | 0.90 | G | G | G |
| 140 | Primer 4 | Middle coat 50 | Top 9 | 20 | 60 | 15 | (i) | 0.90 | VG to G | VG to G | G |
| 141 | Primer 4 | Middle coat 50 | Top 9 | 20 | 70 | 15 | (i) | 0.90 | VG | VG | G |
| 142 | Primer 4 | Middle coat 50 | Top 9 | 20 | 80 | 15 | (i) | 0.90 | VG | VG | G |
| 143 | Primer 4 | Middle coat 50 | Top 9 | 20 | 90 | 15 | (i) | 0.90 | VG | VG | G |
| 144 | Primer 4 | Middle coat 50 | Top 9 | 20 | 100 | 15 | (i) | 0.90 | VG | VG | G |

TABLE 11A-continued

| | | | | | | | | | | | |
|---|---|---|---|---|---|---|---|---|---|---|---|
| 145 | Primer 4 | Middle coat 50 | Top 9 | 20 | 110 | 15 | (i) | 0.90 | VG | VG | G |
| 146 | Primer 4 | Middle coat 34 | Top 17 | 20 | 50 | 15 | (i) | 0.90 | G to F | G to F | VG |
| 147 | Primer 4 | Middle coat 34 | Top 17 | 20 | 60 | 15 | (i) | 0.90 | G | G | VG |
| 148 | Primer 4 | Middle coat 34 | Top 17 | 20 | 70 | 15 | (i) | 0.90 | VG to G | VG to G | VG |
| 149 | Primer 4 | Middle coat 34 | Top 17 | 20 | 80 | 15 | (i) | 0.90 | VG to G | VG to G | VG |
| 150 | Primer 4 | Middle coat 34 | Top 17 | 20 | 90 | 15 | (i) | 0.90 | VG to G | VG to G | VG |
| 151 | Primer 4 | Middle coat 34 | Top 17 | 20 | 100 | 15 | (i) | 0.90 | VG to G | VG to G | VG |
| 152 | Primer 4 | Middle coat 34 | Top 17 | 20 | 110 | 15 | (i) | 0.90 | VG to G | VG to G | VG |
| 153 | Primer 4 | Middle coat 50 | Top 17 | 20 | 50 | 15 | (i) | 0.90 | G to F | G to F | VG |
| 154 | Primer 4 | Middle coat 50 | Top 17 | 20 | 60 | 15 | (i) | 0.90 | G | G | VG |
| 155 | Primer 4 | Middle coat 50 | Top 17 | 20 | 70 | 15 | (i) | 0.90 | VG to G | VG to G | VG |

| No. | Workability 90° bending (cracking) | Adhesion 90° bending (peeling) | Dirt resistance Blue magic marker | Scratching resistance | Remarks |
|---|---|---|---|---|---|
| 132 | G | G | VG | VG | Inv. ex. |
| 133 | G | G | VG | VG | |
| 134 | G | G | VG | VG | |
| 135 | G | G | VG | VG | |
| 136 | G | G | VG | VG | |
| 137 | G | G | VG | VG | |
| 138 | F | F | VG | VG | |
| 139 | VG | VG | VG | VG | |
| 140 | VG | VG | VG | VG | |
| 141 | VG | VG | VG | VG | |
| 142 | VG | VG | VG | VG | |
| 143 | VG | VG | VG | VG | |
| 144 | VG | VG | VG | VG | |
| 145 | G | G | VG | VG | |
| 146 | G | G | G | G | |
| 147 | G | G | G | G | |
| 148 | G | G | G | G | |
| 149 | G | G | G | G | |
| 150 | G | G | G | G | |
| 151 | G | G | G | G | |
| 152 | F | F | G | G | |
| 153 | VG | VG | G | G | |
| 154 | VG | VG | G | G | |
| 155 | VG | VG | G | G | |

TABLE 11B

| | | Type of | | Thickness after drying (μm) | | | | Middle layer | Reflection performance | | |
|---|---|---|---|---|---|---|---|---|---|---|---|
| No. | Type of primer coating | middle coat coating | Type of top coating | Primer layer | Middle coat layer | Top layer | Coating method | pore volume/ solid volume | Total light reflectance | Luminance | Uniformity of luminance |
| 156 | Primer 4 | Middle coat 50 | Top 17 | 20 | 80 | 15 | (i) | 0.90 | VG to G | VG to G | VG |
| 157 | Primer 4 | Middle coat 50 | Top 17 | 20 | 90 | 15 | (i) | 0.90 | VG to G | VG to G | VG |
| 158 | Primer 4 | Middle coat 50 | Top 17 | 20 | 100 | 15 | (i) | 0.90 | VG to G | VG to G | VG |
| 159 | Primer 4 | Middle coat 50 | Top 17 | 20 | 110 | 15 | (i) | 0.90 | VG to G | VG to G | VG |
| 160 | Primer 4 | Middle coat 34 | Top 9 | 20 | 80 | 5 | (i) | 0.90 | VG to G | VG to G | G |
| 161 | Primer 4 | Middle coat 34 | Top 9 | 20 | 80 | 10 | (i) | 0.90 | VG | VG | G |
| 162 | Primer 4 | Middle coat 34 | Top 9 | 20 | 80 | 20 | (i) | 0.90 | VG | VG | G |
| 163 | Primer 4 | Middle coat 34 | Top 9 | 20 | 80 | 25 | (i) | 0.90 | VG | VG | G |
| 164 | Primer 4 | Middle coat 34 | Top 9 | 20 | 80 | 30 | (i) | 0.90 | VG | VG | G |
| 165 | Primer 4 | Middle coat 50 | Top 9 | 20 | 80 | 5 | (i) | 0.90 | VG to G | VG to G | G |
| 166 | Primer 4 | Middle coat 50 | Top 9 | 20 | 80 | 10 | (i) | 0.90 | VG | VG | G |
| 167 | Primer 4 | Middle coat 50 | Top 9 | 20 | 80 | 20 | (i) | 0.90 | VG | VG | G |
| 168 | Primer 4 | Middle coat 50 | Top 9 | 20 | 80 | 25 | (i) | 0.90 | VG | VG | G |
| 169 | Primer 4 | Middle coat 50 | Top 9 | 20 | 80 | 30 | (i) | 0.90 | VG | VG | G |
| 170 | Primer 4 | Middle coat 34 | Top 17 | 20 | 80 | 5 | (i) | 0.90 | VG to G | VG to G | G |
| 171 | Primer 4 | Middle coat 34 | Top 17 | 20 | 80 | 10 | (i) | 0.90 | VG to G | VG to G | VG |
| 172 | Primer 4 | Middle coat 34 | Top 17 | 20 | 80 | 20 | (i) | 0.90 | VG to G | VG to G | VG |
| 173 | Primer 4 | Middle coat 34 | Top 17 | 20 | 80 | 25 | (i) | 0.90 | VG to G | VG to G | VG |
| 174 | Primer 4 | Middle coat 34 | Top 17 | 20 | 80 | 30 | (i) | 0.90 | VG to G | VG to G | VG |
| 175 | Primer 4 | Middle coat 50 | Top 17 | 20 | 80 | 5 | (i) | 0.90 | VG to G | VG to G | G |
| 176 | Primer 4 | Middle coat 50 | Top 17 | 20 | 80 | 10 | (i) | 0.90 | VG to G | VG to G | VG |
| 177 | Primer 4 | Middle coat 50 | Top 17 | 20 | 80 | 20 | (i) | 0.90 | VG to G | VG to G | VG |
| 178 | Primer 4 | Middle coat 50 | Top 17 | 20 | 80 | 25 | (i) | 0.90 | VG to G | VG to G | VG |
| 179 | Primer 4 | Middle coat 50 | Top 17 | 20 | 80 | 30 | (i) | 0.90 | VG to G | VG to G | VG |

TABLE 11B-continued

| No. | Workability 90° bending (cracking) | Adhesion 90° bending (peeling) | Dirt resistance Blue magic marker | Scratching resistance | Remarks |
|---|---|---|---|---|---|
| 156 | VG | VG | G | G | Inv. ex. |
| 157 | VG | VG | G | G | |
| 158 | VG | VG | G | G | |
| 159 | G | G | G | G | |
| 160 | F | F | VG | VG | |
| 161 | G | G | VG | VG | |
| 162 | G | G | VG | VG | |
| 163 | G | G | VG | VG | |
| 164 | G | G | VG | G | |
| 165 | G | G | VG | VG | |
| 166 | VG | VG | VG | VG | |
| 167 | VG | VG | VG | VG | |
| 168 | VG | VG | VG | VG | |
| 169 | VG | VG | VG | G | |
| 170 | F | F | G | G | |
| 171 | G | G | G | G | |
| 172 | G | G | G | G | |
| 173 | G | G | G | G | |
| 174 | G | G | G | F | |
| 175 | G | G | G | G | |
| 176 | VG | VG | G | G | |
| 177 | VG | VG | G | G | |
| 178 | VG | VG | G | G | |
| 179 | VG | VG | G | F | |

TABLE 12

| | | | | Thickness after drying (μm) | | | | Middle coat layer pore | | Reflection performance | | |
|---|---|---|---|---|---|---|---|---|---|---|---|---|
| No. | Type of primer coating | Type of middle coat coating | Type of top coating | Primer layer | Middle coat layer | Top layer | Coating method | volume/ solid volume | Mixed layer at interface | Total light Reflectance | Luminance | Uniformity of luminance |
| 180 | Primer 4 | Middle coat 34 | Top 9 | 20 | 80 | 15 | (i) | 0.90 | Yes | VG | VG | G |
| 181 | Primer 4 | Middle coat 34 | Top 9 | 20 | 80 | 15 | (ii) | 0.90 | Yes | VG | VG | G |
| 182 | Primer 4 | Middle coat 34 | Top 9 | 20 | 80 | 15 | (iii) | 0.90 | No | VG | VG | G |
| 183 | Primer 4 | Middle coat 50 | Top 9 | 20 | 80 | 15 | (i) | 0.90 | Yes | VG | VG | G |
| 184 | Primer 4 | Middle coat 50 | Top 9 | 20 | 80 | 15 | (ii) | 0.90 | Yes | VG | VG | G |
| 185 | Primer 4 | Middle coat 50 | Top 9 | 20 | 80 | 15 | (iii) | 0.90 | No | VG | VG | G |

| No. | Workability 90° bending (cracking) | Adhesion 90° bending (peeling) | Dirt resistance Blue magic marker | Scratching resistance | Remarks |
|---|---|---|---|---|---|
| 180 | G | G | VG | VG | Inv. ex. |
| 181 | G | G | VG | VG | |
| 182 | F | F | VG | VG | |
| 183 | VG | VG | VG | VG | |
| 184 | VG | VG | VG | VG | |
| 185 | G | G | VG | VG | |

(1) Effect of Type of Polyester of Coating Layer

Examples of the effects of the type of polyester of the coating layer are shown in Nos. 1 to 28. Comparative examples are shown in Nos. 29 to 33.

The precoated metal sheets of the present invention (Nos. 1 to 28) were excellent in each of the total light reflectance, luminance, workability, adhesion, and dirt resistance.

In a sheet with a number average molecular weight of the binder of 19000 (No. 1), the workability and adhesion tended to slightly drop, so the number average molecular weight of the binder is more preferably 20000 to 28000.

In sheets with a number average molecular weight of the binder of the middle coat layer of less than 19000 (Nos. 29 and 31), the workability and adhesion are inferior, so this is not preferred. In sheets with a number average molecular weight of the binder of the middle coat of over 28000 (Nos. 30 and 32), the scratching resistance is inferior, so this is not preferred.

The effects of the number average molecular weight of the binder of the primer layer are shown in Nos. 3 and 5 to 9. In a sheet with a number average molecular weight of less than 19000 (No. 5), workability and adhesion tended to be slightly inferior, while in a sheet with a number average molecular weight of over 28000 (No. 9), the scratching resistance tended to be slightly inferior. It was learned that the number average molecular weight of the binder of the primer layer is preferably 19000 to 28000. Further, in a sheet with a primer layer and a middle coat layer using the same binder resin (No. 3), the adhesion was best. It was learned that the binder resin of the primer layer is optimally the same as the middle coat.

The effect of the number average molecular weight of the binder of the top layer is shown in Nos. 3 and 10 to 14. In a sheet where the number average molecular weight is less than 19000 (No. 10), the workability and adhesion tended to be slightly inferior, while in a sheet where the number average molecular weight is over 28000 (No. 14) the scratching resistance tended to be slightly inferior. It is learned that the number average molecular weight of the binder of the top layer is preferably 19000 to 28000. Further, in a sheet where the top layer and the middle coat layer are the same in binder resin (No. 3), the adhesion is most superior. It is learned that the binder resin of the top layer is most preferably the same as the middle coat.

Further, by including as the binder of the middle coat layer, in addition to the polyester resin A with a number average molecular weight of 19000 to 27000, the polyester resin B with a number average molecular weight of 2000 to 6000 and a hydroxyl value of 20 or more in a mass ratio of 0.25≤polyester resin B/polyester resin A≤4, as shown in Nos. 16 to 20 and 23 to 28, further superior workability and adhesion can be secured. In sheets where the number average molecular weight of the polyester resin used jointly with the polyester resin A as the binder of the middle coat layer is less than 2000 (No. 15) and over 6000 (No. 21), no effect of improvement of the workability and adhesion tended to be observed. In a sheet where the polyester resin used together with the polyester A has a number average molecular weight of the range of 2000 to 6000, but the hydroxyl value is less than 20 (No. 22), no effect of improvement of the workability and adhesion tended to be observed. In a sheet where the concentration of the polyester resin with a number average molecular weight of 19000 to 28000 in the binder is less than 20 mass % (No. 33), the workability and adhesion are inferior, so this is not preferred.

(2) Effects of Solid Volume Concentration of Rutile-Type Titanium Oxide and Type of Pigment of Middle Coat Layer The effect of the solid volume concentration of the rutile-type titanium oxide of the middle coat layer is shown in Nos. 34 to 39, 42, and 43.

In sheets where the solid volume concentration of the titanium oxide of the middle coat layer is 40% or less (Nos. 34 and 35), the reflection performance tends to slightly drop, while in a sheet where the solid volume concentration of the titanium oxide of the middle coat layer is 70% or more (No. 39), the workability and adhesion tend to slightly drop, so the solid volume concentration of the titanium oxide is preferably 50 to 65%.

In a sheet where the solid volume concentration of the titanium oxide of the middle coat layer is less than 35% (No. 40), the reflection performance is inferior, so this is not preferred. In a sheet where the solid volume concentration of the titanium oxide of the middle coat layer exceeds 70% (No. 41), the workability and adhesion are inferior, so this is not preferred.

The effect of the type of pigment of the middle coat layer is shown in Nos. 42 and 43. With a pigment other than rutile-type titanium oxide, the reflection performance is inferior, so this is not preferred. It is learned that the pigment of the middle coat layer is needed to be rutile-type titanium oxide.

(3) Effect of Addition of Low Refractive Index Particles to Middle Coat Layer

As shown in Nos. 46 to 50, 54 to 58, 61 to 64, 67 to 70, and 72 to 75, by including a low refractive index pigment together with rutile-type titanium oxide in the middle coat layer, it is possible to obtain a total light reflectance higher than with rutile-type titanium oxide alone, so this is more preferred. In sheets where the (volume of low refractive index pigment÷volume of rutile-type, titanium oxide) is less than 0.05 (Nos. 45 and 53), the effect of addition of low refractive index particles is small, while in sheets where the (volume of low refractive index particles volume of rutile-type titanium oxide) is over 0.2 (Nos. 51 and 59), the total light reflectance, workability, and adhesion tend to start to drop slightly, so a (volume of low refractive index particles÷volume of rutile-type titanium oxide) of 0.05 to 0.2 is more preferable. In sheets where the particle size of the low refractive index particles is less than 1 μm (Nos. 60 and 66) and over 10 μm (Nos. 65 and 71), the effect of adding the low refractive index particles is small, so the particle size of the low refractive index particles is more preferably 1 to 10 μm.

(4) Effect of Porosity of Middle Coat Layer

The effect of the pores of the middle coat layer is shown in Nos. 77 and 79. By changing the dispersion method, in a sheet where the [pore volume/solid volume] is made less than 0.02 (No. 77), the reflection performance tended to slightly drop, while in a sheet where the [pore volume/solid volume] is made to exceed 1.1 (No. 79), the workability and adhesion tended to slightly drop. It is learned that a [pore volume/solid volume] of 0.02 to 1.1 is preferable.

(5) Effect of Solid Volume Concentration of Rutile-Type Titanium Oxide of Primer Layer The effect of the solid volume concentration of the rutile-type titanium oxide of the primer layer is shown in Nos. 80 to 91. In sheets where the solid volume concentration of the titanium oxide of the primer layer is less than 20% (Nos. 80 and 86), the reflection performance tends to slightly drop, while in sheets where the solid volume concentration of the titanium oxide of the primer layer exceeds 35% (Nos. 85 and 91), the workability and adhesion tend to slightly drop, so the solid volume concentration of the titanium oxide is more preferably 20 to 35%.

(6) Effect of Added Pigment of Top Layer

As shown in Nos. 93 to 96 and 99 to 102, by adding rutile-type titanium oxide to the top layer, a further higher total light reflectance is obtained. In sheets where the solid volume concentration of the rutile-type titanium oxide is over 35% (Nos. 97 and 103), the workability and adhesion tend to slightly drop, while in sheets where the solid volume concentration of the rutile-type titanium oxide is less than 20% (Nos. 92 and 98), the effect of improvement of the total light reflectance is small, so the solid volume concentration of the rutile-type titanium oxide is more preferably 20 to 35%.

As shown in Nos. 105 to 111, 114 to 120, 123 to 125, and 128 to 130, by adding a-matting agent (silica) to the top layer, the uniformity of the screen surface can be improved. However, the dirt resistance tended to slightly drop. In sheets where the solid volume concentration of the matting agent (silica) was over 15% (Nos. 112 and 121), the dirt resistance tended to further drop, while in sheets where the solid volume concentration of the matting agent (silica) was less than 3% (Nos. 104 and 113), the effect of improvement of the uniformity of the screen surface was small, so the solid volume concentration of the matting agent (silica) was more preferably 3 to 15%. In sheets where the particle size of the matting agent (silica) was less than 3 μm (Nos. 122 and 127), the effect of improvement of the uniformity of the screen surface was small, while in sheets where the particle size of the matting agent (silica) was over 9 μm (Nos. 126 and 131), the dirt resistance tended to further drop, so the particle size of the matting agent (silica) is more preferably 3 to 9 μm.

(7) Effect of Thicknesses of Middle Coat Layer and Top Layer

The effect of the thickness of the middle coat layer is shown in Nos. 132 to 159. In sheets where the thickness of the middle coat layer is less than 60 μm (Nos. 132, 139, 146, and 153), the reflection performance tends to slightly drop, while in sheets where the thickness of the middle coat is over 100 μm (Nos. 133, 145, 152, and 159), the workability and adhesion tend to slightly drop, so the thickness of the middle coat layer is more preferably 60 to 100 μm.

The effect of the thickness of the top layer is shown in Nos. 160 to 179. In sheets where the thickness of the top layer is less than 10 μm (Nos. 160, 165, 170, and 175), the reflection performance, workability, and adhesion tend to slightly drop, while in sheets where the thickness of the top layer is over 25 μm (Nos. 164, 169, 174, and 179), the scratching resistance tends to slightly drop, so the thickness of the top layer is more preferably 10 to 25 μm.

(8) Effect of Coating Method

The effect of the coating method is shown in Nos. 180 to 185. In sheets where one layer of each of the middle coat layer and top layer is coated and baked on (Nos. 182 and 185), no mixed layer could be observed at the interface of the middle coat layer and top layer and the workability and adhesion tended to drop. In sheets prepared by multilayer simultaneous coating and wet-on-wet coating (Nos. 180, 181, 183, and 184), a mixed layer was observed at the interface of the middle coat layer and top layer and the adhesion was improved, so it was learned that this was more preferable.

Next, examples where the centerline average roughness Ra of the interface between the middle coat layer and top layer was adjusted will be explained.

[Coating]

First, the coatings used in the examples will be explained in detail. In these examples, as the coated metal material, a base material comprised of galvanized steel sheet on the surface of which are laminated, in order from that steel sheet side, a primer layer, middle coat layer, and top layer for a three-layer structure or a primer layer, middle coat layer, and two top layers for a four-layer structure to form a precoated steel sheet covered with coated layers is used. Below, the ingredients of the coatings used will be explained in the order of the primer layer coating (hereinafter referred to as the "primer coating"), middle coat layer coating (hereinafter referred to as the "middle coat coating"), and top layer coating (hereinafter referred to as the "top coating").

(Primer Coating)

Regarding the primer coating, as shown in the following Table 13, as the binder, an amorphous polyester resin made by Toyobo, "Vylon®630" (number average molecular weight of 23000 and hydroxyl value of 5) was used. As the pigment, rutile-type titanium oxide with an average particle size of 280 nm made by Ishihara Sangyo Kaisha Ltd., "Tipaque@ CR95" (refractive index: 2.5) was used. This was mixed with the binder to give a solid volume concentration of the rutile-type titanium oxide of 25% to prepare the primer coating (Primer 1).

TABLE 13

| | Binder | | Pigment | | | |
|---|---|---|---|---|---|---|
| Type of coating | Type | Tg [° C.] | Type | | Average particle size (μm) | Solid volume concentration (%) |
| Primer 1 | Vylon 630 | 7 | Titanium oxide | Tipaque CR95 | 0.28 | 25 |

(Middle Coat Coating)

Regarding the middle coat coating, as shown in Table 14, as the base resin, the amorphous polyester resin "Vylon®" series, made by Toyobo and the amorphous polyester resin "Desmophen®" series made by Sumika Bayer Urethane were used. For example, in the Middle Coats 1 to 20, "Vylon® 630" (number average molecular weight of 23000 and hydroxyl value of 5) and the amorphous polyester resin "Desmophen® 690" (number average molecular weight of 3500 and hydroxyl value of 46) made by Sumika Bayer Urethane dissolved in an organic solvent (Solvesso 150 and cyclohexanon mixed in a mass ratio of 1:1) in a mass ratio of 1:1 was used. As a cross-linking agent, the commercially available hexamethoxymethylated melamine "Cymel® 303" made by Mitsui Cytec was added in 15 parts by mass to a polyester resin of a solid content of 100 parts by mass and, further, the commercially available acidic catalyst "Catalyst® 6003B" made by Mitsui Cytec was added in 0.5 part by mass to obtain a polyester-based clear coating.

As the rutile-type titanium oxide, "Tipaque® CR95" (refractive index: 2.5) having an average particle size of 280 nm made by Ishihara Sangyo Kaisha Ltd. was used.

Further, as the low refractive index particles contained in the middle coat layer, the silica "Sunsphere®H-31" (average particle size 3 μm) made by Asahi Glass was used.

Further, as a comparative material of the pigment included in the middle coat layer, the barium sulfate "BARIACE® B-30" (refractive index: 1.6) made by Sakai Chemical Industry having an average particle size of 300 nm and the zinc oxide "Fine Zinc Oxide" (refractive index: 2.0) made by Sakai Chemical Industry having an average particle size of 290 nm were used.

Furthermore, the low shear coating viscosity of the middle coat coating was adjusted by changing the amount of solvent and the storage temperature and storage time of the coating. Note that, as the low shear viscosity, the value measured using a Brookfield viscosimeter (model: B-8L) made by Tokyo Keiki at a speed of 6 rpm was used.

Details of the prepared middle coat coatings are shown in the following Table 14.

TABLE 14

| Type of coating | Binder A Type | Binder A Number average MW Mn | Binder A Hydroxyl value [KOHmg/g] | Binder B Type | Binder B Number average MW Mn | Binder B Hydroxyl value [KOHmg/g] | A:B | Pigment Pigment | Pigment Type |
|---|---|---|---|---|---|---|---|---|---|
| Middle coat 1 | Vylon 630 | 23000 | 5 | Desmophen 690 | 3500 | 46 | 1:1 | $TiO_2$ | Tipaque CR95 |
| Middle coat 2 | Vylon 630 | 23000 | 5 | Desmophen 690 | 3500 | 46 | 1:1 | $TiO_2$ | Tipaque CR95 |
| Middle coat 3 | Vylon 630 | 23000 | 5 | Desmophen 690 | 3500 | 46 | 1:1 | $TiO_2$ | Tipaque CR95 |
| Middle coat 4 | Vylon 630 | 23000 | 5 | Desmophen 690 | 3500 | 46 | 1:1 | $TiO_2$ | Tipaque CR95 |
| Middle coat 5 | Vylon 630 | 23000 | 5 | Desmophen 690 | 3500 | 46 | 1:1 | $TiO_2$ | Tipaque CR95 |
| Middle coat 6 | Vylon 630 | 23000 | 5 | Desmophen 690 | 3500 | 46 | 1:1 | $TiO_2$ | Tipaque CR95 |
| Middle coat 7 | Vylon 630 | 23000 | 5 | Desmophen 690 | 3500 | 46 | 1:1 | $TiO_2$ | Tipaque CR95 |
| Middle coat 8 | Vylon 630 | 23000 | 5 | Desmophen 690 | 3500 | 46 | 1:1 | $BaSO_4$ | BARIACE B-30 |
| Middle coat 9 | Vylon 630 | 23000 | 5 | Desmophen 690 | 3500 | 46 | 1:1 | ZnO | Fine particle zinc |
| Middle coat 10 | Vylon 630 | 23000 | 5 | Desmophen 690 | 3500 | 46 | 1:1 | $TiO_2$ | Tipaque CR95 |
| Middle coat 11 | Vylon 630 | 23000 | 5 | Desmophen 690 | 3500 | 46 | 1:1 | $TiO_2$ | Tipaque CR95 |
| Middle coat 12 | Vylon 630 | 23000 | 5 | Desmophen 690 | 3500 | 46 | 1:1 | $TiO_2$ | Tipaque CR95 |
| Middle coat 13 | Vylon 630 | 23000 | 5 | Desmophen 690 | 3500 | 46 | 1:1 | $TiO_2$ | Tipaque CR95 |
| Middle coat 14 | Vylon 630 | 23000 | 5 | Desmophen 690 | 3500 | 46 | 1:1 | $TiO_2$ | Tipaque CR95 |
| Middle coat 15 | Vylon 630 | 23000 | 5 | Desmophen 690 | 3500 | 46 | 1:1 | $TiO_2$ | Tipaque CR95 |
| Middle coat 16 | Vylon 630 | 23000 | 5 | Desmophen 690 | 3500 | 46 | 1:1 | $TiO_2$ | Tipaque CR95 |
| Middle coat 17 | Vylon 630 | 23000 | 5 | Desmophen 690 | 3500 | 46 | 1:1 | $TiO_2$ | Tipaque CR95 |
| Middle coat 18 | Vylon 630 | 23000 | 5 | Desmophen 690 | 3500 | 46 | 1:1 | $TiO_2$ | Tipaque CR95 |
| Middle coat 19 | Vylon 630 | 23000 | 5 | Desmophen 690 | 3500 | 46 | 1:1 | $TiO_2$ | Tipaque CR95 |
| Middle coat 20 | Vylon 630 | 23000 | 5 | Desmophen 690 | 3500 | 46 | 1:1 | $TiO_2$ | Tipaque CR95 |
| Middle coat 21 | Vylon GK330 | 17000 | 9 | — | — | — | 1:0 | $TiO_2$ | Tipaque CR95 |
| Middle coat 22 | Vylon 560 | 19000 | 8 | — | — | — | 1:0 | $TiO_2$ | Tipaque CR95 |
| Middle coat 23 | Vylon 670 | 20000 | 6 | — | — | — | 1:0 | $TiO_2$ | Tipaque CR95 |
| Middle coat 24 | Vylon 630 | 23000 | 5 | — | — | — | 1:0 | $TiO_2$ | Tipaque CR95 |
| Middle coat 25 | Vylon 550 | 28000 | 4 | — | — | — | 1:0 | $TiO_2$ | Tipaque CR95 |
| Middle coat 26 | Vylon 516 | 30000 | 4 | — | — | — | 1:0 | $TiO_2$ | Tipaque CR95 |
| Middle coat 27 | Vylon 516 | 30000 | 4 | Desmophen T1775 | 1500 | 66 | 1:1 | $TiO_2$ | Tipaque CR95 |
| Middle coat 28 | Vylon 516 | 30000 | 4 | Desmophen 651 | 2000 | 182 | 1:1 | $TiO_2$ | Tipaque CR95 |
| Middle coat 29 | Vylon 516 | 30000 | 4 | Vylon 220 | 3000 | 50 | 1:1 | $TiO_2$ | Tipaque CR95 |
| Middle coat 30 | Vylon 516 | 30000 | 4 | Desmophen TXP2326 | 4500 | 20 | 1:1 | $TiO_2$ | Tipaque CR95 |
| Middle coat 31 | Vylon 516 | 30000 | 4 | Vylon GK680 | 6000 | 21 | 1:1 | $TiO_2$ | Tipaque CR95 |
| Middle coat 32 | Vylon 516 | 30000 | 4 | Vylon 226 | 8000 | 20 | 1:1 | $TiO_2$ | Tipaque CR95 |
| Middle coat 33 | Vylon 516 | 30000 | 4 | Vylon GK810 | 6000 | 19 | 1:1 | $TiO_2$ | Tipaque CR95 |
| Middle coat 34 | Vylon 516 | 30000 | 4 | Desmophen 690 | 3500 | 46 | 4:1 | $TiO_2$ | Tipaque CR95 |
| Middle coat 35 | Vylon 516 | 30000 | 4 | Desmophen 690 | 3500 | 46 | 7:3 | $TiO_2$ | Tipaque CR95 |
| Middle coat 36 | Vylon 516 | 30000 | 4 | Desmophen 690 | 3500 | 46 | 3:2 | $TiO_2$ | Tipaque CR95 |
| Middle coat 37 | Vylon 516 | 30000 | 4 | Desmophen 69 | 3500 | 46 | 2:3 | $TiO_2$ | Tipaque CR95 |
| Middle coat 38 | Vylon 516 | 30000 | 4 | Desmophen 690 | 3500 | 46 | 3:7 | $TiO_2$ | Tipaque CR95 |
| Middle coat 39 | Vylon 516 | 30000 | 4 | Desmophen 690 | 3500 | 46 | 1:4 | $TiO_2$ | Tipaque CR95 |

| Type of coating | Pigment: Pigment Average particle size (μm) | Pigment: Pigment Solid volume conc. (%) | Pigment: Low refractive index particles Type | | Pigment: Low refractive index particles Average particle size (μm) | Pigment: Low refractive index particles Solid volume conc. (%) | Storage conditions Temp. (° C.) | Storage conditions Time (days) | Viscosity (@6 rpm) (mPa · s) |
|---|---|---|---|---|---|---|---|---|---|
| Middle coat 1 | 0.28 | 30 | | | | | 20 | 1 | 4000 |
| Middle coat 2 | 0.28 | 35 | | | | | 20 | 1 | 4000 |
| Middle coat 3 | 0.28 | 40 | | | | | 20 | 1 | 4000 |
| Middle coat 4 | 0.28 | 50 | | | | | 20 | 1 | 4000 |
| Middle coat 5 | 0.28 | 65 | | | | | 20 | 1 | 4000 |
| Middle coat 6 | 0.28 | 70 | | | | | 20 | 1 | 4000 |
| Middle coat 7 | 0.28 | 75 | | | | | 20 | 1 | 4000 |
| Middle coat 8 | 0.30 | 65 | | | | | 20 | 1 | 4000 |
| Middle coat 9 | 0.29 | 65 | | | | | 20 | 1 | 4000 |
| Middle coat 10 | 0.28 | 40 | Silica | Sunsphere H-31 | 3 | 1 | 20 | 1 | 4000 |
| Middle coat 11 | 0.28 | 40 | Silica | Sunsphere H-31 | 3 | 3 | 20 | 1 | 4000 |
| Middle coat 12 | 0.28 | 40 | Silica | Sunsphere H-31 | 3 | 5 | 20 | 1 | 4000 |
| Middle coat 13 | 0.28 | 40 | Silica | Sunsphere H-31 | 3 | 8 | 20 | 1 | 4000 |
| Middle coat 14 | 0.28 | 40 | Silica | Sunsphere H-31 | 3 | 10 | 20 | 1 | 4000 |
| Middle coat 15 | 0.28 | 40 | Silica | Sunsphere H-31 | 3 | 12 | 20 | 1 | 4000 |
| Middle coat 16 | 0.28 | 40 | Silica | Sunsphere H-31 | 3 | 5 | 20 | 5 | 3000 |
| Middle coat 17 | 0.28 | 40 | Silica | Sunsphere H-31 | 3 | 5 | 20 | 30 | 2000 |
| Middle coat 18 | 0.28 | 40 | Silica | Sunsphere H-31 | 3 | 5 | 40 | 7 | 1000 |
| Middle coat 19 | 0.28 | 40 | Silica | Sunsphere H-31 | 3 | 5 | 40 | 30 | 500 |
| Middle coat 20 | 0.28 | 40 | Silica | Sunsphere H-31 | 3 | 5 | 40 | 45 | 300 |
| Middle coat 21 | 0.28 | 40 | Silica | Sunsphere H-31 | 3 | 5 | 20 | 30 | 2000 |

TABLE 14-continued

| | | | | | | | | | |
|---|---|---|---|---|---|---|---|---|---|
| Middle coat 22 | 0.28 | 40 | Silica | Sunsphere H-31 | 3 | 5 | 20 | 30 | 2000 |
| Middle coat 23 | 0.28 | 40 | Silica | Sunsphere H-31 | 3 | 5 | 20 | 30 | 2000 |
| Middle coat 24 | 0.28 | 40 | Silica | Sunsphere H-31 | 3 | 5 | 20 | 30 | 2000 |
| Middle coat 25 | 0.28 | 40 | Silica | Sunsphere H-31 | 3 | 5 | 20 | 30 | 2000 |
| Middle coat 26 | 0.28 | 40 | Silica | Sunsphere H-31 | 3 | 5 | 20 | 30 | 2000 |
| Middle coat 27 | 0.28 | 40 | Silica | Sunsphere H-31 | 3 | 5 | 20 | 30 | 2000 |
| Middle coat 28 | 0.28 | 40 | Silica | Sunsphere H-31 | 3 | 5 | 20 | 30 | 2000 |
| Middle coat 29 | 0.28 | 40 | Silica | Sunsphere H-31 | 3 | 5 | 20 | 30 | 2000 |
| Middle coat 30 | 0.28 | 40 | Silica | Sunsphere H-31 | 3 | 5 | 20 | 30 | 2000 |
| Middle coat 31 | 0.28 | 40 | Silica | Sunsphere H-31 | 3 | 5 | 20 | 30 | 2000 |
| Middle coat 32 | 0.28 | 40 | Silica | Sunsphere H-31 | 3 | 5 | 20 | 30 | 2000 |
| Middle coat 33 | 0.28 | 40 | Silica | Sunsphere H-31 | 3 | 5 | 20 | 30 | 2000 |
| Middle coat 34 | 0.28 | 40 | Silica | Sunsphere H-31 | 3 | 5 | 20 | 30 | 2000 |
| Middle coat 35 | 0.28 | 40 | Silica | Sunsphere H-31 | 3 | 5 | 20 | 30 | 2000 |
| Middle coat 36 | 0.28 | 40 | Silica | Sunsphere H-31 | 3 | 5 | 20 | 30 | 2000 |
| Middle coat 37 | 0.28 | 40 | Silica | Sunsphere H-31 | 3 | 5 | 20 | 30 | 2000 |
| Middle coat 38 | 0.28 | 40 | Silica | Sunsphere H-31 | 3 | 5 | 20 | 30 | 2000 |
| Middle coat 39 | 0.28 | 40 | Silica | Sunsphere H-31 | 3 | 5 | 20 | 30 | 2000 |

(Top Coating)

Regarding the top coating, as shown in the following Table 15, as the binder, the amorphous polyester resin "Vylon® 630" (number average molecular weight of 23000 and hydroxyl value of 5) made by Toyobo dissolved in an organic solvent (Solvesso 150 and cyclohexanone mixed in a mass ratio of 1:1) was used. As a cross-linking agent, the commercially available complete alkyl type methylated melamine resin (hereinafter, referred to as "methylated melamine") "Cymel® 303" made by Mitsui Cytec was added in 15 parts by mass to a polyester resin of a solid content of 100 parts by mass. Further, the commercially available acidic catalyst "Catalyst® 6003B" made by Mitsui Cytec was added in 0.5 part by mass to provide a clear coating. This clear coating was used and a pigment comprised of rutile-type titanium oxide with an average particle size of 280 nm "Tipaque® CR95" (refractive index: 2.5) made by Ishihara Sangyo Kaisha Ltd. was used and mixed with the binder to give a solid volume concentration of the rutile-type titanium oxide of 25% to prepare the top coating (Top 1).

Further, a coating (Top 2) obtained by using a binder resin and pigment the same as the above Top 1 and further adding the silicone-based additive BYK-306 made by BYK in 1 part by mass to the total 100 parts by mass of the binder resin and pigment and a coating (Top 3) obtained by adding the fluorine-type additive BYK-340 made by BYK in 0.5 part by mass were also prepared.

Further, as the base resin of the binder, the commercially available silicone-acryl copolymer resin, that is, the silicone-modified acrylic resin "Symac® US-380" made by Toagosei, was used. As the cross-linking agent, the commercially available butylated melamine resin "Super Beckamine® J830" made by Dainippon Ink & Chemical and methylated melamine "Cymel® 303" made by Mitsui Cytec mixed in a mass ratio of 1:1 was used. The binder resin and cross-linking agent were mixed in a solid mass ratio of 100:30 to obtain a clear coating (Top 4). Furthermore, this clear coating was used in the same way as Top 1 and pigment comprised of "Tipaque® CR95" made by Ishihara Sangyo Kaisha Ltd. was used and mixed with the binder to give a solid volume concentration of rutile-type titanium oxide of 25% to prepare the top coating (Top 5).

Further, except for using as the cross-linking agent "Desmodur BL3175 (product name)" (hereinafter, referred to as "HDI") made by Sumika Bayer Urethane, the same procedure was used as in Tops 4 and 5 to prepare coatings (Tops 6 and 7).

Further, except for using as the base resin of the binder a silicone-fluorocarbon copolymer resin "ZX-001" made by Fuji Industries, the same procedure as the Tops 4 and 5 was used to prepare coatings (Tops 8 and 9).

Further, the same binder resin and pigment as the above Top 1 were used and further 20 parts by mass of tetraethoxysilane were added to 100 parts by mass of the total of the binder resin and pigment to prepare a coating (Top 10).

Note that, in the above Tops 1 to 10, as the diluent, cyclohexanone and Solvesso 150 mixed in a mass ratio of 1:1 was used.

TABLE 15

| | | | | Pigment | | | | Additive | |
|---|---|---|---|---|---|---|---|---|---|
| Type of coating | Binder Type | | Cross-linking agent Type | Type | | Average particle size (μm) | Solid volume concentration (%) | Type | Amount of addition [parts by mass] |
| Top 1 | Polyester | Vylon 630 | Methylated melamine | Titanium oxide | Tipaque CR95 | 0.28 | 25 | | |
| Top 2 | Polyester | Vylon 630 | Methylated melamine | Titanium oxide | Tipaque CR95 | 0.28 | 25 | BYK-306 | 1 |
| Top 3 | Polyester | Vylon 630 | Methylated melamine | Titanium oxide | Tipaque CR95 | 0.28 | 25 | BYK-340 | 0.5 |
| Top 4 | Silicone-acryl | Symac US-380 | Butylated melamine and methylated melamine in mixture | | | | | | |
| Top 5 | Silicone-acryl | Symac US-380 | Butylated melamine and methylated melamine in mixture | Titanium oxide | Tipaque CR95 | 0.28 | 25 | | |

TABLE 15-continued

| Type of coating | Binder | Type | Cross-linking agent Type | Pigment Type | | Average particle size (μm) | Solid volume concentration (%) | Additive Type | Amount of addition [parts by mass] |
|---|---|---|---|---|---|---|---|---|---|
| Top 6 | Silicone-acryl | Symac US-380 | HDI | | | | | | |
| Top 7 | Silicone-acryl | Symac US-380 | HDI | Titanium oxide | Tipaque CR95 | 0.28 | 25 | | |
| Top 8 | Silicone-fluorocarbon | ZX-001 | Butylated melamine and methylated melamine in mixture | | | | | | |
| Top 9 | Silicone-fluorocarbon | ZX-001 | Butylated melamine and methylated melamine in mixture | Titanium oxide | Tipaque CR95 | 0.28 | 25 | | |
| Top 10 | Polyester | Vylon 630 | Methylated melamine | Titanium oxide | Tipaque CR95 | 0.28 | 25 | Tetraethoxy-silane | 20 |

(Precoated Metal Sheet)

Next, the precoated metal sheet used in the present examples will be explained in detail.

Hot dip galvanized steel sheet "Silverzinc®" (hereinafter, referred to as "GI") made by Nippon Steel Corporation was prepared as a substrate sheet, which has a thickness of 0.6 mm and a plating deposition of 60 mg/m$^2$ on one side.

Next, the prepared substrate sheet was spray-degreased by a 2 wt % aqueous solution of alkali degreasing agent "FC-4336" made by Nihon Parkerizing 50° C., rinsed, dried, then coated with a chromate-free treatment agent "CT-E300N" made by Nihon Parkerizing by a roll coater and dried by a hot air oven. The drying conditions in the hot air oven were a peak metal temperature of the steel sheet of 60° C. The amount of deposition of the chromate-free treatment agent was a total solid content of 200 g/m$^2$.

Next, one surface of the treated metal sheet is coated by a roll coater with the prepared primer coating to give a dried thickness of 20 μm, while the other surface was coated with a back surface coating "FL100HQ" of a gray color made by Japan Fine Coatings to give a dried thickness of 5 μm. The coated films were dried and cured in an induction heating oven in which hot air was blown under conditions giving a peak metal temperature of the metal sheet of 230° C. Further, after drying and baking, the coated metal sheet was sprayed with water for water cooling.

Next, the primer coating film was simultaneously coated with two layers of a middle coat coating and a top coating by a slide hopper type curtain coater. The laminated coating films were simultaneously dried and cured in an induction heating oven in which hot air was blown under conditions giving a peak metal temperature of the metal sheet of 220° C. Further, after drying and baking, the coated metal sheet was sprayed with water for water cooling to prepare a three-layer precoated metal sheet (hereinafter, the coating method in the present routine referred to as "the coating method (i)").

Further, as needed, the surface of the primer coating film later was coated with simply the single layer of a middle coat coating by a roll coater, which was then baked by the above-mentioned procedure, and thereafter the surface of the middle coat coating film layer was again coated by a roll coater with a top coating and baked by the above-mentioned procedure to prepare a precoated metal sheet having a three-layer structure coating layer (hereinafter, the coating method in the present routine referred to as "the coating method (ii)").

Further, as needed, the primer coating film layer was coated with a middle coat coating and top coating and further on that by a top coating by a slide hopper type curtain coater to simultaneously coat three layers, then the laminated coating films were simultaneously dried and baked to be cured in an induction heating oven through which hot air was blown under conditions giving a peak metal temperature of the metal sheet of 220° C. Further, after drying and baking, the coated metal sheet was sprayed with water for water cooling to thereby prepare a precoated metal sheet having a four-layer structure coating layer (hereinafter, the coating method in the present routine referred to as "the coating method (iii)").

(Methods of Evaluation)

Next, details of the methods of evaluation of the precoated metal sheet prepared in the above-mentioned way will be explained.

1) Measurement of Total Light Reflectance of Precoated Metal Sheet

A spectrometer "UV265" made by Shimadzu Corporation equipped with an integrating sphere reflection attachment was used. As the reference sheet, a sheet prepared by compacting sulfate powder was used. The total light reflectance at the wavelength to which the human eye is most sensitive, that is, 555 nm, was measured and evaluated by the following criteria:

VG (very good): case where total light reflectance is 99% or more

VG to G (good): case where total light reflectance is 97% to less than 99%

G (good): case where total light reflectance is 95% to less than 97%

G to F (fair): case where total light reflectance is 93% to less than 95%

F (fair): case where total light reflectance is 91% to less than 93%

F to P (poor): case where total light reflectance is 89% to less than 91%

P (poor): case where total light reflectance is less than 89%

2) Measurement of Luminance of Lighting Apparatus

FIG. 1 and FIG. 2 schematically show the experimental apparatus. A coated base material was formed into a shape such as shown in FIG. 1 and FIG. 2 where the two ends in the longitudinal direction were bent upward to obtain a reflector 1. Two commercially available fluorescent lights 2 were placed and attached in the reflector. On top of the reflector, a cover 3 formed by frosted glass was attached.

The luminances of the center part (hereinafter referred to as the "luminance measurement part") 4 of the cover 3 and a portion 5 offset from the center part 4 by 1.5 cm to the outside (hereinafter referred to as the "luminance uniformity comparison measurement part") were measured by a luminance meter 6 set at a position 50 cm away from the measurement point in the vertical direction. As the fluorescent lights 2, fluorescent lights of type 16 of 16 W output were used.

The luminance was evaluated by measuring the luminance measurement part 4 of the cover 3. At the time of measurement, all light other than from the fluorescent lights 2 was blocked out, the luminance of a reference reflector prepared as described below was measured, then the luminance when attaching the reflector 1 prepared using the coated base material was measured. Further, from the luminance at the time of measurement by the reference reflector and the luminance at the time of measurement by the reflector 1 of the coated base material, the rate of change of luminance was defined as ([luminance by reflector 1 made of coated base material]-[luminance by reference reflector])×100/[luminance by reference reflector]. The rate of change of luminance was used for evaluation by the following criteria:

VG (very good): case where rate of change of luminance is 30% or more

VG to G (good): case where rate of change of luminance is 25% to less than 30%

G (good): case where rate of change of luminance is 20% to less than 25%

G to F (fair): case where rate of change of luminance is 15% to less than 20%

F (fair): case where rate of change of luminance is 10% to less than 15%

P (poor): case where rate of change of luminance is less than 10%

The reference reflector was prepared by the method of coating by a white coating with a high reflectance of the conventional means for improving the reflectance of a reflector surface. The coating shown in Tables 16A and 16B was coated to give a dried thickness of 10 μm and dried and cured by the same method as the preparation of the above primer coated sheet. On top of this, the coating described in Tables 16A and 16B was again coated by a roll coater to give a dried thickness of 20 μm and dried and cured in an induction heating oven through which hot air was blown under conditions giving a peak metal temperature of the metal sheet of 230° C. Further, this was dried and baked, then the coated metal sheet was sprayed with water for water cooling.

The uniformity of the luminance was evaluated by measuring the luminances at the two locations of the luminance measurement part 4 of the cover and the luminance uniformity comparison measurement part 5 offset from the luminance measurement part 4 by 1.5 cm. The uniformity of luminance was defined as 100−([luminance of luminance uniformity comparison measurement part 5]−[luminance of luminance measurement part 4])/[luminance of luminance measurement part 4]×100. The uniformity of luminance was evaluated by the following criteria:

VG (very good): case where uniformity of luminance is 90% or more

G (good): case where uniformity of luminance is 85% to less than 90%

F (fair): case where uniformity of luminance is 70% to less than 85%

P (poor): case where uniformity of luminance is less than 70%

3) Workability and Adhesion

The prepared precoated metal sheet was bent 180° in the state sandwiching any numbers of samples (tight bending) and the coating film of the worked part was observed visually to investigate for the presence of cracking of the coating film. Note that, when bending by 180°, the precoated metal sheet was bent for the tight bending so that its front surface became the outside of the bend (in general, the case not sandwiching the sample is known as 0T bending and the case of sandwiching one sample is known as 1T bending). Further, the worked part was observed visually and evaluated by the following criteria.

VVG (very very good): no cracking or peeling with 0T bending

VG (very good): no cracking or peeling with 1T bending

VG to G (good): no cracking or peeling with 2T bending

G (good): slight cracking or peeling with 2T bending, but no cracking or peeling with 3T bending G to F (fair): cracking or peeling reaching primer coating film layer or substrate sheet with 2T bending, but no cracking or peeling with 3T bending F (fair): slight cracking or peeling with 3T bending, but no cracking or peeling with 4T bending F to P (poor): cracking or peeling reaching primer coating film layer or substrate sheet with 3T bending, but no cracking or peeling with 4T bending P (poor): cracking or peeling with 4T bending Further, an adhesion test of the worked part was run by attaching a tape to the worked part and peeling it off. The adhesion after tape peeling was observed visually and evaluated by the following criteria:

VVG (very very good): no peeling with 0T bending

VG (very good): no peeling with 1T bending

VG to G (good): no peeling with 2T bending

G (good): peeling with a length of less than half in total of the entire length of the worked part with 2T bending, but no peeling with 3T bending G to F (fair): no peeling with 3T bending F (fair): slight cracking or peeling with 3T bending, but no cracking or peeling with 4T bending F to P (poor): no peeling with 4T bending P (poor): peeling with 4T bending 4) Overall Evaluation The score was 8 points in the case of VVG, 7 points in the case of VG, 6 points in the case of VG to G, 5 points in the case of G, 4 points in the case of G to F, 3 points in the case of F, 2 points in the case of F to P, and 1 point in the case of P. The scores of the total light reflectance and workability were added to calculate the totals which were evaluated by the following criteria.

VG (very good): total of points of 11 or more

G (good): total of points of 9 to less than 11

F (fair): total of points of 7 to less than 9

P (poor): total of points of less than 7

5) Measurement of Interface Ra

Figure 3:
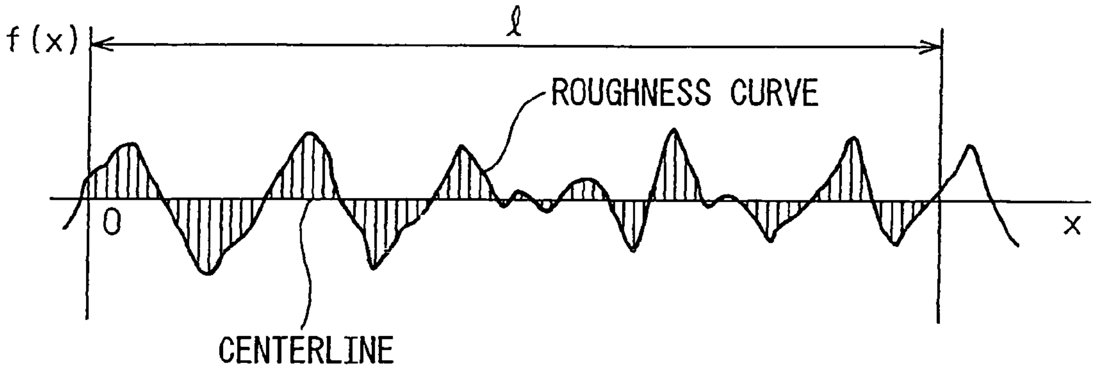
FIG. 3 is a view showing an example of the state of relief at the coating film interface.

The Ra of the interface between the middle coat layer and the top layer was evaluated by cutting the coating film of each example, burying it in a resin, then polishing it to smooth the cross-section vertical to the surface of the coating film. For the evaluation, a photograph taken by a 3500× scan type microscope was used. The photograph was covered on top by a transparent sheet used for OHP, the relief of the interface was precisely traced, then, as shown in FIG. 3, exactly 1 reference length was extracted in the direction of the average line of the interface curve. The value found by the following equation, where the X-axis was taken along the direction of the average line of the extracted part, the Y-axis was taken along the longitudinal magnification direction, and the interface curve was expressed by y=f(x), was shown by micrometers (μm).

$$Ra = \frac{1}{l}\int_0^l |f(x)|\,dx$$

6) Measurement of $W_{CA}$ of Outermost Surface

The $W_{CA}$ of the outermost surface of the coated layers was measured by a three-dimensional surface shape measurement system made by Meishin Kogyo.

7) Measurement of Mixed Layer Thickness

The vicinity of the interface between the middle coat layer and the top layer was analyzed by a GDS (glow discharge spectrometer) and the distribution of Ti in the depth direction was measured. More specifically, the thickness of the portion of [x+0.05x(x−y)] to [y−0.05x(x−y)] where x is the concentration of Ti of the middle coat layer and y is the concentration of Ti of the top layer was measured as the mixed layer thickness.

8) Dirt Resistance

A 10% suspension of the carbon for coating "Mitsubishi Carbon MA100" made by Mitsubishi Chemical was coated on the coating film surface of a precoated metal sheet prepared in the above way. After 1 hour, this was wiped off by the cleaning white knit waste made by Nihon Waste. The change in color before and after the test was found by LE using a spectrum colorimetry meter (made by Suga Test Instruments, Model MSC-45-2B) and evaluated by the following criteria:

VG (very good): ΔE of less than 0.2
VG to G (good): ΔE of 0.2 to less than 0.5
G (good): ΔE of 0.5 to less than 1
F (fair): ΔE of 1 to less than 2
P (poor): ΔE of 2 or more (Results of Evaluation)

Tables 16A to 18 show the constitutions of the precoated metal sheets prepared by the examples and the results of evaluation.

TABLE 16A

| No. | Type of primer coating | Type of middle coat coating | Type of top coating | Thickness after drying (μm) Primer layer | Middle coat layer | Top layer | Coating method | Coating baking time (sec) | Middle and top coats interface Ra (μm) | Outermost layer $W_{CA}$ (μm) | Middle and top coats mixed layer thickness (μm) | Middle coat layer pore volume/solid volume |
|---|---|---|---|---|---|---|---|---|---|---|---|---|
| 201 | Primer 1 | Middle coat 2 | Top 1 | 15 | 60 | 20 | (i) | 45 | 0.8 | 0.2 | 2 | 0.02 |
| 202 | Primer 1 | Middle coat 3 | Top 1 | 15 | 60 | 20 | (i) | 45 | 0.9 | 0.2 | 2 | 0.05 |
| 203 | Primer 1 | Middle coat 4 | Top 1 | 15 | 60 | 20 | (i) | 45 | 1.0 | 0.2 | 2 | 0.08 |
| 204 | Primer 1 | Middle coat 5 | Top 1 | 15 | 60 | 20 | (i) | 45 | 1.1 | 0.2 | 2 | 0.25 |
| 205 | Primer 1 | Middle coat 6 | Top 1 | 15 | 60 | 20 | (i) | 45 | 1.1 | 0.2 | 2 | 0.30 |
| 206 | Primer 1 | Middle coat 10 | Top 1 | 15 | 60 | 20 | (i) | 45 | 0.9 | 0.2 | 2 | 0.20 |
| 207 | Primer 1 | Middle coat 11 | Top 1 | 15 | 60 | 20 | (i) | 45 | 1.1 | 0.2 | 2 | 0.30 |
| 208 | Primer 1 | Middle coat 12 | Top 1 | 15 | 60 | 20 | (i) | 45 | 1.3 | 0.2 | 2 | 0.50 |
| 209 | Primer 1 | Middle coat 13 | Top 1 | 15 | 60 | 20 | (i) | 45 | 1.4 | 0.2 | 2 | 0.70 |
| 210 | Primer 1 | Middle coat 14 | Top 1 | 15 | 60 | 20 | (i) | 45 | 1.5 | 0.2 | 2 | 0.90 |
| 211 | Primer 1 | Middle coat 15 | Top 1 | 15 | 60 | 20 | (i) | 45 | 1.5 | 0.2 | 2 | 1.00 |
| 212 | Primer 1 | Middle coat 16 | Top 1 | 15 | 60 | 20 | (i) | 45 | 1.6 | 0.3 | 2 | 0.50 |
| 213 | Primer 1 | Middle coat 17 | Top 1 | 15 | 60 | 20 | (i) | 45 | 2.0 | 0.5 | 2 | 0.50 |
| 214 | Primer 1 | Middle coat 18 | Top 1 | 15 | 60 | 20 | (i) | 45 | 2.3 | 1 | 2 | 0.50 |
| 215 | Primer 1 | Middle coat 19 | Top 1 | 15 | 60 | 20 | (i) | 45 | 2.5 | 2 | 2 | 0.50 |
| 216 | Primer 1 | Middle coat 20 | Top 1 | 15 | 60 | 20 | (i) | 45 | 2.6 | 4 | 2 | 0.50 |
| 217 | Primer 1 | Middle coat 17 | Top 1 | 15 | 60 | 20 | (i) | 60 | 2.0 | 0.5 | 3 | 0.50 |
| 218 | Primer 1 | Middle coat 17 | Top 1 | 15 | 60 | 20 | (i) | 80 | 2.0 | 0.5 | 5 | 0.50 |
| 219 | Primer 1 | Middle coat 17 | Top 1 | 15 | 60 | 20 | (i) | 110 | 2.0 | 0.5 | 7 | 0.50 |
| 220 | Primer 1 | Middle coat 17 | Top 1 | 15 | 60 | 20 | (i) | 130 | 2.0 | 0.5 | 9 | 0.50 |
| 221 | Primer 1 | Middle coat 17 | Top 1 | 15 | 60 | 20 | (i) | 150 | 2.0 | 0.5 | 10 | 0.50 |
| 222 | Primer 1 | Middle coat 17 | Top 1 | 15 | 60 | 20 | (i) | 180 | 2.0 | 0.5 | 10 | 0.50 |

| No. | Reflection performance Total light reflectance | Luminance | Uniformity of luminance | Workability | Adhesion | Dirt resistance | Overall evaluation | Remarks |
|---|---|---|---|---|---|---|---|---|
| 201 | F | F | G | G to F | G to F | VG to G | F | Inv. ex. |
| 202 | G to F | G to F | G | F | F | VG to G | F | |
| 203 | G to F | G to F | G | F | F | VG to G | F | |
| 204 | G to F | G to F | G | F | F | VG to G | F | |
| 205 | G to F | G to F | G | F | F | VG to G | F | |
| 206 | G to F | G to F | G | F | F | VG to G | F | |
| 207 | G | G | G | G to F | G to F | VG to G | G | |
| 208 | G | G | G | G to F | G to F | VG to G | G | |
| 209 | G | G | G | G to F | G to F | VG to G | G | |
| 210 | G | G | G | G to F | G to F | VG to G | G | |
| 211 | G | G | G | F | F | VG to G | G | |
| 212 | G | G | G | G to F | G to F | VG to G | G | |
| 213 | VG to G | VG to G | G | G | G | VG to G | VG | |
| 214 | VG to G | VG to G | G | G | G | G | VG | |
| 215 | VG to G | VG to G | G | G | G | G | VG | |
| 216 | VG to G | VG to G | G | G | G | F | VG | |

TABLE 16A-continued

| | | | | | | | | |
|---|---|---|---|---|---|---|---|---|
| 217 | VG | VG | G | VG to G | VG to G | VG to G | VG | |
| 218 | VG | VG | G | VG to G | VG to G | VG to G | VG | |
| 219 | VG | VG | G | VG to G | VG to G | VG to G | VG | |
| 220 | VG | VG | G | VG to G | VG to G | VG to G | VG | |
| 221 | VG | VG | G | VG to G | VG to G | VG to G | VG | |
| 222 | VG | VG | G | VG to G | VG to G | VG to G | VG | |

TABLE 16B

| No. | Type of primer coating | Type of middle coat coating | Type of top coating | Thickness after drying (μm) Primer layer | Middle coat layer | Top layer | Coating method | Coating baking time (sec) | Middle and top coats interface Ra (μm) | Outer-most layer $W_{CA}$ (μm) | Middle and top coats mixed layer thickness (μm) | Middle coat layer pore volume/ solid volume |
|---|---|---|---|---|---|---|---|---|---|---|---|---|
| 223 | Primer 1 | Middle coat 17 | Top 1 | 15 | 60 | 20 | (i) | 110 | 2.0 | 0.5 | 7 | 0.50 |
| 224 | Primer 1 | Middle coat 21 | Top 1 | 15 | 60 | 20 | (i) | 110 | 2.0 | 0.5 | 7 | 0.50 |
| 225 | Primer 1 | Middle coat 22 | Top 1 | 15 | 60 | 20 | (i) | 110 | 2.0 | 0.5 | 7 | 0.50 |
| 226 | Primer 1 | Middle coat 23 | Top 1 | 15 | 60 | 20 | (i) | 110 | 2.0 | 0.5 | 7 | 0.50 |
| 227 | Primer 1 | Middle coat 24 | Top 1 | 15 | 60 | 20 | (i) | 110 | 2.0 | 0.5 | 7 | 0.50 |
| 228 | Primer 1 | Middle coat 25 | Top 1 | 15 | 60 | 20 | (i) | 110 | 2.0 | 0.5 | 7 | 0.50 |
| 229 | Primer 1 | Middle coat 26 | Top 1 | 15 | 60 | 20 | (i) | 110 | 2.0 | 0.5 | 7 | 0.50 |
| 230 | Primer 1 | Middle coat 27 | Top 1 | 15 | 60 | 20 | (i) | 110 | 2.0 | 0.5 | 7 | 0.50 |
| 231 | Primer 1 | Middle coat 28 | Top 1 | 15 | 60 | 20 | (i) | 110 | 2.0 | 0.5 | 7 | 0.50 |
| 232 | Primer 1 | Middle coat 29 | Top 1 | 15 | 60 | 20 | (i) | 110 | 2.0 | 0.5 | 7 | 0.50 |
| 233 | Primer 1 | Middle coat 30 | Top 1 | 15 | 60 | 20 | (i) | 110 | 2.0 | 0.5 | 7 | 0.50 |
| 234 | Primer 1 | Middle coat 31 | Top 1 | 15 | 60 | 20 | (i) | 110 | 2.0 | 0.5 | 7 | 0.50 |
| 235 | Primer 1 | Middle coat 32 | Top 1 | 15 | 60 | 20 | (i) | 110 | 2.0 | 0.5 | 7 | 0.50 |
| 236 | Primer 1 | Middle coat 33 | Top 1 | 15 | 60 | 20 | (i) | 110 | 2.0 | 0.5 | 7 | 0.50 |
| 237 | Primer 1 | Middle coat 34 | Top 1 | 15 | 60 | 20 | (i) | 110 | 2.0 | 0.5 | 7 | 0.50 |
| 238 | Primer 1 | Middle coat 35 | Top 1 | 15 | 60 | 20 | (i) | 110 | 2.0 | 0.5 | 7 | 0.50 |
| 239 | Primer 1 | Middle coat 36 | Top 1 | 15 | 60 | 20 | (i) | 110 | 2.0 | 0.5 | 7 | 0.50 |
| 240 | Primer 1 | Middle coat 37 | Top 1 | 15 | 60 | 20 | (i) | 110 | 2.0 | 0.5 | 7 | 0.50 |
| 241 | Primer 1 | Middle coat 38 | Top 1 | 15 | 60 | 20 | (i) | 110 | 2.0 | 0.5 | 7 | 0.50 |
| 242 | Primer 1 | Middle coat 39 | Top 1 | 15 | 60 | 20 | (i) | 110 | 2.0 | 0.5 | 7 | 0.50 |
| 243 | Primer 1 | Middle coat 8 | Top 1 | 15 | 60 | 20 | (i) | 45 | 1.1 | 0.2 | 2 | 0.20 |
| 244 | Primer 1 | Middle coat 9 | Top 1 | 15 | 60 | 20 | (i) | 45 | 1.1 | 0.2 | 2 | 0.20 |
| 245 | Primer 1 | Middle coat 1 | Top 1 | 15 | 60 | 20 | (i) | 45 | 0.6 | 0.2 | 2 | 0.02 |
| 246 | Primer 1 | Middle coat 7 | Top 1 | 15 | 60 | 20 | (i) | 45 | 1.1 | 0.2 | 2 | 0.50 |
| 247 | Primer 1 | Middle coat 5 | Top 1 | 15 | 60 | 20 | (ii) | 110 | 0.5 | 0.5 | 0 | 0.20 |

| No. | Reflection performance Total light reflectance | Luminance | Uniformity of luminance | Workability | Adhesion | Dirt resistance | Overall evaluation | Remarks |
|---|---|---|---|---|---|---|---|---|
| 223 | VG | VG | G | VG to G | VG to G | VG to G | VG | Inv. ex. |
| 224 | VG | VG | G | F | F | VG to G | G | |
| 225 | VG | VG | G | G to F | G to F | VG to G | VG | |
| 226 | VG | VG | G | G to F | G to F | VG to G | VG | |
| 227 | VG | VG | G | G to F | G to F | VG to G | VG | |
| 228 | VG | VG | G | G to F | G to F | VG to G | VG | |
| 229 | VG | VG | G | F | F | VG to G | G | |
| 230 | VG | VG | G | G | G | VG to G | VG | |
| 231 | VG | VG | G | VG to G | VG to G | VG to G | VG | |
| 232 | VG | VG | G | VG to G | VG to G | VG to G | VG | |
| 233 | VG | VG | G | VG to G | VG to G | VG to G | VG | |
| 234 | VG | VG | G | VG to G | VG to G | VG to G | VG | |
| 235 | VG | VG | G | G | G | VG to G | VG | |
| 236 | VG | VG | G | G | G | VG to G | VG | |
| 237 | VG | VG | G | G | G | VG to G | VG | |
| 238 | VG | VG | G | VG to G | VG to G | VG to G | VG | |
| 239 | VG | VG | G | VG to G | VG to G | VG to G | VG | |
| 240 | VG | VG | G | VG to G | VG to G | VG to G | VG | |
| 241 | VG | VG | G | VG to G | VG to G | VG to G | VG | |
| 242 | VG | VG | G | G | G | VG to G | VG | |
| 243 | P | P | G | F | F | VG to G | P | Comp. ex. |
| 244 | P | P | G | F | F | VG to G | P | |
| 245 | P | P | G | G | G | VG to G | P | |
| 246 | G to F | G to F | G | P | P | VG to G | P | |
| 247 | F to P | F to P | G | P | P | VG to G | P | |

TABLE 17

| No. | Type of primer coating | Type of middle coat coating | Type of top coating | Thickness after drying (μm) Primer layer | Middle coat layer | Top layer | Coating baking time (sec) | Middle and top coats interface Ra (μm) | Outer-most layer WCA (μm) | Middle and top coats mixed layer thickness (μm) | Middle coat layer pore volume/solid volume |
|---|---|---|---|---|---|---|---|---|---|---|---|
| 248 | Primer 1 | Middle coat 17 | Top 1 | 15 | 10 | 20 | 80 | 2.0 | 0.4 | 5 | 0.50 |
| 249 | Primer 1 | Middle coat 17 | Top 1 | 15 | 15 | 20 | 80 | 2.0 | 0.4 | 5 | 0.50 |
| 250 | Primer 1 | Middle coat 17 | Top 1 | 15 | 20 | 20 | 80 | 2.0 | 0.4 | 5 | 0.50 |
| 251 | Primer 1 | Middle coat 17 | Top 1 | 15 | 30 | 20 | 80 | 2.0 | 0.4 | 5 | 0.50 |
| 252 | Primer 1 | Middle coat 17 | Top 1 | 15 | 40 | 20 | 80 | 2.0 | 0.4 | 5 | 0.50 |
| 253 | Primer 1 | Middle coat 17 | Top 1 | 15 | 50 | 20 | 80 | 2.0 | 0.4 | 5 | 0.50 |
| 254 | Primer 1 | Middle coat 17 | Top 1 | 15 | 60 | 20 | 80 | 2.0 | 0.4 | 5 | 0.50 |
| 255 | Primer 1 | Middle coat 17 | Top 1 | 15 | 70 | 20 | 80 | 2.0 | 0.4 | 5 | 0.50 |
| 256 | Primer 1 | Middle coat 17 | Top 1 | 15 | 80 | 20 | 80 | 2.0 | 0.4 | 5 | 0.50 |

| No. | Reflection performance Total light reflectance | Luminance | Uniformity of luminance | Workability | Adhesion | Dirt resistance | General evaluation | Remarks |
|---|---|---|---|---|---|---|---|---|
| 248 | F | F | G | VVG | VG | VG to G | VG | Inv. ex. |
| 249 | G to F | G to F | G | VVG | VG | VG to G | VG | |
| 250 | G to F | G to F | G | VG | VG | VG to G | VG | |
| 251 | G | G | G | VG | VG | VG to G | VG | |
| 252 | VG to G | VG to G | G | VG | VG | VG to G | VG | |
| 253 | VG to G | VG to G | G | VG to G | VG to G | VG to G | VG | |
| 254 | VG | VG | G | VG to G | VG to G | VG to G | VG | |
| 255 | VG | VG | G | VG to G | VG to G | VG to G | VG | |
| 256 | VG | VG | G | G | VG to G | VG to G | VG | |

TABLE 18

| No. | | Type of middle coat coating | Type of top coating (1) | Type of top coating (2) | Thickness after drying (μm) Primer layer | Middle coat layer | Top layer | Surface-most layer | Coating method | Coating baking time (sec) | Middle and top coats interface Ra (μm) | Outer-most layer $W_{CA}$ (μm) | Middle and top coats mixed layer thickness (μm) |
|---|---|---|---|---|---|---|---|---|---|---|---|---|---|
| 257 | Primer 1 | Middle coat 17 | Top 1 | | 15 | 60 | 20 | | (i) | 110 | 2.0 | 0.4 | 7 |
| 258 | Primer 1 | Middle coat 17 | Top 2 | | 15 | 60 | 20 | | (i) | 110 | 2.0 | 0.4 | 7 |
| 259 | Primer 1 | Middle coat 17 | Top 3 | | 15 | 60 | 20 | | (i) | 110 | 2.0 | 0.4 | 7 |
| 260 | Primer 1 | Middle coat 17 | Top 5 | | 15 | 60 | 20 | | (i) | 110 | 2.0 | 0.4 | 7 |
| 261 | Primer 1 | Middle coat 17 | Top 7 | | 15 | 60 | 20 | | (i) | 110 | 2.0 | 0.4 | 7 |
| 262 | Primer 1 | Middle coat 17 | Top 9 | | 15 | 60 | 20 | | (i) | 110 | 2.0 | 0.4 | 7 |
| 263 | Primer 1 | Middle coat 17 | Top 1 | | 15 | 15 | 20 | | (i) | 80 | 2.0 | 0.4 | 5 |
| 264 | Primer 1 | Middle coat 17 | Top 2 | | 15 | 15 | 20 | | (i) | 80 | 2.0 | 0.4 | 5 |
| 265 | Primer 1 | Middle coat 17 | Top 3 | | 15 | 15 | 20 | | (i) | 80 | 2.0 | 0.4 | 5 |
| 266 | Primer 1 | Middle coat 17 | Top 5 | | 15 | 15 | 20 | | (i) | 80 | 2.0 | 0.4 | 5 |
| 267 | Primer 1 | Middle coat 17 | Top 7 | | 15 | 15 | 20 | | (i) | 80 | 2.0 | 0.4 | 5 |
| 268 | Primer 1 | Middle coat 17 | Top 9 | | 15 | 15 | 20 | | (i) | 80 | 2.0 | 0.4 | 5 |
| 269 | Primer 1 | Middle coat 17 | Top 1 | Top 4 | 15 | 60 | 20 | 5 | (iii) | 110 | 2.0 | 0.4 | 7 |
| 270 | Primer 1 | Middle coat 17 | Top 1 | Top 6 | 15 | 60 | 20 | 5 | (iii) | 110 | 2.0 | 0.4 | 7 |
| 271 | Primer 1 | Middle coat 17 | Top 1 | Top 8 | 15 | 60 | 20 | 5 | (iii) | 110 | 2.0 | 0.4 | 7 |
| 272 | Primer 1 | Middle coat 17 | Top 1 | Top 4 | 15 | 15 | 20 | 5 | (iii) | 80 | 2.0 | 0.4 | 5 |
| 273 | Primer 1 | Middle coat 17 | Top 1 | Top 6 | 15 | 15 | 20 | 5 | (iii) | 80 | 2.0 | 0.4 | 5 |
| 274 | Primer 1 | Middle coat 17 | Top 1 | Top 8 | 15 | 15 | 20 | 5 | (iii) | 80 | 2.0 | 0.4 | 5 |
| 275 | Primer 1 | Middle coat 17 | Top 1 | Top 5 | 15 | 60 | 20 | 5 | (iii) | 110 | 2.0 | 0.4 | 7 |
| 276 | Primer 1 | Middle coat 17 | Top 1 | Top 7 | 15 | 60 | 20 | 5 | (iii) | 110 | 2.0 | 0.4 | 7 |
| 277 | Primer 1 | Middle coat 17 | Top 1 | Top 9 | 15 | 60 | 20 | 5 | (iii) | 110 | 2.0 | 0.4 | 7 |
| 278 | Primer 1 | Middle coat 17 | Top 1 | Top 5 | 15 | 15 | 20 | 5 | (iii) | 80 | 2.0 | 0.4 | 5 |
| 279 | Primer 1 | Middle coat 17 | Top 1 | Top 7 | 15 | 15 | 20 | 5 | (iii) | 80 | 2.0 | 0.4 | 5 |
| 280 | Primer 1 | Middle coat 17 | Top 1 | Top 9 | 15 | 15 | 20 | 5 | (iii) | 80 | 2.0 | 0.4 | 5 |
| 281 | Primer 1 | Middle coat 17 | Top 10 | | 15 | 60 | 20 | | (i) | 110 | 2.0 | 0.4 | 7 |
| 282 | Primer 1 | Middle coat 17 | Top 10 | | 15 | 15 | 20 | | (i) | 80 | 2.0 | 0.4 | 5 |

TABLE 18-continued

| No. | Middle coat layer pore volume/ solid volume | Reflection performance: Total light reflectance | Luminance | Uniformity of luminance | Workability | Adhesion | Dirt resistance | Overall evaluation | Remarks |
|---|---|---|---|---|---|---|---|---|---|
| 257 | 0.50 | VG | VG | G | VG to G | VG to G | VG to G | VG | Inv. ex. |
| 258 | 0.50 | VG | VG | G | VG to G | VG to G | VG | VG | |
| 259 | 0.50 | VG | VG | G | VG to G | VG to G | VG | VG | |
| 260 | 0.50 | VG | VG | G | G | G | VG | VG | |
| 261 | 0.50 | VG | VG | G | G | G | VG | VG | |
| 262 | 0.50 | VG | VG | G | G | G | VG | VG | |
| 263 | 0.50 | G to F | G to F | G | VVG | VG | VG to G | VG | |
| 264 | 0.50 | G to F | G to F | G | VVG | VG | VG | VG | |
| 265 | 0.50 | G to F | G to F | G | VVG | VG | VG | VG | |
| 266 | 0.50 | G to F | G to F | G | VG | VG to G | VG | VG | |
| 267 | 0.50 | G to F | G to F | G | VG | VG to G | VG | VG | |
| 268 | 0.50 | G to F | G to F | G | VG | VG to G | VG | VG | |
| 269 | 0.50 | VG | VG | G | VG to G | VG to G | VG | VG | |
| 270 | 0.50 | VG | VG | G | VG to G | VG to G | VG | VG | |
| 271 | 0.50 | VG | VG | G | VG to G | VG to G | VG | VG | |
| 272 | 0.50 | G to F | G to F | G | VVG | VG | VG | VG | |
| 273 | 0.50 | G to F | G to F | G | VVG | VG | VG | VG | |
| 274 | 0.50 | G to F | G to F | G | VVG | VG | VG | VG | |
| 275 | 0.50 | VG | VG | G | VG to G | VG to G | VG | VG | |
| 276 | 0.50 | VG | VG | G | VG to G | VG to G | VG | VG | |
| 277 | 0.50 | VG | VG | G | VG to G | VG to G | VG | VG | |
| 278 | 0.50 | G to F | G to F | G | VVG | VG | VG | VG | |
| 279 | 0.50 | G to F | G to F | G | VVG | VG | VG | VG | |
| 280 | 0.50 | G to F | G to F | G | VVG | VG | VG | VG | |
| 281 | 0.50 | VG | VG | G | VG to G | VG to G | VG | VG | |
| 282 | 0.50 | G to F | G to F | G | VVG | VG | VG | VG | |

The precoated metal sheets according to the examples of the present invention (Nos. 201 to 242 and 248 to 262) gave good results in all of total light reflectance, luminance, coating film workability, and dirt resistance.

As shown in Nos. 201 to 242, and 248 to 262, it is learned that by making the volume concentration of the rutile-type titanium oxide in the middle coat layer 35% or more, the Ra of the interface between the middle coat layer and the top layer becomes 0.8 μm or more and the area able to contribute to the reflection increases, so a high total light reflectance is obtained. Further, it is learned that the contact area of the middle coat layer and top layer increases, so superior adhesion is obtained.

In sheets where the pigment in the middle coat layer was not titanium oxide (Nos. 243 and 244), the total light reflectance was inferior, so this is not preferred. In a sheet where the volume concentration of the rutile-type titanium oxide in the middle coat layer is less than 35% (No. 245), the total light reflectance is inferior, so this is not preferred. In a sheet where the solid volume concentration of the rutile-type titanium oxide in the middle coat layer exceeds 70% (No. 246), the workability and adhesion are inferior, so this is not preferred. In a sheet where the Ra of the interface between the middle coat layer and the top layer is less than 0.8 μm (No. 247), the workability and adhesion are inferior, so this is not preferred.

As shown in Nos. 206 to 242, it is learned that by including both rutile-type titanium oxide and low refractive index particles with a larger particle size than rutile-type titanium oxide in the middle coat layer, the Ra of the interface between the middle coat layer and the top layer can be improved and a higher total light reflectance and more superior adhesion can be obtained.

As shown in Nos. 213 to 216, it is learned that by making the low shear viscosity of the middle coat coating lower, the Ra of the interface between the middle coat layer and the top layer can be improved and a higher total light reflectance and more superior adhesion can be obtained. However, if reducing the low shear viscosity of the middle coat coating too much and the $W_{CA}$ of the outermost surface becomes 4 μm (No. 216), the dirt resistance tended to become slightly inferior. For this reason, it is learned that the $W_{CA}$ of the outermost surface is more preferably 2 μm or less.

As shown in Nos. 217 to 242, it is learned if the coating baking time is increased, the mixed layer present at the boundary of the middle coat layer and top layer becomes thicker and a higher total light reflectance and more superior adhesion are obtained. It is learned that the thickness of the mixed layer present at the boundary of the middle coat layer and the top layer is more preferably 3 μm or more.

As shown in Nos. 248 to 256, it is learned that the smaller the thickness of the middle coat layer, the more the total light reflectance drops, but the more the coating film workability is improved. It is learned that the precoated metal sheets according to the examples of the present invention are all superior in balance of total light reflectance and workability.

As shown in Nos. 257 to 280, it is learned that if including a silicone resin or fluorocarbon resin in the binder of the top layer or outermost layer of the precoated metal sheets according to the examples of the present invention (Nos. 258 to 262 and 264 to 280), the dirt resistance is improved, so this is more preferable.

As shown in Nos. 281 and 282, it is learned that if including Si derived from an alkoxysilane or the hydrolyzed condensate of alkoxysilane in the top layer of the precoated metal sheets according to the examples of the present invention, the dirt resistance is improved, so this is more preferable. Further, it is learned that in No. 281 where the thickness of the middle coat layer is great, the total light reflectance and luminance are particularly superior, while in No. 282 where the thickness of the middle coat layer is small, the workability and adhesion are particularly superior.

As described above, preferred embodiments of the present invention were explained, but the present invention is not limited to the embodiments needless to say. It is clear that a person skilled in the art could have conceived of various modifications or changes within the scope described in the claims. It will be understood that these naturally also fall under the technical scope of the present invention.

REFERENCE SIGNS LIST

1 reflector
2 fluorescent lighting apparatus
3 cover
4 luminance measurement part
5 luminance uniformity comparison measurement part
6 luminance meter

The invention claimed is:

1. A coated metal material having at least three coating layers of a primer layer, middle coat layer, and top layer at least at part of a surface of the metal material, the coated metal material being produced by applying a liquid coating onto a metal material, wherein said middle coat layer contains, as a pigment, only rutile titanium oxide in a solid volume concentration of 35 to 70%, said middle coat layer uses as a binder resin ingredient a polyester resin A with a number average molecular weight of 19000 to 28000, and a concentration of the polyester resin A in said binder resin ingredient is 20 mass % or more, and a centerline average roughness Ra of an interface of said middle coat layer and said top layer is 2.0μm or more, wherein said middle coat layer has a thickness of 30 to 110 μm, and contains pores in a volume ratio of 0.02 to 1.1 times the solid content, wherein said primer layer contains a binder resin, and further contains, as a pigment, only rutile titanium oxide in a solid volume concentration of 20 to 35%, and has a thickness of 12 to 22 μm, and wherein said top layer contains, as a pigment, only rutile titanium oxide in a solid volume concentration of 20 to 35%, and has a thickness of 12 to 22 μm.

2. The coated metal material as set forth in claim 1, wherein the binder resin ingredient of said middle coat layer contains said polyester resin A and, further, a polyester resin B with a number average molecular weight of 2000 to 6000 and a hydroxyl value of 20 or more and the polyester resin A and the polyester resin B has a mass ratio of 0.25≤polyester resin B/polyester resin A≤4.

3. The coated metal material as set forth in claim 2, wherein said number average molecular weight of the polyester resin B in the binder resin ingredient of the middle coat layer is 3000 to 4500.

4. The coated metal material as set forth in claim 2, wherein said hydroxyl value of the polyester resin B in the binder resin ingredient of the middle coat layer is 40 to 200.

5. The coated metal material as set forth in claim 2, wherein said mass ratio of the polyester resin A and the polyester resin B is 0.65≤polyester resin B/polyester resin A≤1.5.

6. The coated metal material as set forth in claim 1, wherein said rutile titanium oxide contained in the middle coat layer has a solid volume concentration of 55 to 65%.

7. The coated metal material as set forth in claim 1, wherein said rutile titanium oxide contained in the middle coat layer has an average particle size of 200 to 400 nm.

8. The coated metal material as set forth in claim 7, wherein said rutile titanium oxide contained in the middle coat layer has an average particle size of 250 to 350 nm.

9. The coated metal material as set forth in claim 1, wherein said polyester resin A has a number average molecular weight of 20000 to 23000.

10. The coated metal material as set forth in claim 1, wherein said concentration of the polyester resin A in the binder resin ingredient of the middle coat layer is 40 to 60 mass %.

11. The coated metal material as set forth in claim 1, wherein said middle coat layer contains, in addition to the rutile titanium oxide, particles of a larger particle size and lower refractive index than the rutile titanium oxide.

12. The coated metal material as set forth in claim 11, wherein said particle size of the particles of a lower refractive index is 1 to 10 μm.

13. The coated metal material as set forth in claim 12, wherein said particle size of the particles of a lower refractive index is 4 to 7 μm.

14. The coated metal material as set forth in claim 11, wherein a refractive index difference of said particles of a lower refractive index and said rutile titanium oxide is 0.5 or more.

15. The coated metal material as set forth in claim 14, wherein said refractive index difference is 1 or more.

16. The coated metal material as set forth in claim 1, wherein said middle coat layer contains pores in a volume ratio of 0.5 to 0.95 times the solid content.

17. The coated metal material as set forth in claim 1, wherein said primer layer uses as a binder resin ingredient the polyester resin A with a number average molecular weight of 19000 to 28000 and a concentration of the polyester resin A in said binder resin ingredient is 80 mass % or more.

18. The coated metal material as set forth in claim 17, wherein the number average molecular weight of the polyester resin A in the binder resin ingredient of said primer layer is 20000 to 23000.

19. The coated metal material as set forth in claim 17, wherein the concentration of the polyester resin A in said binder resin ingredient of said primer layer is 90 to 100 mass %.

20. The coated metal material as set forth in claim 1, wherein said solid volume concentration of the rutile titanium oxide of the primer layer is 22 to 28%.

21. The coated metal material as set forth in claim 1, wherein said top layer uses as a binder resin ingredient the polyester resin A with a number average molecular weight of 19000 to 28000 and the concentration of the polyester resin A in said binder resin ingredient is 80 mass % or more.

22. The coated metal material as set forth in claim 21, wherein the number average molecular weight of the polyester resin A in the binder resin ingredient of said top layer is 20000 to 23000.

23. The coated metal material as set forth in claim 21, wherein the concentration of the polyester resin A in said binder resin ingredient of said top layer is 90 to 100 mass %.

24. The coated metal material as set forth in claim 1, wherein the solid volume concentration of the rutile titanium oxide of said top layer is 22 to 28%.

25. The coated metal material as set forth in claim 1, wherein said top layer contains a matting agent in a solid volume concentration of 3 to 15%.

26. The coated metal material as set forth in claim 25, wherein the solid volume concentration of said matting agent is 5 to 12%.

27. The coated metal material as set forth in claim 25, wherein said matting agent is silica of a particle size of 3 to 9 μm.

28. The coated metal material as set forth in claim 27, wherein the particle size of said silica is 4 to 7 μm.

29. The coated metal material as set forth in claim 1, wherein a boundary part of said middle coat layer and said top layer has a mixed layer of ingredients in said middle coat layer and ingredients in said top layer mixed together and said mixed layer has a thickness of 3 to 12 μm.

30. The coated metal material as set forth in claim 29, wherein the thickness of said mixed layer is 6 to 12 μm.

31. The coated metal material as set forth in claim 1, wherein a filtered center line waviness $W_{CA}$ of outermost surface of the coating layer is 2 μm or less.

32. The coated metal material as set forth in claim 31, wherein said $W_{CA}$ is 0.5 μm or less.

33. The coated metal material as set forth in claim 1, wherein an outermost coating film layer of said coating layers contains a silicone resin or fluorocarbon resin.

34. The coated metal material as set forth in claim 1, wherein an outermost coating film layer of said coating layers has a —Si—O—Si-bond in a resin skeleton forming the coating film.

35. The coated metal material as set forth in claim 1, wherein said middle coat layer has a thickness of 60 to 100 μm.

36. The coated metal material as set forth in claim 1, wherein said coated metal material is a precoated metal sheet.

37. A method of production of a coated metal material as set forth in claim 1, wherein at least two layers of said primer layer, said middle coat layer, and said top layer are coated by a multilayer simultaneous coating or wet-on-wet method.

38. A lighting apparatus using a coated metal material as set forth in claim 1 for a lighting reflector.

39. An electronic apparatus using a coated metal material as set forth in claim 1 for a reflector of a light emitting part or a reflector of an image display part.

* * * * *